(12) United States Patent
Parrinello et al.

(10) Patent No.: US 8,366,436 B2
(45) Date of Patent: Feb. 5, 2013

(54) APPARATUSES AND METHODS FOR MANUFACTURING CONTAINERS

(75) Inventors: Fiorenzo Parrinello, Medicina (IT); Maurizio Borgatti, Imola (IT); Matteo Camerani, Russi (IT); Emilio Re, Ancona (IT)

(73) Assignee: Sacmi Cooperativa Meccanici Imola Societa' Cooperativa, Imola (BO) (IT)

( * ) Notice: Subject to any disclaimer, the term of this patent is extended or adjusted under 35 U.S.C. 154(b) by 0 days.

(21) Appl. No.: 13/331,791

(22) Filed: Dec. 20, 2011

(65) Prior Publication Data
US 2012/0093966 A1   Apr. 19, 2012

Related U.S. Application Data

(63) Continuation of application No. 12/293,353, filed as application No. PCT/IB2007/000550 on Mar. 9, 2007, now Pat. No. 8,105,072.

(30) Foreign Application Priority Data

Mar. 17, 2006   (IT) .............................. MO2006A0089

(51) Int. Cl.
*B29C 49/02*   (2006.01)
*B29C 49/70*   (2006.01)
(52) U.S. Cl. ..... 425/538; 425/258; 425/261; 425/348 R; 425/528
(58) Field of Classification Search .................. 425/258, 425/261, 348 R, 528, 537
See application file for complete search history.

(56) References Cited

U.S. PATENT DOCUMENTS

| | | | |
|---|---|---|---|
| 3,050,773 A | 8/1962 | Hagen | |
| 3,378,138 A | 4/1968 | Brown | |
| 3,994,649 A | 11/1976 | Valyi | |
| 4,147,748 A | 4/1979 | Saumsiegle | |
| 4,150,689 A | 4/1979 | Britten | |
| 4,265,852 A | 5/1981 | Sauer | |
| 4,308,086 A | 12/1981 | Valyi | |
| 5,807,592 A * | 9/1998 | Alieri | 425/347 |
| 5,863,571 A * | 1/1999 | Santais et al. | 425/526 |
| 6,716,386 B2 | 4/2004 | Saito et al. | |
| 2003/0198707 A1 | 10/2003 | Battilani | |
| 2005/0058741 A1 | 3/2005 | Fujii et al. | |
| 2005/0189681 A1* | 9/2005 | Minganti | 264/320 |
| 2006/0286192 A1* | 12/2006 | Mattice et al. | 425/353 |
| 2010/0068328 A1 | 3/2010 | Parrinello | |

FOREIGN PATENT DOCUMENTS

EP   0 933 187   8/1999
(Continued)

OTHER PUBLICATIONS

International Search Report for PCT/IB2007/000089, mailed Feb. 22, 2008.

(Continued)

*Primary Examiner* — Robert B Davis
(74) *Attorney, Agent, or Firm* — Nixon & Vanderhye P.C.

(57) ABSTRACT

Apparatus, comprising a rotating carousel and a plurality of handling elements supported by said carousel and movable in relation to said carousel, said handling elements being so shaped as to remove a container from a blow-moulding mould arrangement, wherein said apparatus further comprises a plurality of further handling elements associated with said handling elements, said further handling elements being so shaped as to deliver a dose of plastics to a compression-moulding mould arrangement, each of said further handling elements being fixed to a corresponding handling element.

19 Claims, 65 Drawing Sheets

FOREIGN PATENT DOCUMENTS

| | | |
|---|---|---|
| EP | 1 297 942 | 4/2003 |
| FR | 2 215 304 | 8/1974 |
| GB | 1 474 044 | 5/1977 |
| SU | 1771980 A1 | 10/1992 |
| WO | 2005/077642 | 8/2005 |
| WO | 2005/102646 | 11/2005 |

OTHER PUBLICATIONS

International Preliminary Report on Patentability with Amended Sheets, dated Jul. 28, 2008.
Decision on Grant and English Translation, Russian Application No, 2008141157/05(053304), mailed Feb. 8, 2011 (18 pages).

* cited by examiner

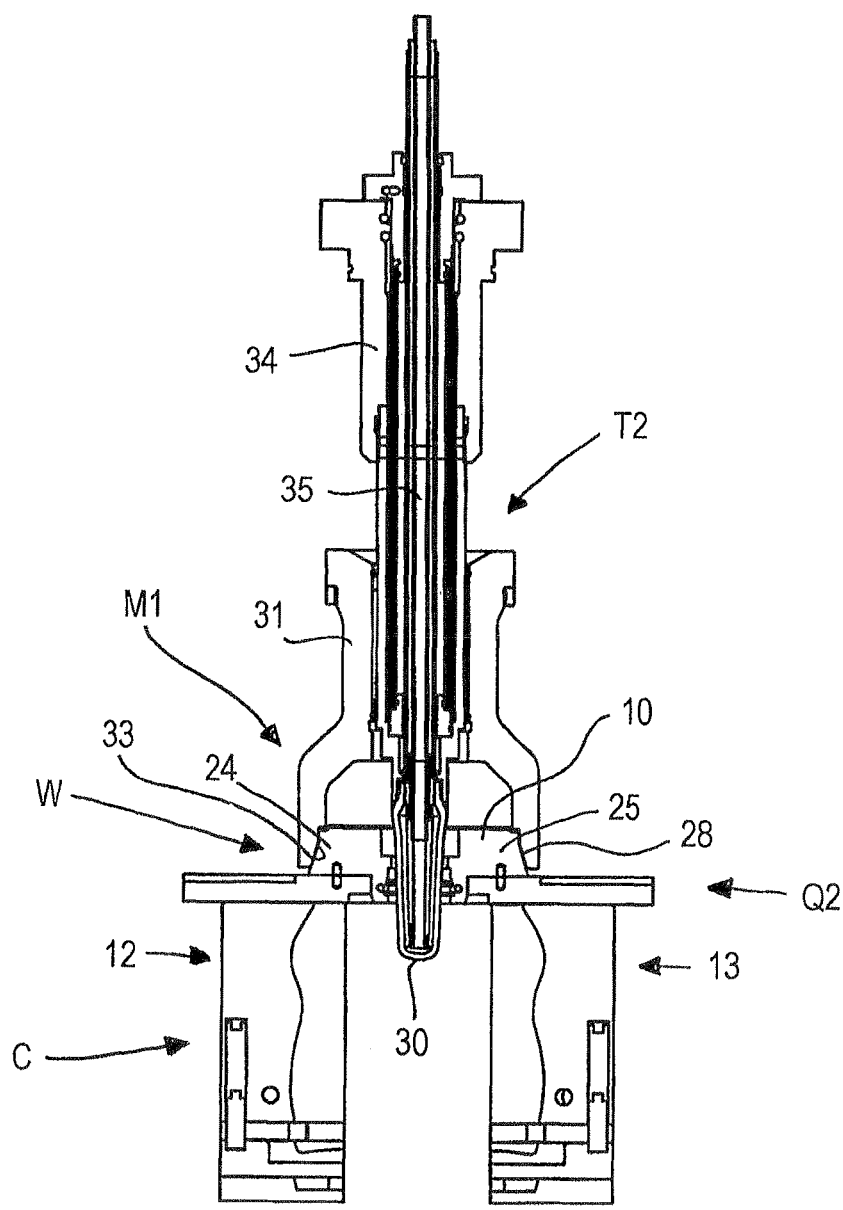
Fig. 3
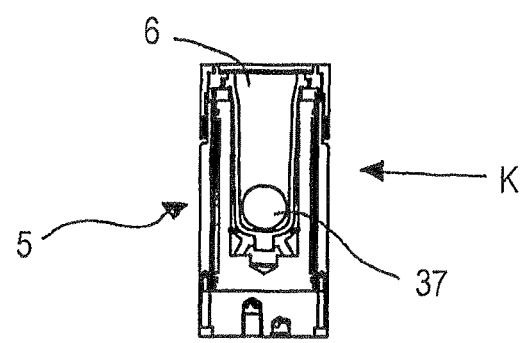

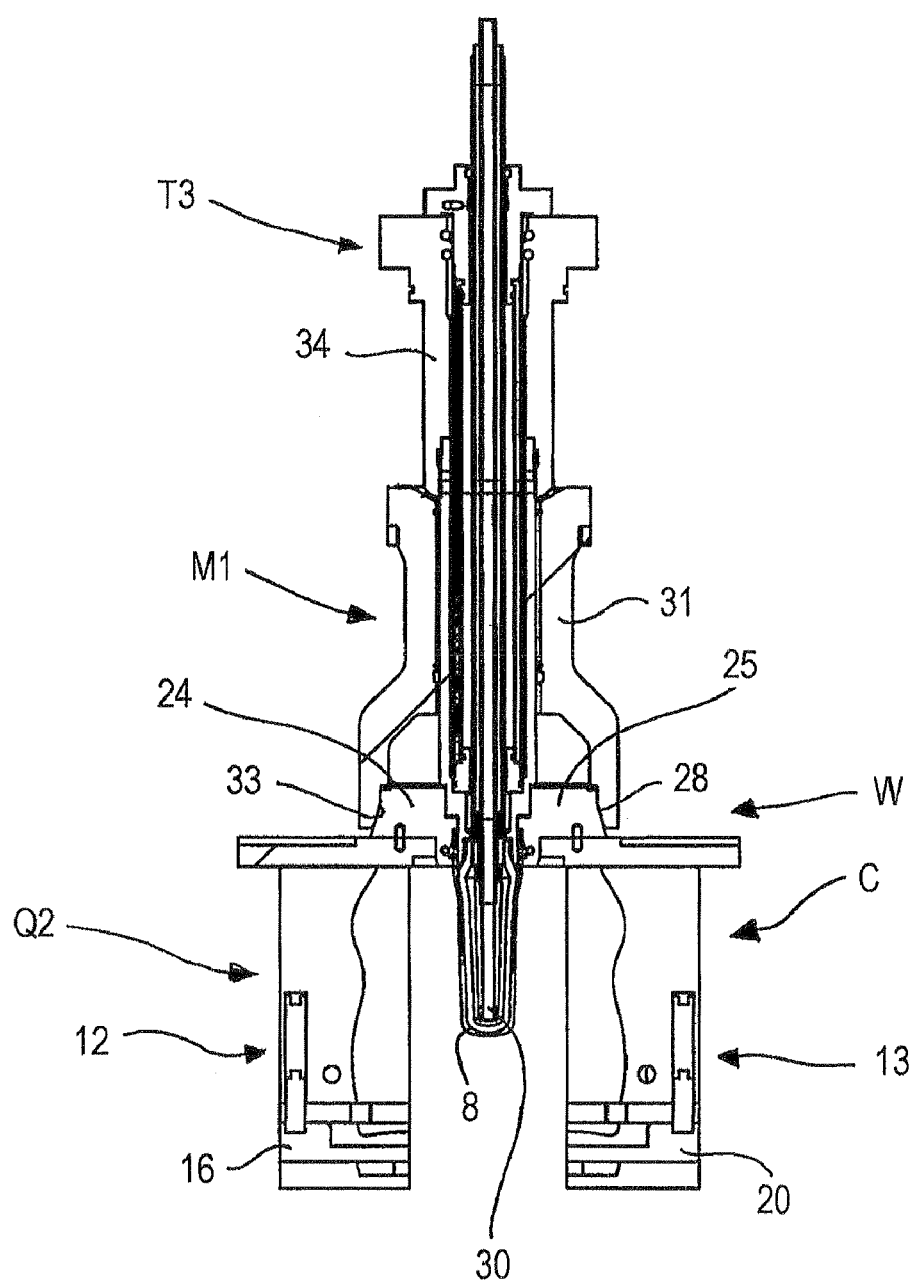
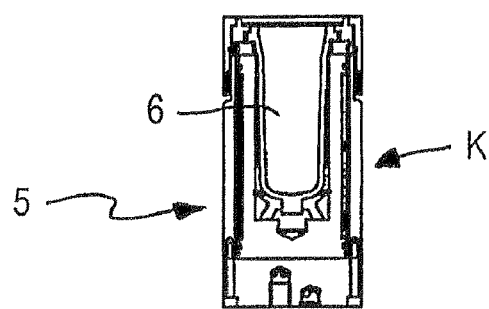
Fig. 5

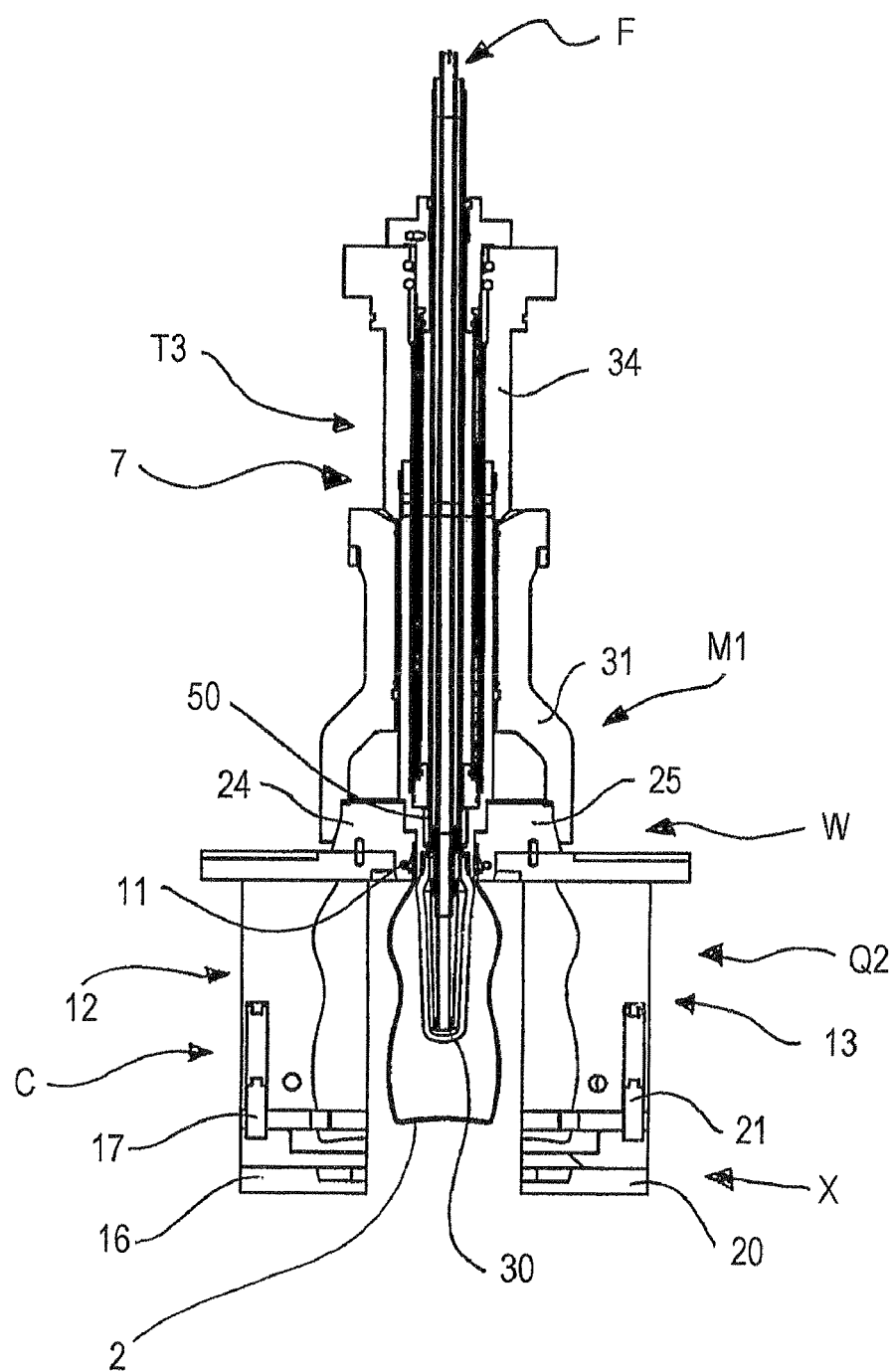
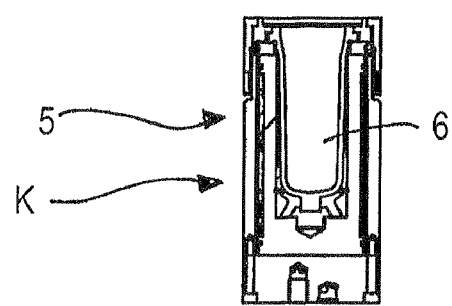
Fig. 8

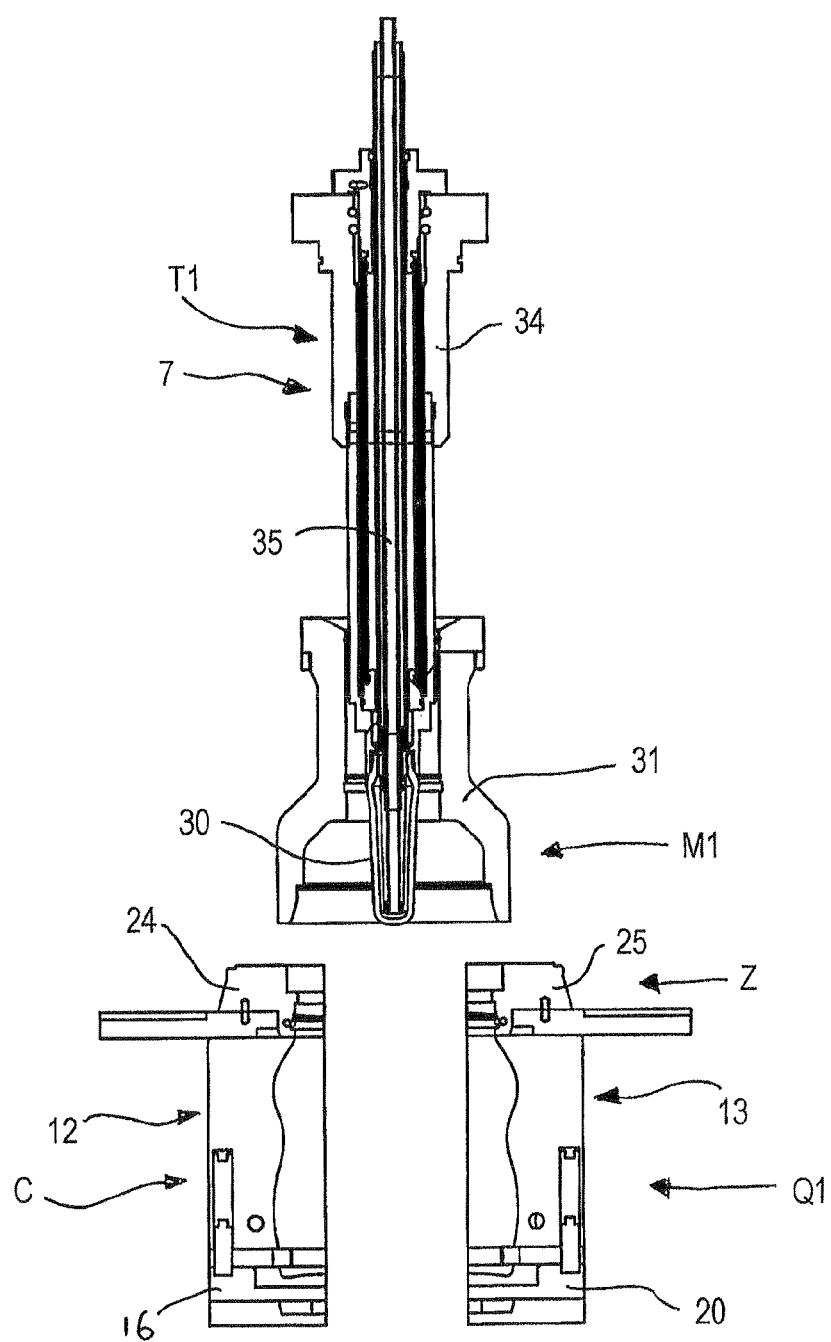
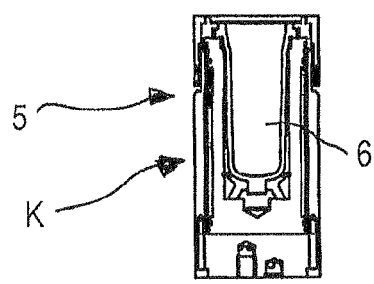
Fig. 9

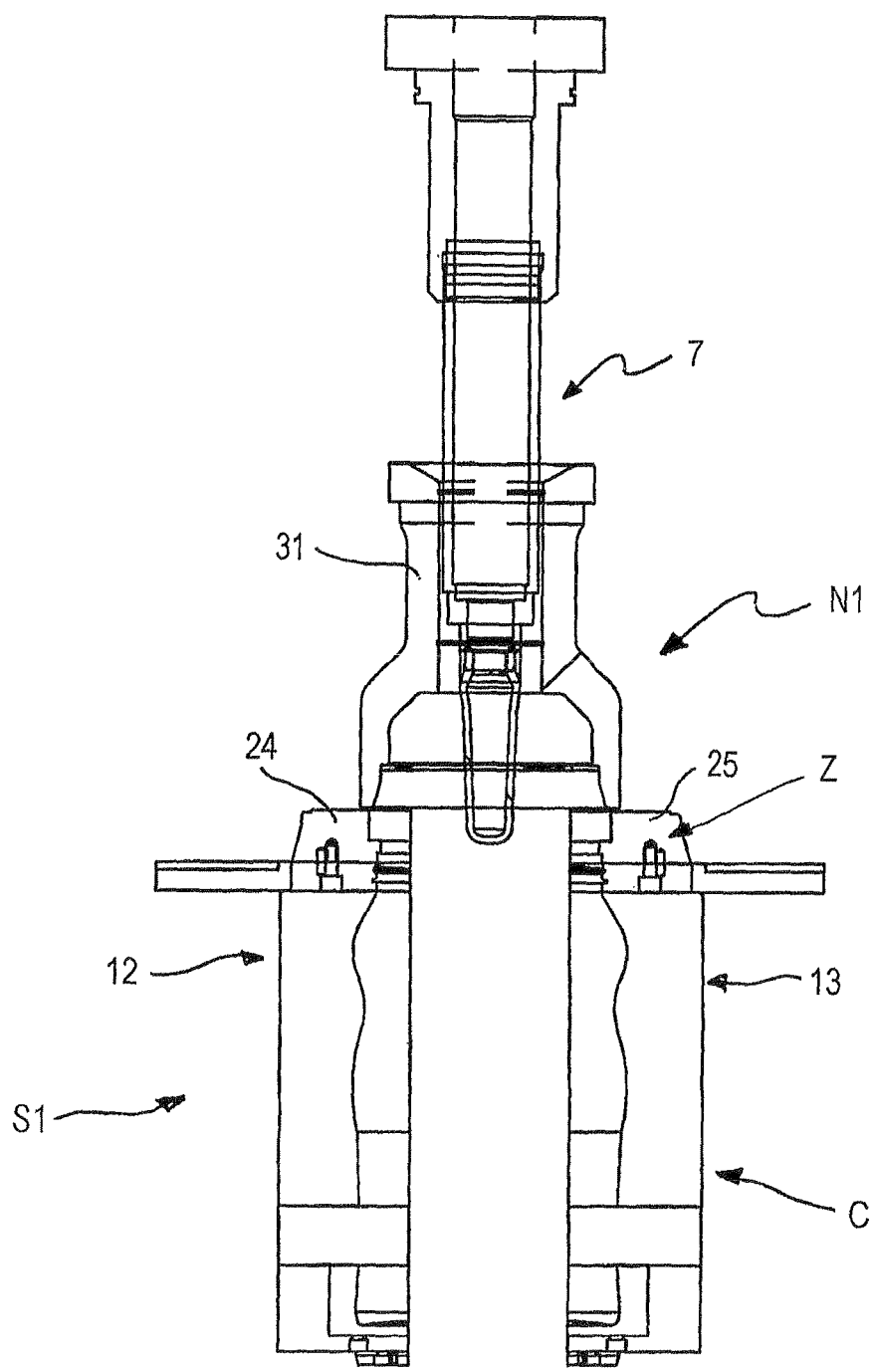
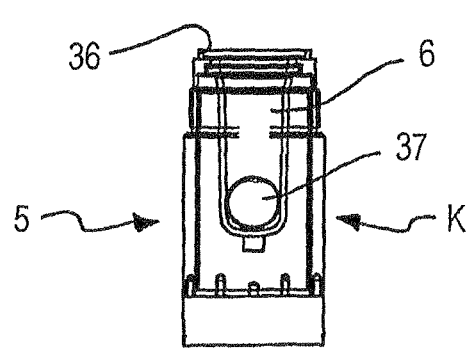
Fig. 16

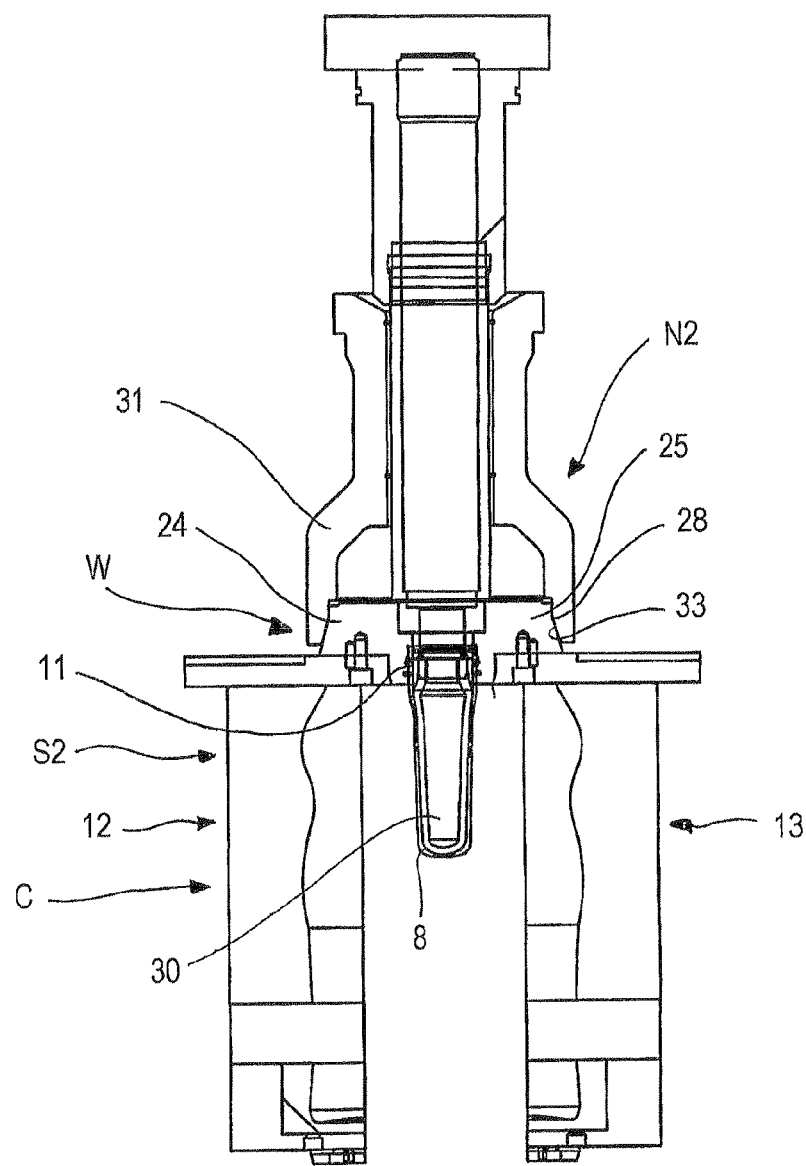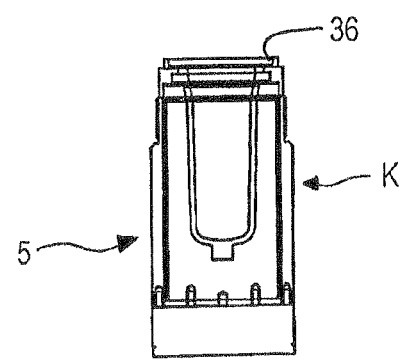
Fig. 18

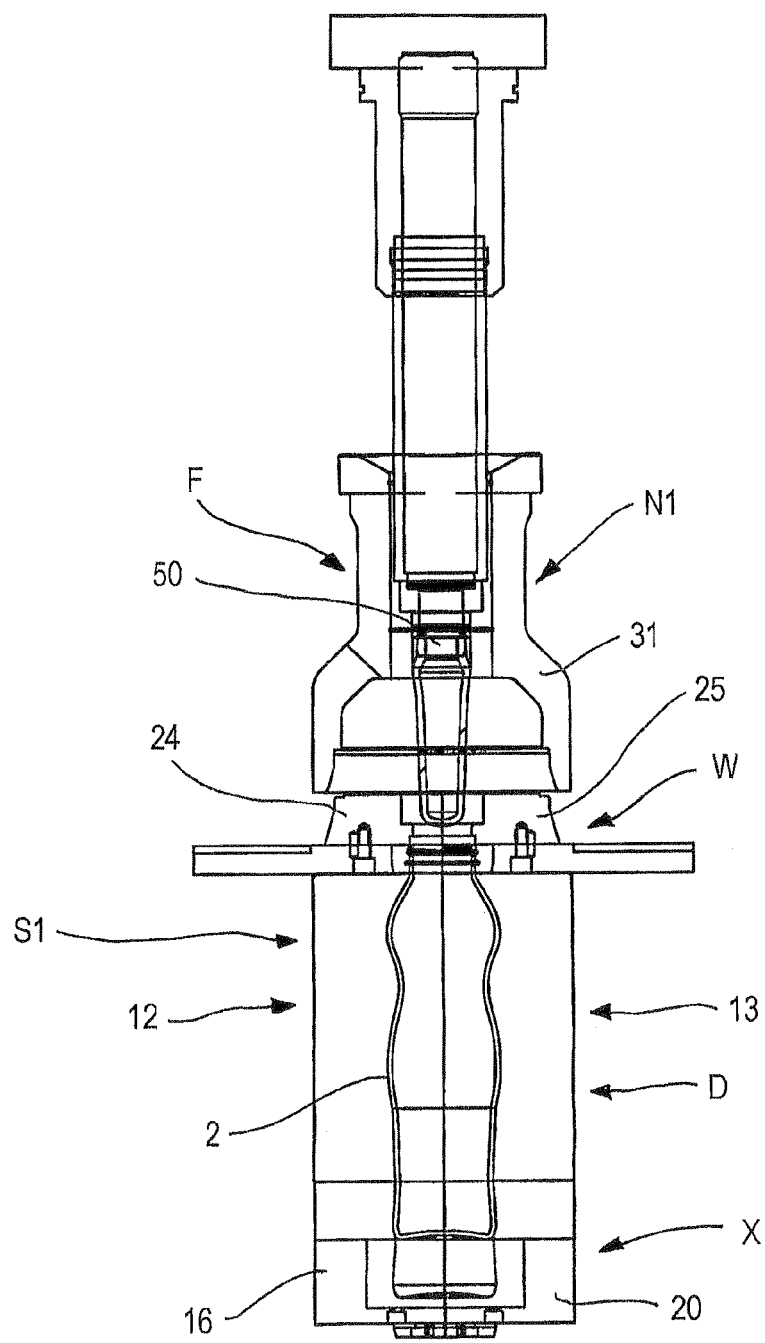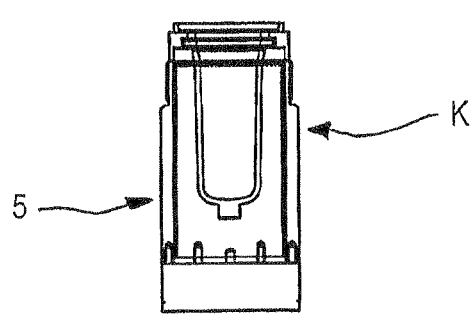
Fig. 21

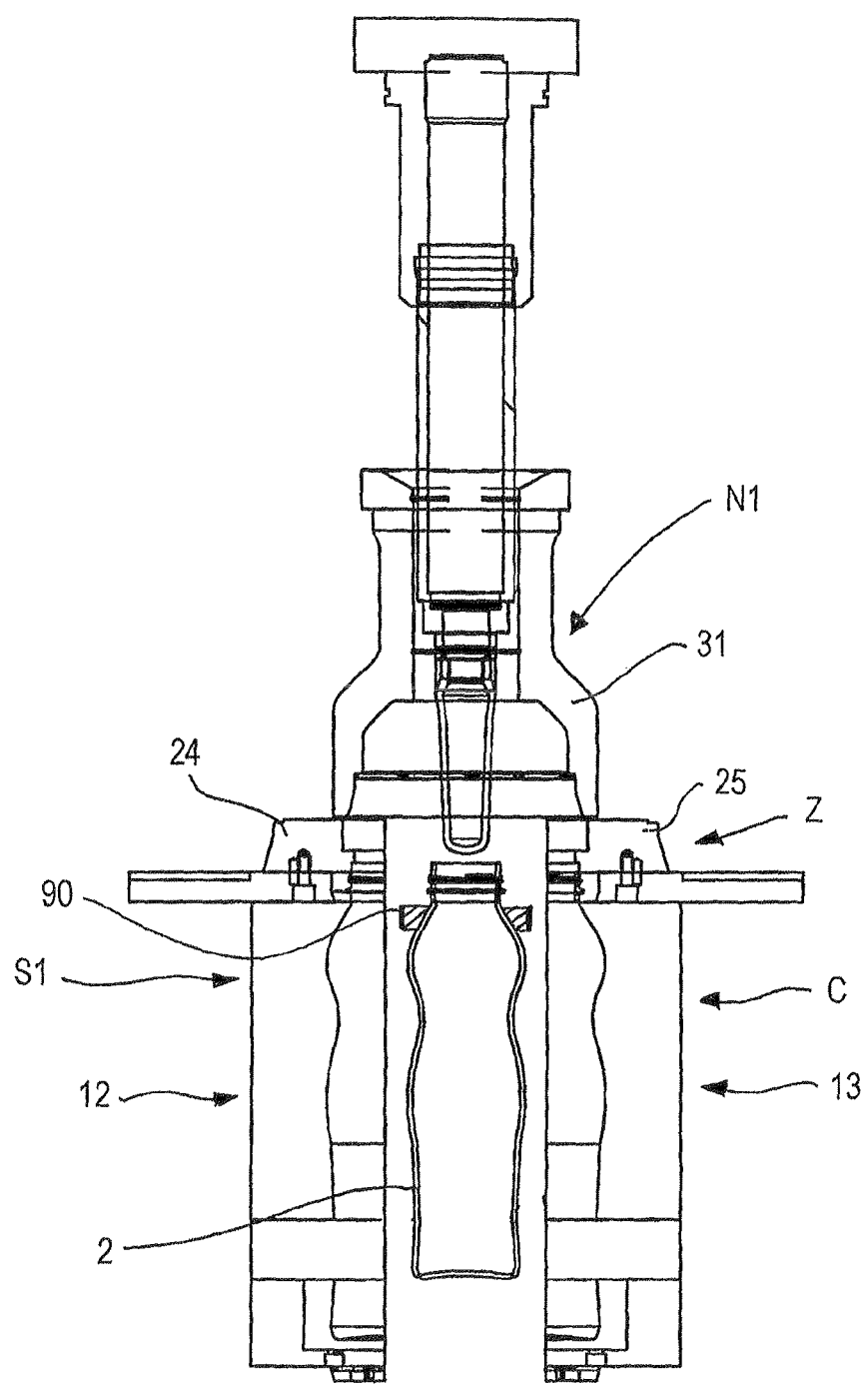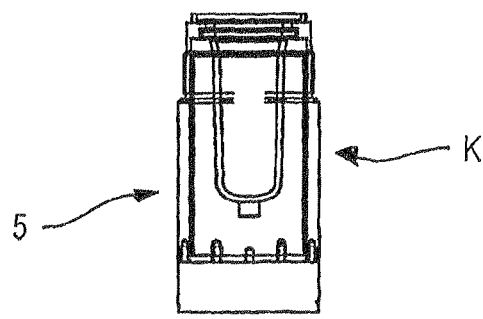
Fig. 22

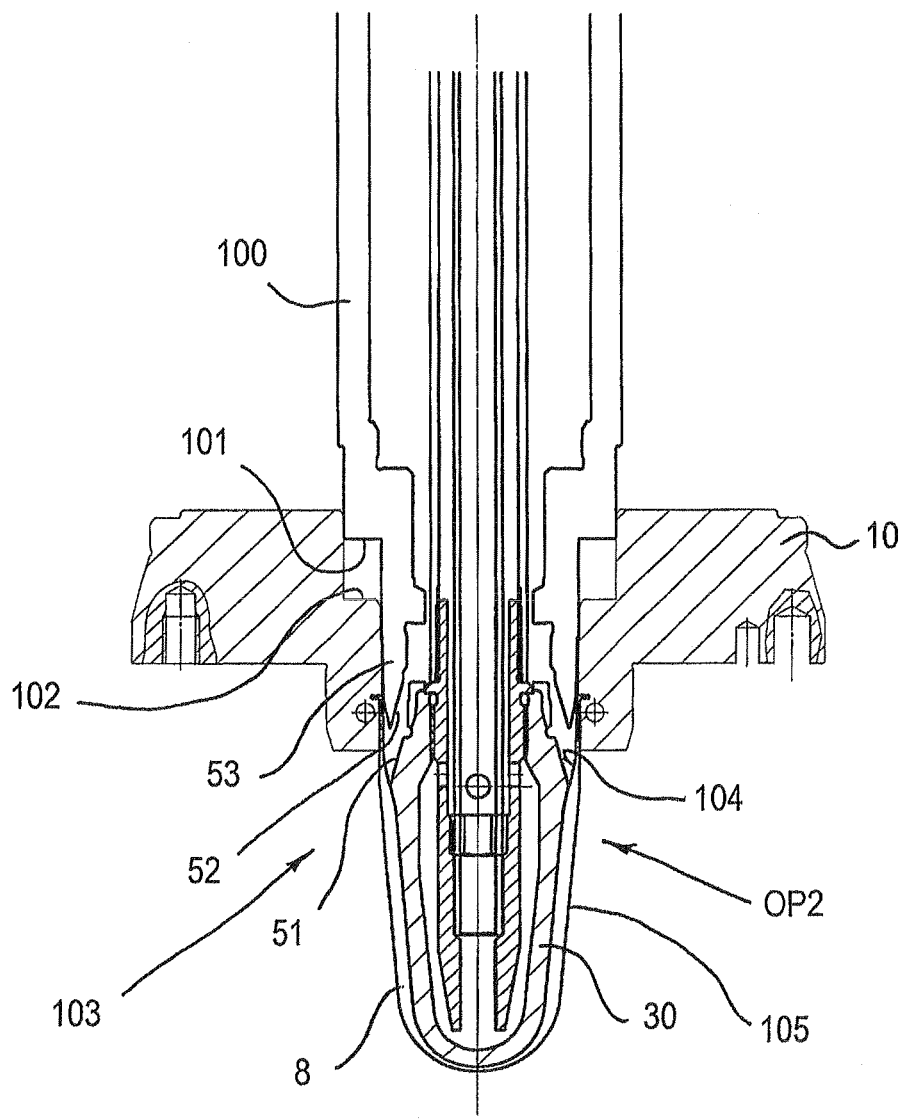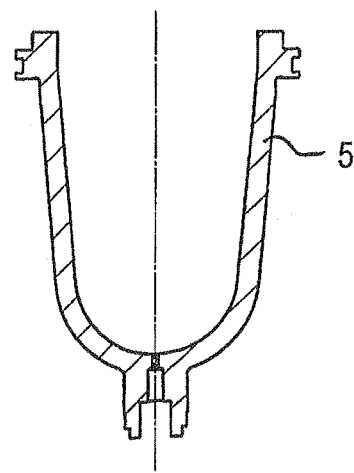
Fig. 41

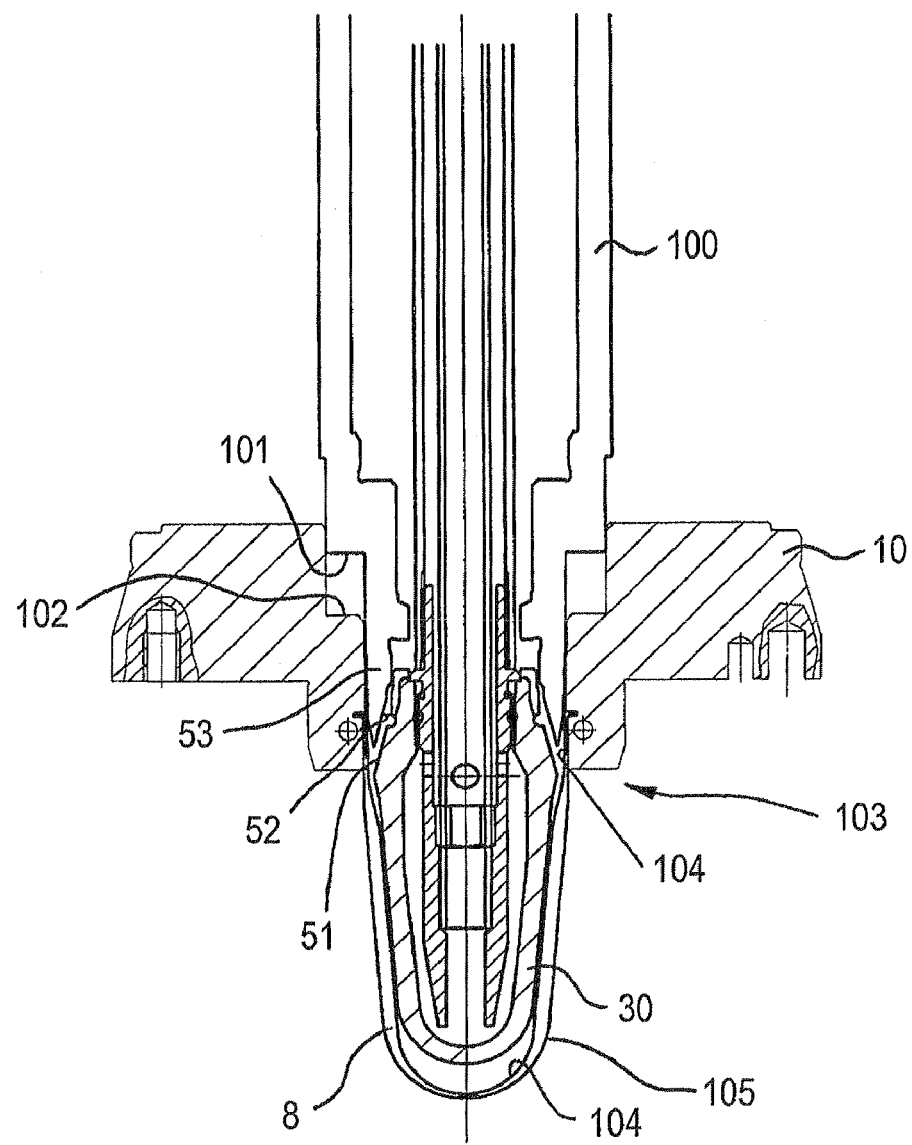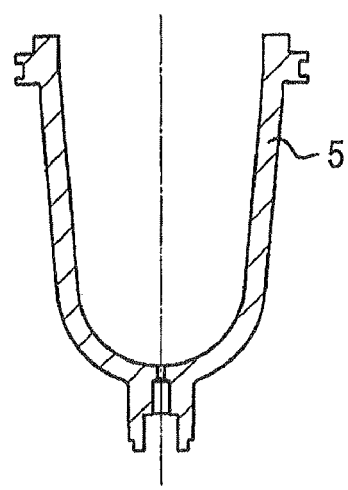
Fig. 42

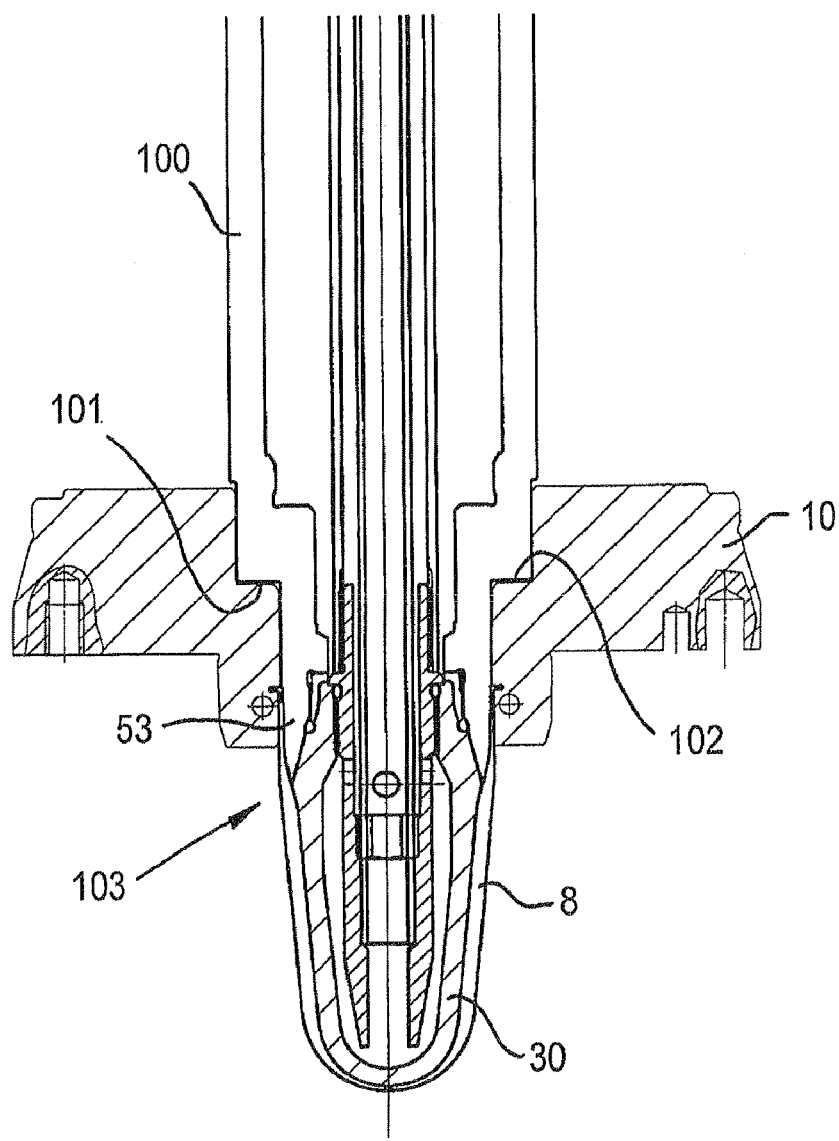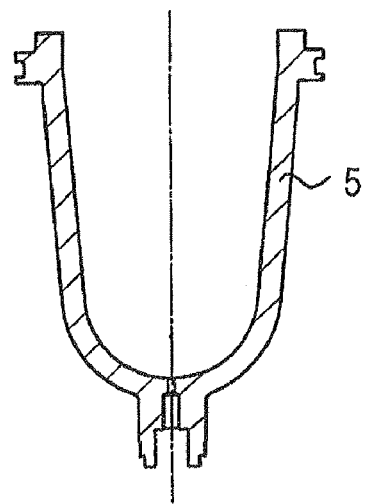
Fig. 43

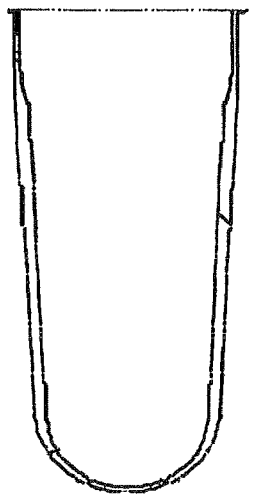
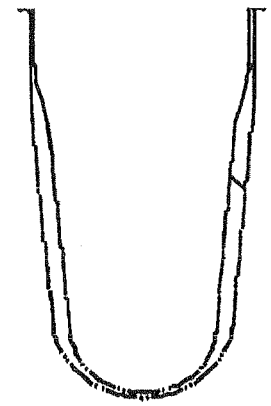
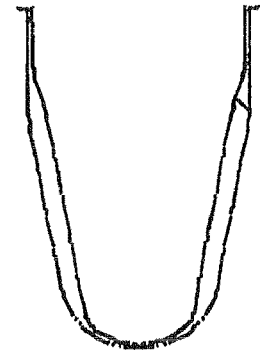
Fig. 57  Fig. 58  Fig. 59
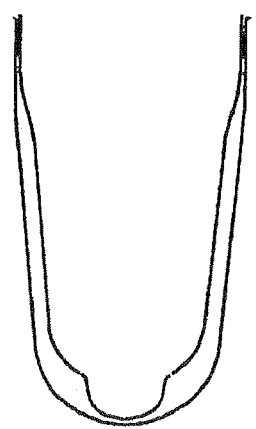
Fig. 60

APPARATUSES AND METHODS FOR MANUFACTURING CONTAINERS

CROSS-REFERENCE TO RELATED APPLICATIONS

This application is a continuation of U.S. application Ser. No. 12/293,353, filed Jan. 14, 2009, which is the U.S. national phase of International Application No. PCT/IB2007/000550, filed 9 Mar. 2007, which designated the U.S and claims priority to Italy Application No. MO2006A000089, filed 17 Mar. 2006, the entire contents of each application being hereby incorporated by reference in its entirety.

DESCRIPTION

The invention relates to the moulding of objects, in particular, compression-moulding of plastics to obtain preforms and blow-moulding or stretch blow-moulding of these preforms to obtain containers.

Apparatuses are known for the production of containers comprising forming moulds, in which plastics are injection-moulded to obtain preforms, as well as blowing moulds in which the preforms are expanded to obtain containers. The preforms are supplied directly to the blowing moulds, without being cooled at the outlet from the forming moulds.

One defect of these apparatuses is that they are not very efficient.

Forming machines arranged for forming container preforms and blowing machines arranged for stretch-blowing the preforms to obtain containers are also known.

The blowing machines are supplied with preforms produced by the forming machines.

The forming machines may be machines which compression-mould plastics or machines which injection-mould plastics.

The blowing machines and the forming machines can be positioned in different areas of a production plant, or even in different production plants.

The preforms removed from the forming machine are cooled, for example at ambient temperature.

One defect of the apparatuses described above is that the preforms have to be heated again before being stretch-blow-moulded.

For this purpose, the blowing machines must be provided with heating elements to heat the preforms.

A further defect of the apparatuses disclosed above is that the overall dimensions thereof are considerable since it is necessary to provide two different types of machines.

The containers production plants, therefore, can only be installed in large buildings.

An object of the invention is to improve the apparatuses for the production of containers.

Another object of the invention is to obtain an apparatus for the production of containers starting from doses of pasty plastics, which apparatus has rather limited overall dimensions.

In a first aspect of the invention, an apparatus is provided comprising a blow-moulding mould arrangement arranged for expanding a preform to obtain a container, said blow-moulding mould arrangement comprising a die arrangement cooperating with a punch arrangement, wherein said apparatus also comprises a compression-moulding mould arrangement comprising a further die arrangement cooperating with said punch arrangement to compression-mould plastics to obtain said preform.

Owing to this aspect of the invention, it is possible to obtain an apparatus provided with both a blow-moulding mould arrangement as well as a compression-moulding mould arrangement, said blow-moulding mould arrangement as well as said compression-moulding mould arrangement being provided, respectively, with a die arrangement and a further die arrangement cooperating successively with said punch arrangement.

This makes it possible to obtain a very compact apparatus which can be supplied with plastics to obtain containers, preforms intended for giving rise to containers being moulded and successively expanded directly on the apparatus.

In particular, in the apparatus according to the invention, a supporting arrangement is provided which support the blow-moulding mould arrangement, for example, a stretch-blow-moulding mould arrangement, as well as compression-moulding mould arrangement.

The apparatus according to the invention makes it possible to obtain considerable space savings since, unlike known apparatuses, it does not provide a machine carrying stretch-blowing moulds and a machine carrying compression-moulding moulds placed side by side.

The apparatus according to the invention also makes it possible to eliminate the moving devices provided in known apparatuses, which moving devices remove the preforms from the machine carrying the forming moulds and deliver the preforms to the machine carrying the stretch-blow-moulding moulds.

In a second aspect of the invention, a mould arrangement is provided, comprising a blow-moulding die arrangement arranged for receiving a preform and for expanding said preform to obtain a container, wherein a compression-moulding die arrangement is associated with said blow-moulding die arrangement, said compression-moulding die arrangement being arranged for receiving plastics and for shaping said plastics to obtain a neck portion of said preform.

Owing to this aspect of the invention, a mould arrangement can be obtained, comprising both a blow-moulding die arrangement as well as a compression-moulding die arrangement.

The blow-moulding die arrangement and the compression-moulding die arrangement can be driven independently of one another.

In a third aspect of the invention, a mould arrangement is provided, comprising a stretching arrangement arranged for stretching a preform and a blowing arrangement arranged for expanding said preform to obtain a container, wherein said stretching arrangement comprises a first stretching member and a second stretching member.

In a fourth aspect of the invention, a method is provided, comprising deforming a preform through a tool arrangement and expanding said preform through a fluid to obtain a container, said deforming comprising stretching said preform through a stretching arrangement of said tool arrangement, wherein said deforming further comprises further stretching said preform through a further stretching arrangement of said tool arrangement.

Owing to these aspects of the invention, an apparatus and a method can be obtained which make it possible to have better control of the operations of deformation of a preform to obtain a container.

In particular, it is possible to control the extent of the stretching force exerted by the first stretching member and the second stretching member on desired regions of the preform.

In a fifth aspect of the invention, a mould arrangement is provided, comprising a blowing arrangement arranged for expanding a preform to obtain a container, wherein said blowing arrangement comprises first blowing member and second blowing member.

In a sixth aspect of the invention, a method is provided, comprising expanding a preform to obtain a container, said expanding comprising introducing a flow of fluid in said preform, wherein said expanding further comprises further introducing a further flow of fluid in said preform.

Owing to these aspects of the invention, an apparatus and a method can be obtained which make it possible to have better control of the operations of expansion of a preform to obtain a container.

In particular, it is possible to control the extent of the blowing force exerted on distinct zones of the preform.

In a seventh aspect of the invention, an apparatus is provided, comprising a rotating carousel and a holding element supported by said carousel and movable in relation to said carousel, wherein said apparatus further comprises a further holding element associated with said holding element.

Owing to this aspect of the invention, it is possible to remove an object from a mould and substantially simultaneously introduce plastics to be formed in a die moulding.

In particular, it is possible to deposit a dose of pasty plastics inside a compression-moulding die.

In an eighth aspect of the invention, an apparatus is provided, comprising a carousel rotatable around a rotation axis and a further carousel rotatable around said rotation axis, an inserting arrangement supported by said carousel, said inserting arrangement being movable in relation to said carousel and arranged for inserting a dose of plastics in a compression-moulding mould arrangement, and an extracting arrangement supported by said further carousel, said extracting arrangement being movable in relation to said further carousel and arranged for removing a formed container from a blow-moulding mould arrangement.

Owing to this aspect of the invention, it is possible to remove a formed container from a blow-moulding mould and substantially simultaneously introduce a dose of plastics to be formed in a compression-moulding die.

In a ninth aspect of the invention, a method is provided, comprising compression-moulding of plastics through a forming arrangement in which a punch arrangement is received in a die arrangement for forming a preform around said punch arrangement, expanding said preform to obtain a container, wherein said preform is maintained around said punch arrangement and, before said expanding, at least partially detaching said punch arrangement from said preform.

In a tenth aspect of the invention, a method is provided, comprising compression-moulding plastics through a forming arrangement in which a punch arrangement is received in a die arrangement for forming a preform around said punch arrangement and expanding said preform to obtain a container, wherein, before said expanding, introducing a fluid between said punch arrangement and said preform and/or between said die arrangement and said preform to detach said preform from said forming arrangement is provided.

Owing to these aspects of the invention, it is possible to prevent zones of the preform from remaining attached to the forming arrangement when the preform is expanded, in particular to the punch arrangement, forming a container having walls which are not uniformly thick or even walls with tears.

In addition, owing to these aspects of the invention, by moving the punch arrangement and/or the die arrangement suitably in relation to the preform and inserting a fluid between the punch arrangement and the preform and/or between the die arrangement and the preform, it is possible to condition the preform thermally, giving the preform the required thermal profile, in particular, it is possible to obtain a preform having a thermal profile that is more uniform throughout the thickness.

In an eleventh aspect of the invention, an apparatus is provided, comprising a rotating carousel supporting a blow-moulding mould arrangement arranged for expanding preforms to obtain containers, and a moving device arranged for receiving said containers from said blow-moulding mould arrangement and for moving said containers away from said blow-moulding mould arrangement.

In one embodiment, the positioning arrangement is so shaped as to move the containers towards a peripheral region of the carousel.

In another embodiment, the positioning arrangement is so shaped as to move the containers substantially parallel to a rotation axis of the carousel.

Owing to this aspect of the invention, since the moving device moves the containers away from the blow-moulding moulds, a device for removing the containers can be associated with the apparatus, for example a removing carousel, provided with a very simple holding element. In fact, the holding element must not remove the containers from a removal position identified between a pair of half-moulds of a blow-moulding mould arrangement, but from a position which is outer and therefore very easy to reach.

The invention will be better understood and carried into effect with reference to the attached drawings, in which some embodiments are shown by way of non-limiting example, in which:

FIGS. 2 to 9 are longitudinal sections of the apparatus in FIG. 1, showing the apparatus in subsequent steps of an working cycle;

FIGS. 16 to 22 are longitudinal sections of the apparatus in FIG. 1, which show the apparatus in the successive steps of a further working cycle;

FIG. 41 is a longitudinal section showing the apparatus in another operating configuration;

FIG. 42 is a longitudinal section showing the apparatus in a further operating configuration;

FIG. 43 is a longitudinal section showing the apparatus in a still further operating configuration;

FIGS. 57 to 60 are schematic longitudinal sections of preforms which can be obtained and expanded using the apparatus;

Figure 1:
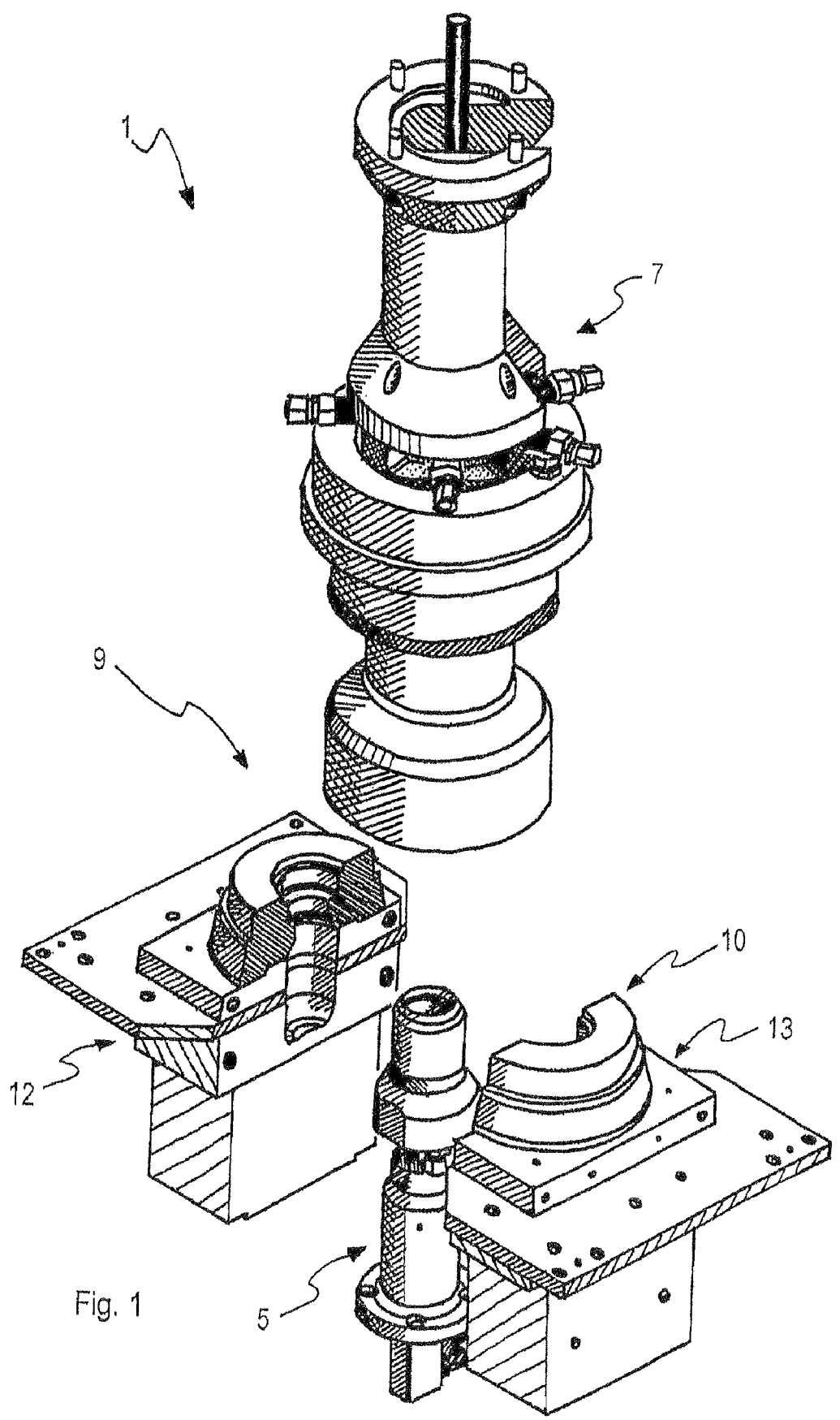
FIG. 1 is a schematic perspective view of an apparatus for the production of containers.

With reference to FIGS. 1 to 23, an apparatus 1 is shown for forming containers 2 comprising a compression-moulding mould arrangement 3 and a stretch-blow-moulding mould arrangement 4.

The stretch-blow-moulding mould arrangement 4 comprises a die arrangement 9 cooperating with a punch 7 to expand container preforms 8.

The compression-moulding mould arrangement 3 comprises a further die arrangement 5 distinct from the die arrangement 9 and provided with a receiving element 6—which is cup-shaped—arranged for receiving plastics, for example a dose of plastics 37 in pasty state.

The receiving element 6 cooperates with the punch 7 to compression-mould the above-mentioned plastics for obtaining container preforms 8.

The apparatus 1 comprises a moving device arranged for moving the further die arrangement 5 along a longitudinal axis A of the apparatus 1.

The apparatus 1 further comprises a neck-forming arrangement 10 arranged for compression-moulding a neck portion 11 of container preforms 8 which is not subsequently subjected to blow-moulding, or stretch-blow-moulding.

The die arrangement 9 comprise a first half-mould 12 and a second half-mould 13 and a further moving device arranged for moving the first half-mould 12 and the second half-mould 13 transversely to the longitudinal axis A.

Figure 2:
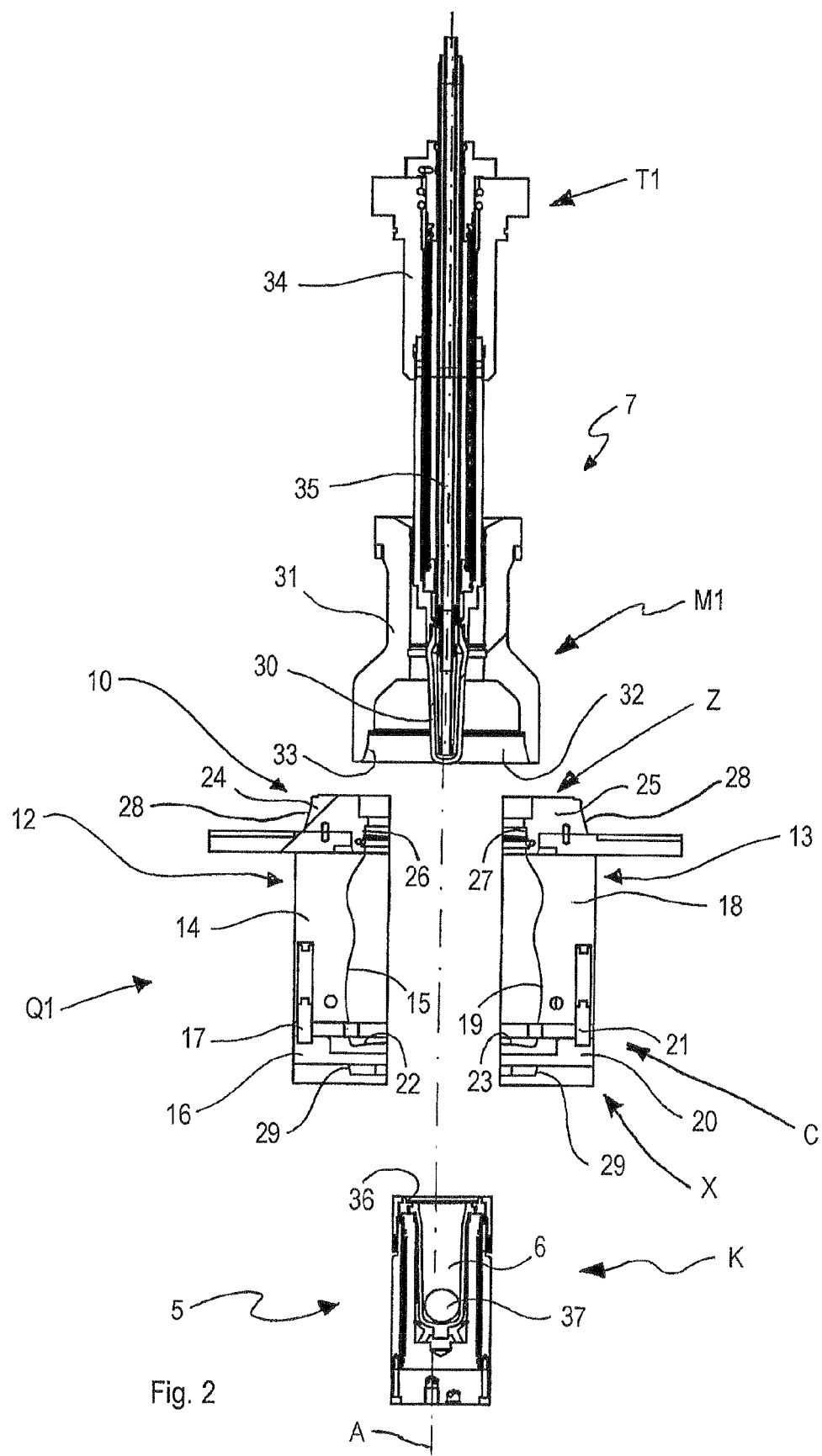
Figure 6:
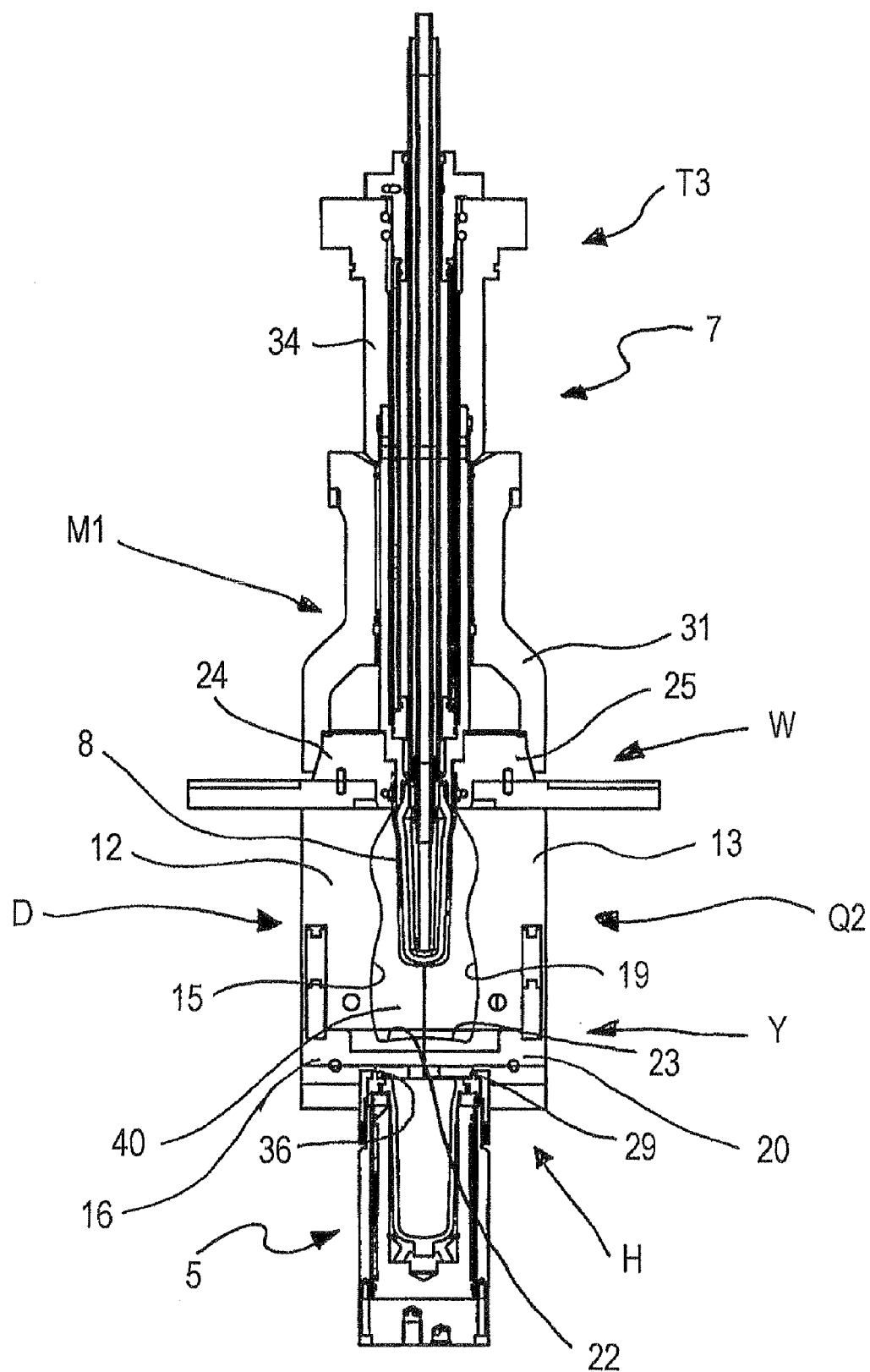

The first half-mould 12 and the second half-mould 13 are movable between an open configuration C, shown in FIG. 2, in which the first half-mould 12 and the second half-mould 13 are distant from each other, and a closed configuration D, shown in FIG. 6, in which the first half-mould 12 and the second half-mould 13 are in contact with each other.

The first half-mould 12 comprises a first body 14 in which a first forming cavity 15 is obtained, arranged for foaming a lateral portion of the containers 2.

The first half-mould 12 further comprises a first bottom element 16 connected to the first body 14 by means of first elastic elements 17, such as helical springs, gas springs, or similar.

A further first forming cavity 22 is obtained in the first bottom element 16, said further first forming cavity 22 being arranged for forming a bottom portion of the containers 2.

Similarly, the second half-mould 13 comprises a second body 18 in which a second forming cavity 19 is made, which second forming cavity 19 is arranged for forming a further lateral portion of the containers 2.

The second half-mould 13 further comprises a second bottom element 20 connected to the second body 18 by means of second elastic elements 21, such as helical springs, gas springs, or similar.

A further second forming cavity 23 is obtained in the second bottom element 20, said further second forming cavity 23 being arranged for forming a further bottom portion of the containers 2.

The first bottom element 16 and the second bottom element 20 each comprise a conical surface portion 29 arranged for interacting—as will be disclosed in greater detail subsequently—with a corresponding conical surface 36 provided on the further die arrangement 5.

The first bottom element 16 and the second bottom element 20 are movable between a rest configuration X, shown in FIG. 2, in which the first bottom element 16 and the second bottom element 20 are distant from the first body 14 and the second body 18, respectively, and an operating configuration Y, shown in FIG. 6, in which the first bottom element 16 and the second bottom element 20 rest on the first body 14 and the second body 18, respectively.

The neck forming arrangement 10 comprises a further first half-mould 24 and a further second half-mould 25 and a still further moving device arranged for moving the further first half-mould 24 and the further second half-mould 25 transversely to the longitudinal axis A.

Owing to the further moving device and the still further moving device, the die arrangement 9 and the neck forming arrangement 10 can each be moved independently of the others.

The further first half-mould 24 is associated with the first half-mould 12 and is arranged above the latter.

The further first half-mould 24, driven by the still further moving device, slides on the first half-mould 12.

Similarly, the further second half-mould 25 is associated with the second half-mould 13 and is arranged above the latter.

The further second half-mould 25, driven by the still further moving device, slides on the second half-mould 13.

The dies arrangement 9 and the neck forming arrangement 10 can be made of different materials.

For example, the neck forming arrangement 10 may be made of steel and the die arrangement 9 may be made of aluminum.

A still further first forming cavity 26 is obtained in the further first half-mould 24, said still further first forming cavity 26 being arranged for forming a part of the neck portion 11 of the containers 2.

A still further second forming cavity 27 is made in the further second half-mould 25, said still further second forming cavity 27 being arranged for forming a part of the neck portion 11 of the containers 2.

The further first half-mould 24 and the further second half-mould 25 each comprise a further conical surface portion 28 arranged for interacting with the punch 7, as will be disclosed in greater detail subsequently.

The further first half-mould 24 and the further second half-mould 25 are movable between a release configuration Z, shown in FIG. 2, in which the further first half-mould 24 and the further second half-mould 25 are distant from each other, and a forming configuration W, shown in FIG. 3, in which the further first half-mould 24 and the further second half-mould 25 are in contact with each other.

In the forming configuration W, the still further first forming cavity 26 and the still further second forming cavity 27 define a chamber 81 arranged for shaping the neck portion 11.

The punch 7 comprises a forming element 30 arranged for being received, alternately, in the further die arrangement 5 for forming plastics to obtain the container preforms 8 and in the die arrangement 9 for expanding the container preforms 8 to obtain the containers 2.

The apparatus 1 comprises a supporting block, not shown, which is shaped, for example, like a carriage slidable on guides, arranged for supporting the first half-mould 12, the second half-mould 13, the further first half-mould 24 and the further second half-mould 25 and for moving the first half-mould 12, the second half-mould 13, the further first half-mould 24 and the further second half-mould 25 along the longitudinal axis A.

The punch 7 comprises a blocking element 31 arranged for maintaining the further first half-mould 24 and the further second half-mould 25 in the forming configuration W.

The blocking element 31 is provided with a seat 32 arranged for partially surrounding the further first half-mould 24 and the further second half-mould 25 and for receiving inside thereof an end portion of the further first half-mould 24 and of the further second half-mould 25.

The seat 32 is partially delimited by a further conical surface 33 arranged for engaging with the further conical surface portions 28.

The apparatus 1 further comprises a driving device 34 arranged for moving the punch 7 along the longitudinal axis A.

The punch 7 further comprises a stretching rod 50 movable along the longitudinal axis A and arranged for stretching the container preforms 8.

An operating mode of the apparatus 1 is disclosed with reference to FIGS. 1 to 13.

In an initial working cycle step, shown in FIG. 2, the further die arrangement 5 is arranged in a lowered position K in which the further die arrangement 5 is positioned below the die arrangement 9 and does not act with the punch arrangement 7 or with the die arrangement 9.

In the lowered position K a dose 37 of plastics in a pasty state is inserted in the receiving element 6.

The first half-mould 12 and the second half-mould 13 are in the open configuration C.

The further first half-mould 24 and the further second half-mould 25 are in the release configuration Z.

The supporting block is in a first operating position Q1, in which the further first half-mould 24 and the further second half-mould 25 do not interact with the blocking element 31.

The punch 7 is in an upper end stop position T1, in which the moulding element 30 does not interact with the die arrangement 9 or with the further die arrangement 5.

The blocking element 31 is maintained by an elastic element not shown in a lower position M1.

Subsequently, a further driving device brings the further first half-mould 24 and the further second half-mould 25 in the forming configuration W, as shown in FIG. 3.

The supporting block raises the first half-mould 12, the second half-mould 13, the further first half-mould 24 and the further second half-mould 25.

The supporting block moves from the first operating position Q1 to a second operating position Q2, in which the further conical surface 33 interacts with the further conical surface portions 28.

The blocking element 31 is maintained in the lower position M1.

The driving device 34 brings the punch 7 near the neck forming arrangement 10 and the die arrangement 9 and brings the punch 7 to an intermediate position T2.

The forming element 30 is partially received inside the neck forming arrangement 10.

The further die arrangement 5 is maintained in the lowered position K, while first half-mould 12 and second half-mould 13 are maintained in open configuration C.

Figure 4:
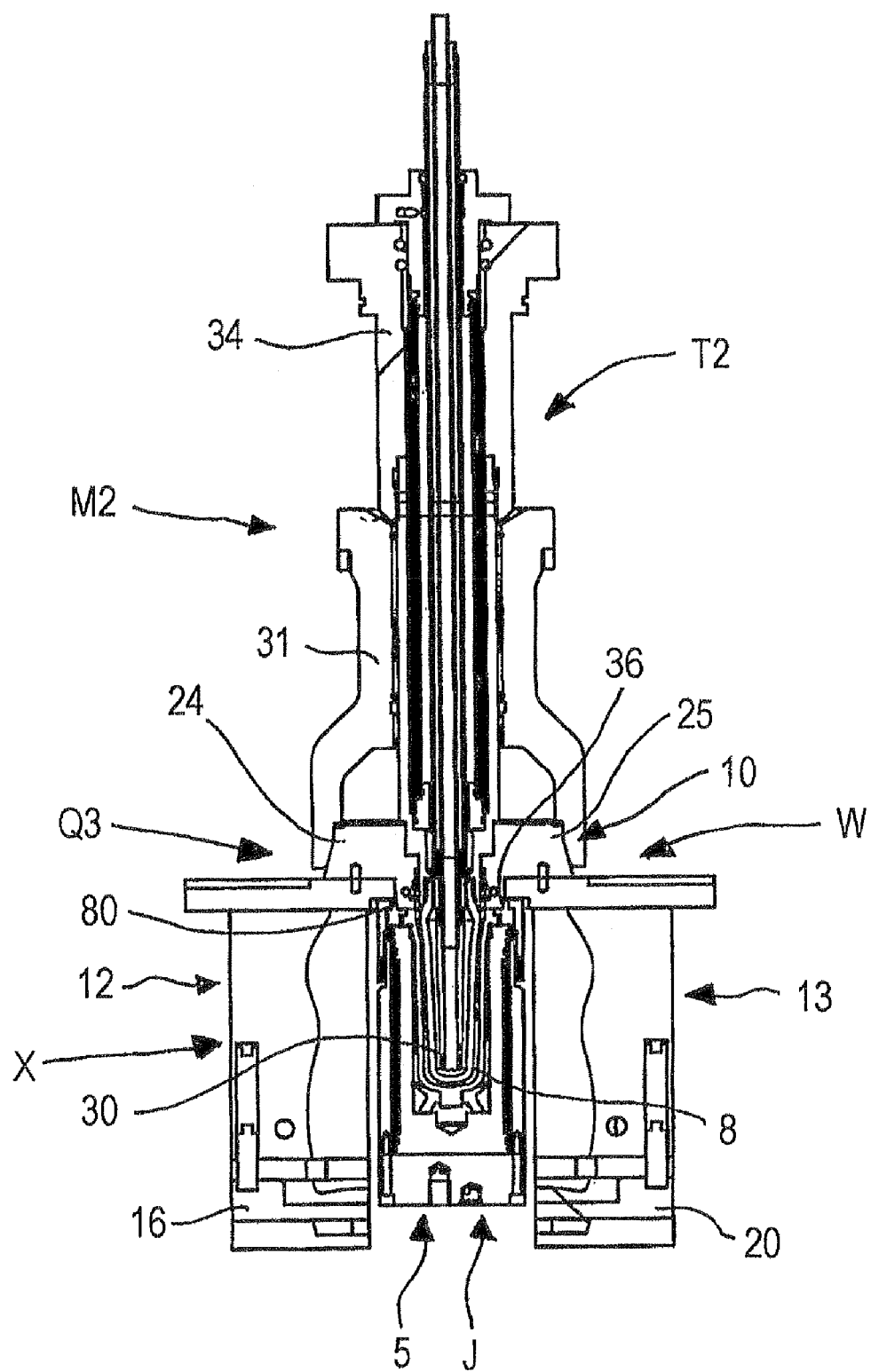
Figure 10:
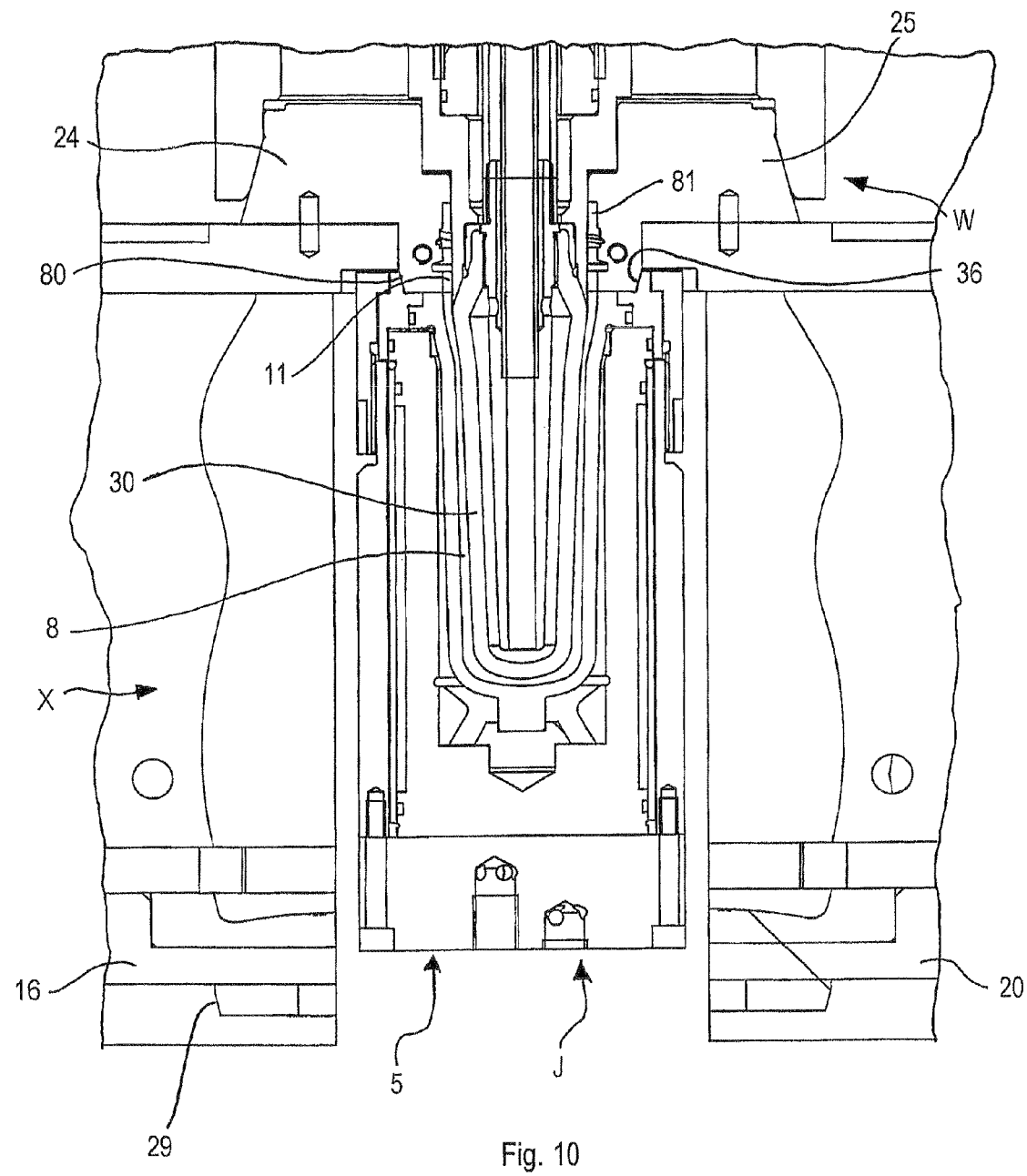
FIG. 10 is a detail of FIG. 4.

Subsequently, as shown in FIGS. 4 and 10, the moving device moves the further die arrangement 5 from the lowered position K to a raised position J, in which the further die arrangement 5 interacts with the neck forming arrangement 10.

The further first half-mould 24 and the further second half-mould 25 are maintained in the forming configuration W.

The further die arrangement 5 further lifts the neck forming arrangement 10, by overcoming the resistance of the elastic element, in such a way that the supporting block—and consequently the first half-mould 12, the second half-mould 13, the further first half-mould 24 and the further second half-mould 25 fixed thereto—is brought to a third operating position Q3, corresponding to an upper position M2 of the blocking element 31.

The forming element 30 is received in the further die arrangement 5 so that the dose 37 is compression-moulded to obtain a container preform 8.

In the raised position J, the conical surface 36 engages with corresponding conical zones 80 of the further first half-mould 24 and the further second half-mould 25 contributing to maintaining the further first half-mould 24 and the further second half-mould 25 in the forming configuration W.

The first half-mould 12 and the second half-mould 13 are maintained in the open configuration C, while the punch 7 is maintained in the intermediate position T2.

Subsequently, as shown in FIG. 5, the moving device moves the further die arrangement 5 from the raised position J to the lowered position K.

The blocking element 31 returns to the lower position M1.

The supporting block is returned to the second operating position Q2.

The driving device 34 moves the punch from the intermediate position T2 to a lower end stop position T3.

The further conical surface 33 interacts with the further conical surface portions 28 in such a way as to contribute to maintain the further first half-mould 24 and the further second half-mould 25 in the forming configuration W.

The first half-mould 12 and the second half-mould 13 are maintained in the open configuration C.

The neck portion 11 of the container preform 8 is locked between the further first half-mould 24 and the further second half-mould 25.

The forming element 30 is kept inside the container preform 8 which has just been formed.

An internal surface of the container preform 8 adheres to a corresponding external surface of the moulding element 30.

Figure 11:
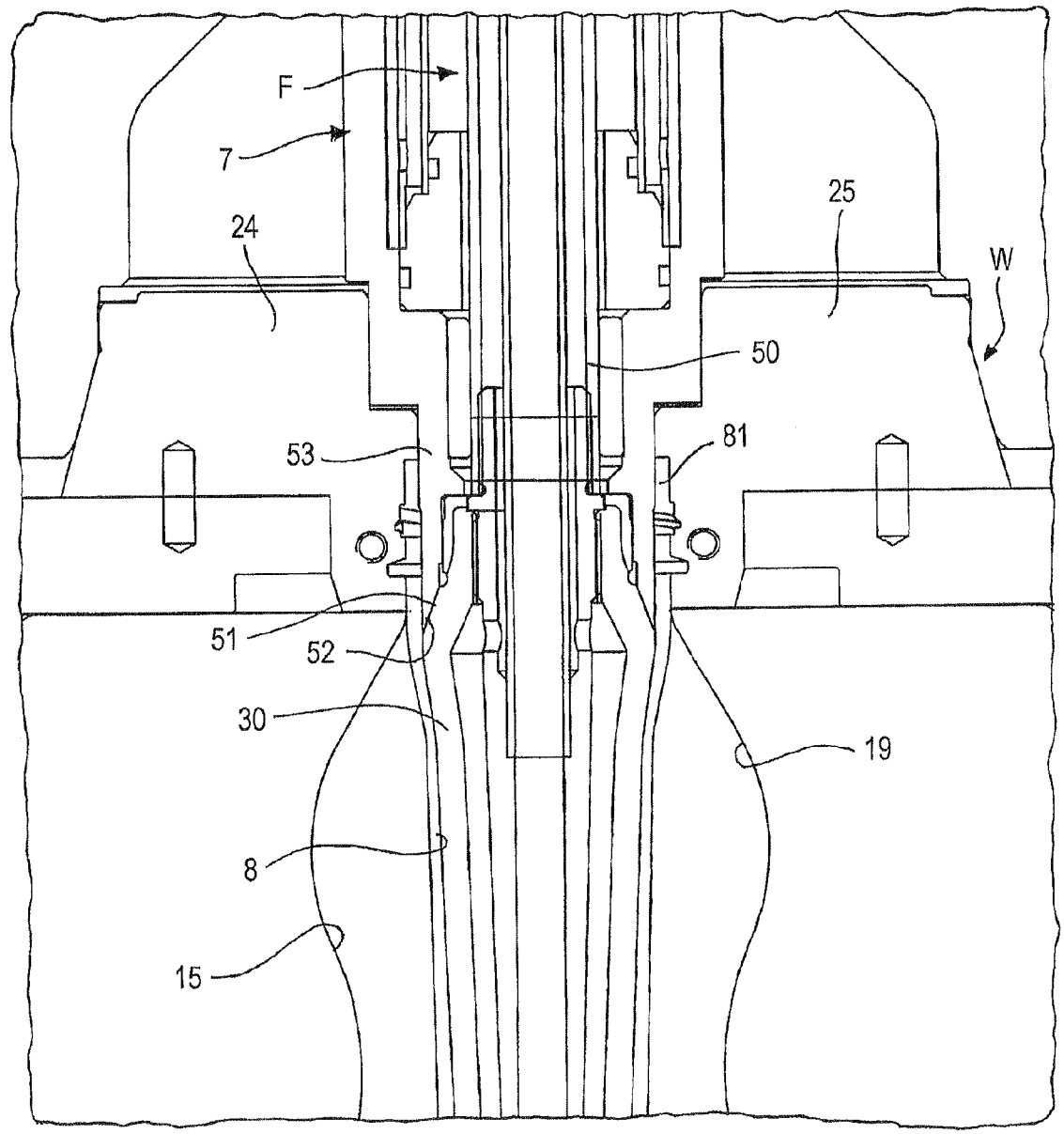
FIG. 11 is a detail of FIG. 6.

In a subsequent step of the working cycle shown in FIGS. 6 and 11, the punch 7 is in the lower end stop position T3, the blocking element 31 is in the upper position M, the supporting block is in the second operating position Q2, the further first half-mould 24 and the further second half-mould 25 are in the forming configuration W.

The further moving device brings the first half-mould 12 and the second half-mould 13 from the open configuration C to the closed configuration D, so that the first forming cavity 15, the second forming cavity 19, the further first forming cavity 22 and the further second forming cavity 23 delimit—after the first bottom element 16 and the second bottom element 20 have assumed the operating configuration Y, in the way which will be disclosed subsequently—a chamber 40 of the die arrangement 9 inside which the container preform 8 is subsequently expanded.

The moving device moves the further die arrangement 5 from the lowered position K to a blocking position H in which the further die arrangement 5 interacts with the die arrangement 9.

In the blocking position H the conical surface 36 interacts with the conical surface portions 29 in such a way as to contribute to maintain the first half-mould 12 and the second half-mould 13 in the closed configuration D.

The further die arrangement 5, passing from the lowered position K to the blocking position H, interact with the first bottom element 16 and the second bottom element 20 in such a way as to shift the first bottom element 16 and the second bottom element 20 from the rest configuration X to the operating configuration Y.

The die arrangement 9 is aligned with the further die arrangement 5 along the longitudinal axis A.

Figure 14:
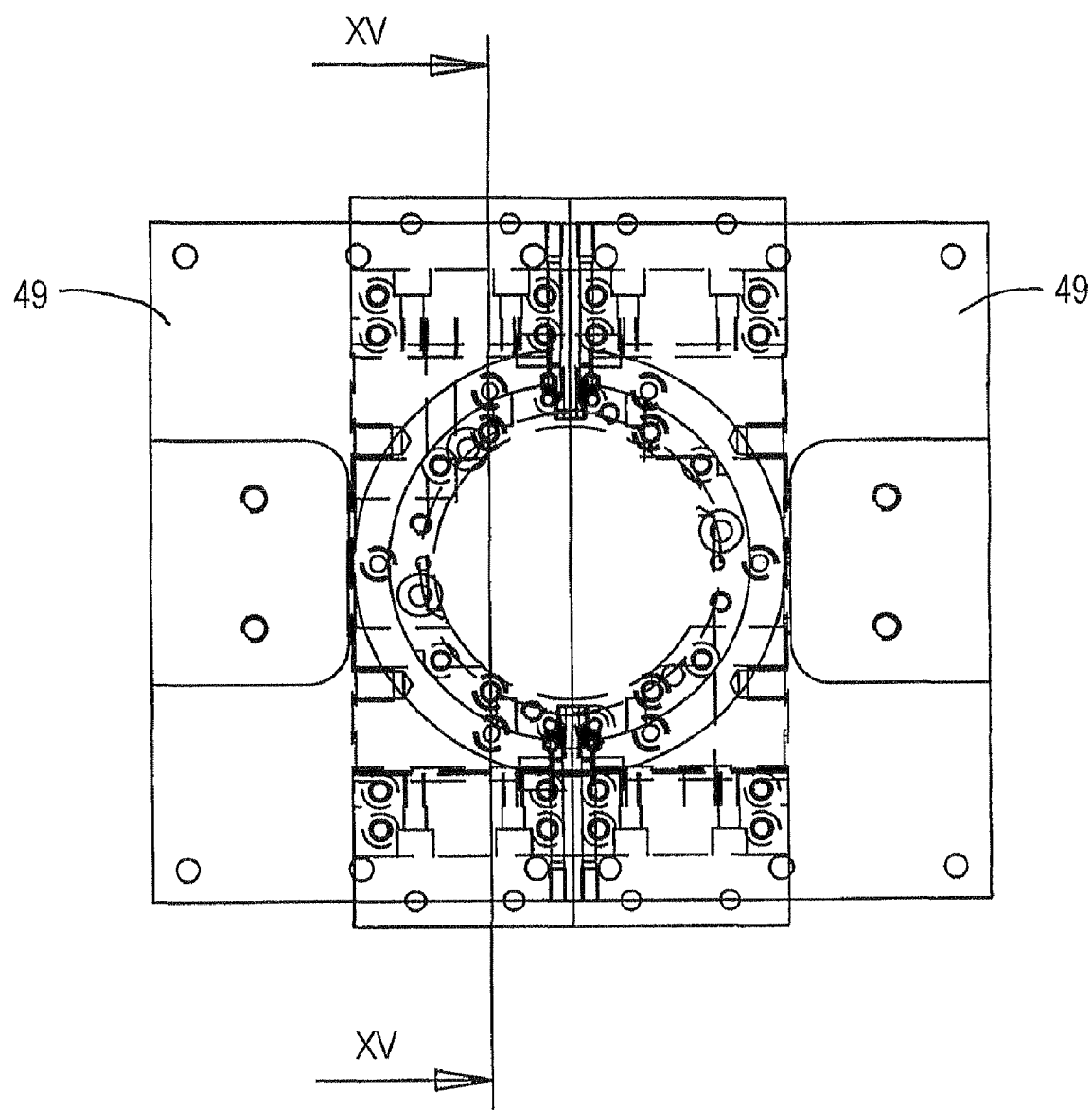
FIG. 14 is a plan view of the apparatus in FIG. 1.
Figure 15:
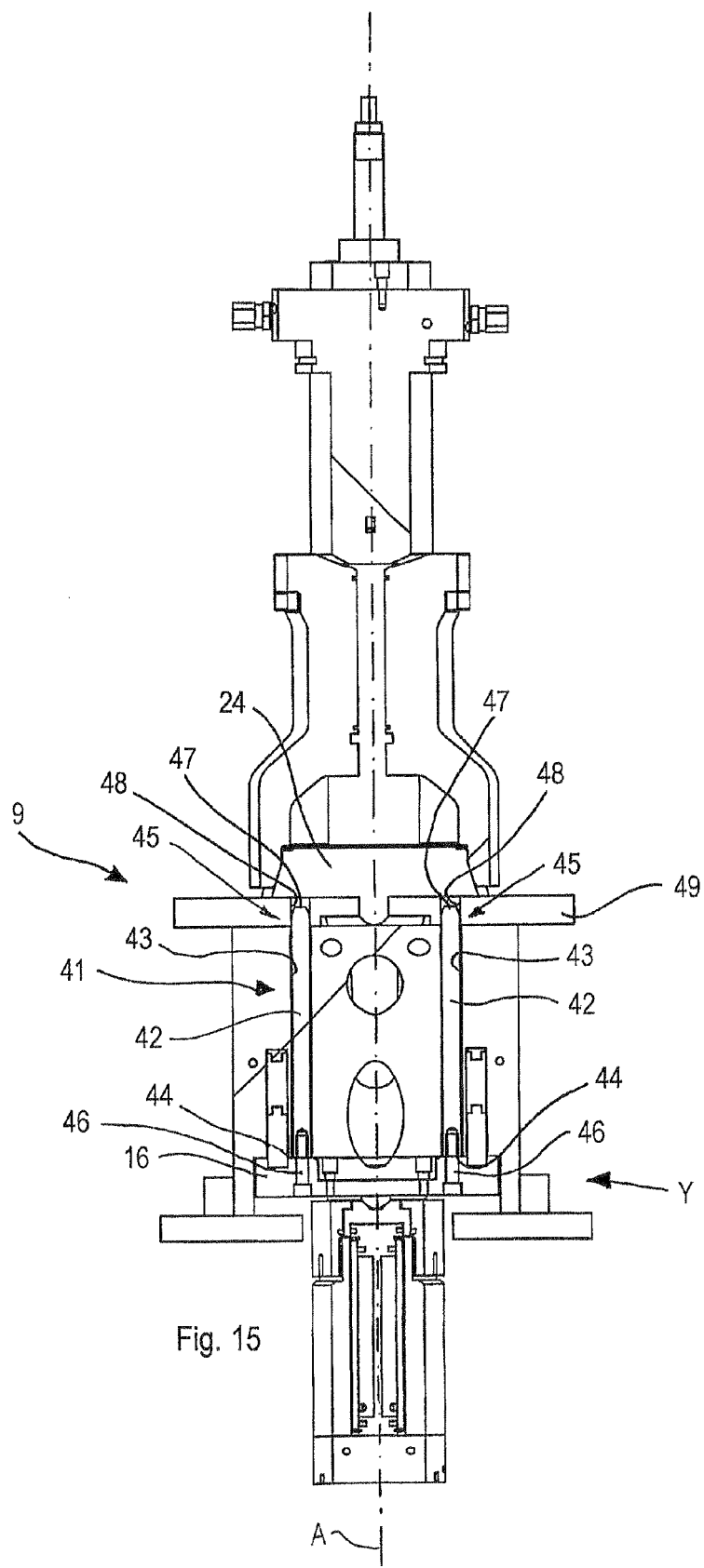
FIG. 15 is a section taken along a XV-XV plane in FIG. 14.

As shown in FIGS. 14 and 15, the die arrangement 9 is provided with closure elements 41 which centre the die arrangement 9 in relation to the neck forming arrangement 10 and maintain the die arrangement 9 in the closed configuration D.

The closing elements 41 comprise rods 42 positioned substantially parallel to the longitudinal axis A and sliding inside seats 43 made in the first half-mould 12 and the second half-mould 13.

The seats 43 have first openings 44 facing the first mobile bottom element 16, or the second mobile bottom element 20, and second openings 45 facing the further first half-mould 24, or the further second half-mould 25.

Pins 46 lead away from the first mobile bottom element 16 and the second mobile bottom element 20, said pins 46 being arranged for being received in the seats 43 through the first openings 44.

When the first mobile bottom element 16 and the second mobile bottom element 20 are brought to the operating configuration Y, the pins 46 interact with the rods 42 causing end portions 47 of the rods 42 to penetrate inside holes 48 made in a plate 49 fixed to the further first half-mould 24 and the further second half-mould 25.

The closing elements 41 make it possible to maintain the first half-mould 12 and the second half-mould 13 in the closed configuration D efficiently.

In particular, the closing elements 41 prevent the further moving device from having to act for a longer time to maintain the first half-mould 12 and the second half-mould 13 in contact with each other.

In an embodiment that is not shown, the closing elements comprise wedge-shaped elements arranged for being received in correspondingly shaped seats so that the die arrangement 9 can be centered more easily in relation to neck forming arrangement 10.

As shown in FIG. 11, the stretching rod 50 bears the forming element 30 at one end.

The stretching rod 50 assumes a retracted configuration F in which an operating surface 51 of the forming element 30 rests on a corresponding upper operating surface 52 of a tubular element 53 of the punch 7 inside which the stretching rod 50 slides.

Figure 12:
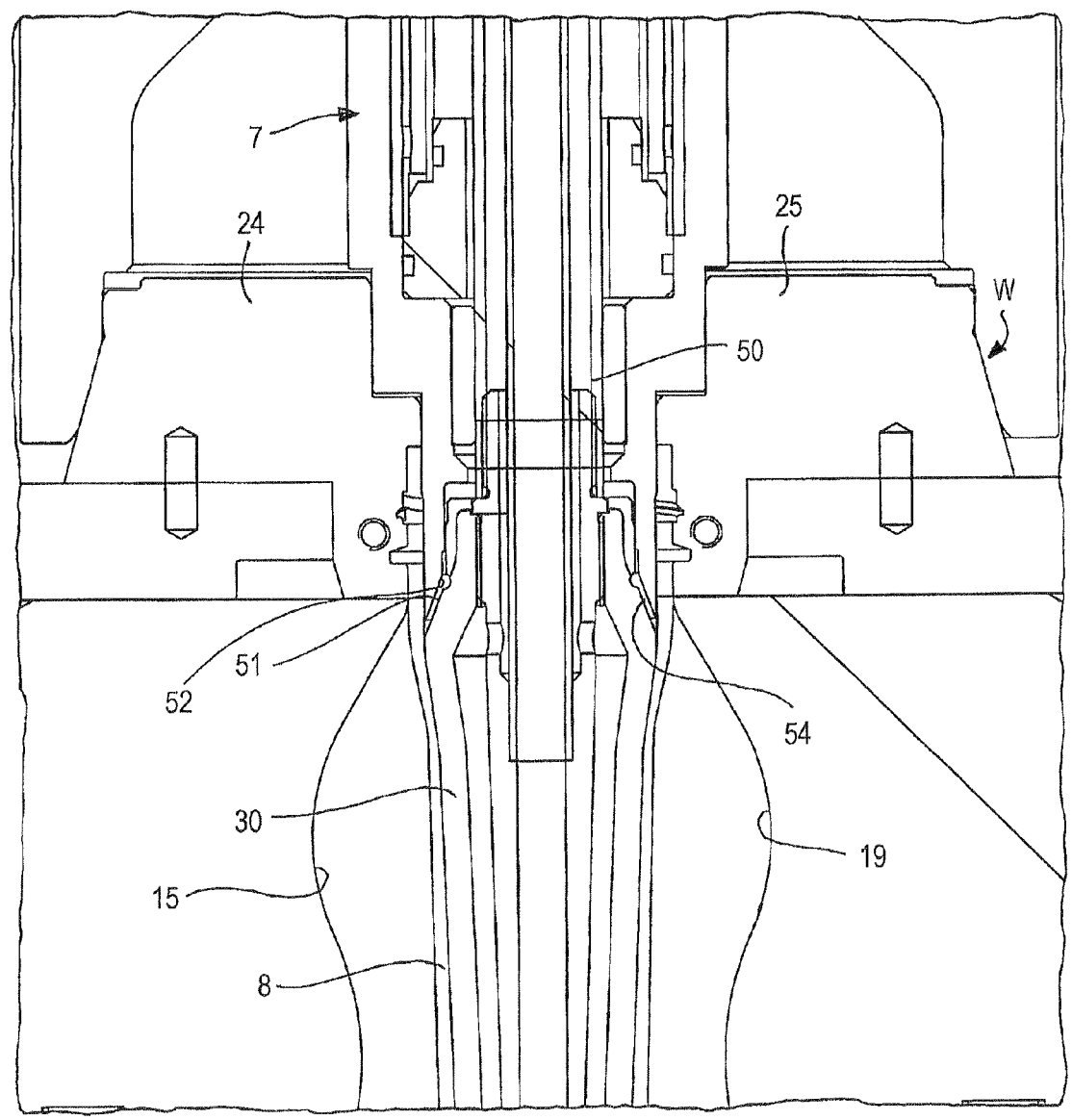
FIG. 12 is a partial longitudinal section of the apparatus in FIG. 1 in a further step of the working cycle.

In a step of the working cycle shown in FIG. 12, the punch 7 is in the lower end stop position T3, the blocking element 31 is in the upper position M, the supporting block is in the second operating position Q2, the further first half-mould 24 and the further second half-mould 25 are in the forming configuration W, the first half-mould 12 and the second half-mould 13 are in the closed configuration D and the further die arrangement 5 are in the blocking position H.

The stretching rod 50 is moved downwards in such a way that between the operating surface 51 and the further operating surface 52 a passage 54 is defined for supplying fluid under pressure into the container preform 8 for performing a preliminary step in which the container preform 8 is blown or stretch-blow-moulded.

Figure 7:
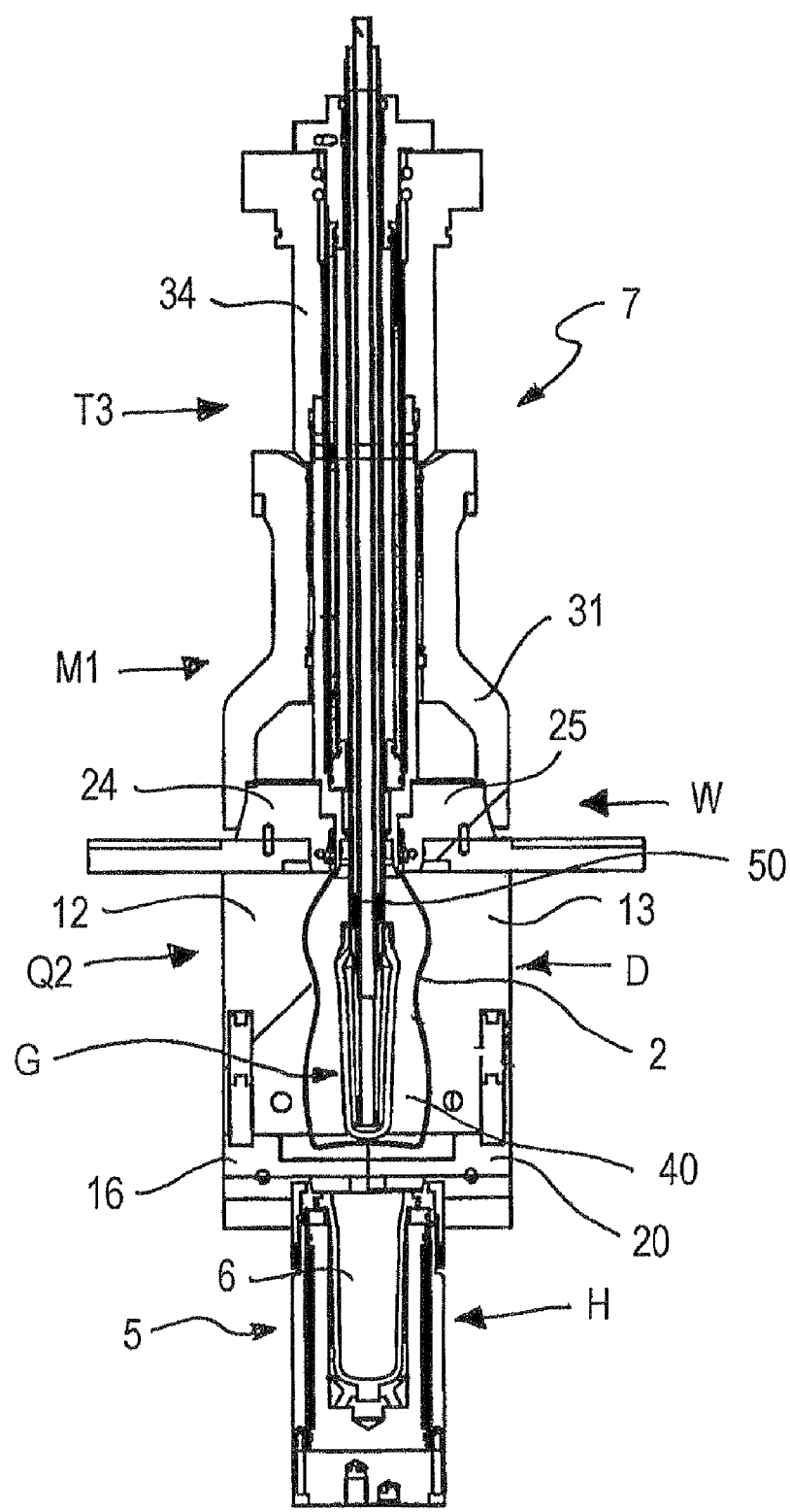
Figure 13:
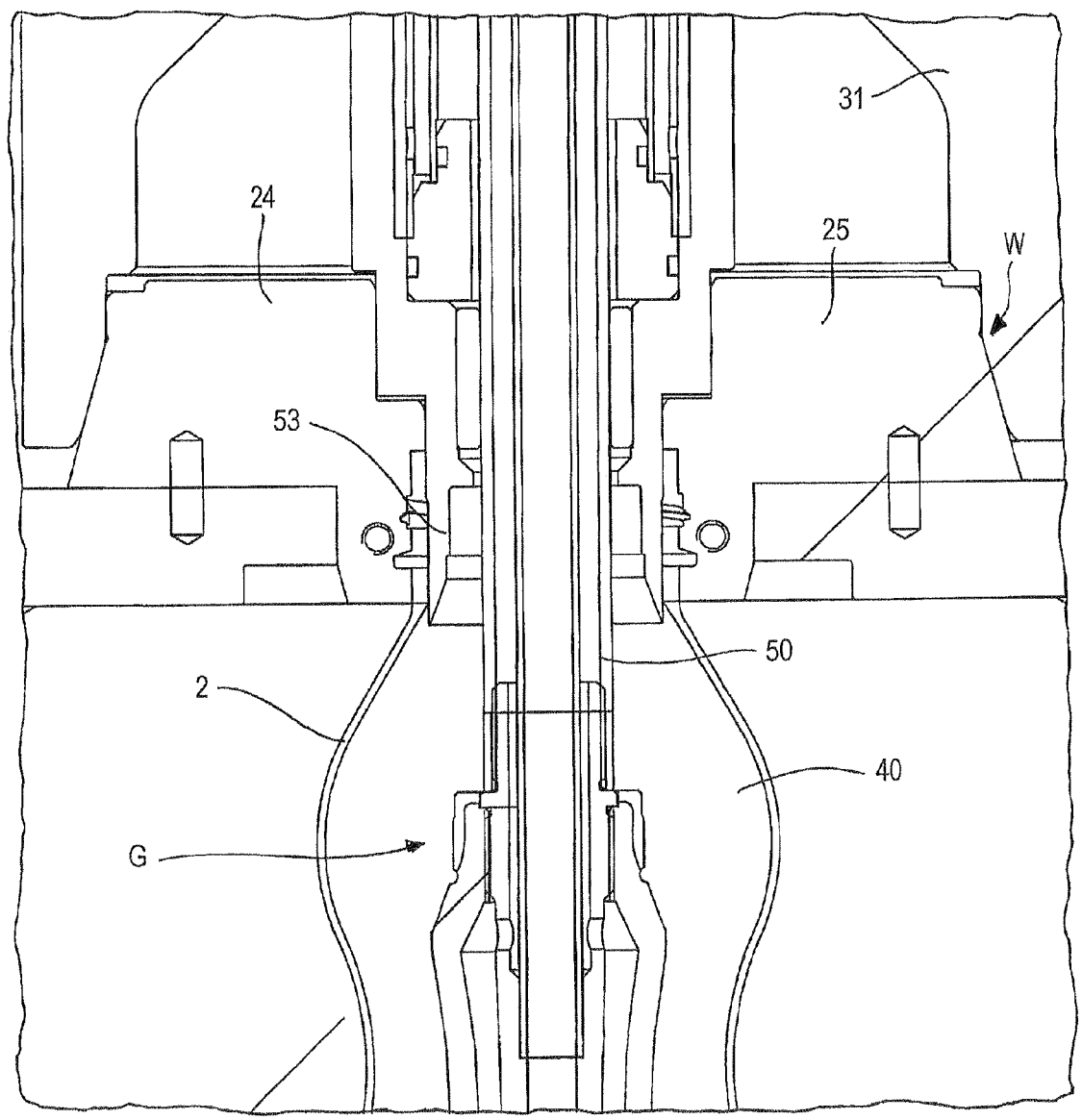
FIG. 13 is a detail of FIG. 7.

In a subsequent step of the working cycle shown in FIGS. 7 and 13, the punch 7 is in the lower end stop position T3, the blocking element 31 is in the upper position M, the supporting block is in the second operating position Q2, the further first half-mould 24 and the further second half-mould 25 are in the forming configuration W, the first half-mould 12 and the second half-mould 13 are in the closed configuration D and the further die arrangement 5 are in the blocking position H.

The stretching rod 50 is moved further downwards to assume an extended configuration G.

In this manner, the moulding element 30 stretches the container preform 8 while the pressurized fluid, which is supplied through conduits made in the punch 7, penetrates into the container preform 8 to expand the latter inside the chamber 40.

The container preform 8 is deformed until it assumes the shape of the chamber 40 to create a container 2.

In a successive step of the working cycle shown in FIG. 8, the punch 7 is in the lower end stop position T3, the blocking element 31 is in the upper position M, the supporting block is in the second operating position Q2, the further first half-mould 24 and the further second half-mould 25 are in the forming configuration W.

The moving device moves the further die arrangement 5 from the blocking position H to the lowered position K.

The first elastic element 17 and the second elastic element 21 move the first bottom element 16 and the second bottom element 20 respectively from operating configuration Y to rest configuration X.

The further moving device moves the first half-mould 12 and the second half-mould 13 from the closed configuration D to the open configuration C.

The stretching rod 50 is restored to the retracted configuration F.

The container 2 is retained by the further first half-mould 24 and by the further second half-mould 25 which lock the neck portion 11.

In a successive step of the working cycle shown in FIG. 9, the blocking element 31 is in the upper position M, the first half-mould 12 and the second half-mould 13 are in the open configuration C and the further die arrangement 5 are in the lowered position K.

The driving device 34 moves the punch 7 from the lower end stop position T3 to the upper end stop position T1.

The supporting block moves from the second operating position Q2 to the first operating position Q1.

The still further moving device moves the further first half-mould 24 and the further second half-mould 25 from the forming configuration W to the release configuration Z.

The container 2 is removed from the further first half-mould 24 and the further second half-mould 25 and a further dose 37 is inserted inside the receiving element 6.

The apparatus can thus start a new working cycle.

A further operating mode of the apparatus 1 is disclosed with reference to FIGS. 16 to 23.

In an initial step of a working cycle, shown in FIG. 16, the further die arrangement 5 is arranged in the lowered position K in which a dose 37 of plastics in a pasty state is inserted in the receiving element 6.

The first half-mould 12 and the second half-mould 13 are in the open configuration C.

The further first half-mould 24 and the further second half-mould 25 are in the release configuration Z.

The supporting block is in an operating position S1, in which the further first half-mould 24 and the further second half-mould 25 do not interact with the blocking element 31.

The punch 7 is kept in a fixed position throughout the duration of the working cycle.

The blocking element 31—freely slidable on the punch 7—is maintained in a further lower position N1 by an elastic element that is not shown.

Figure 17:
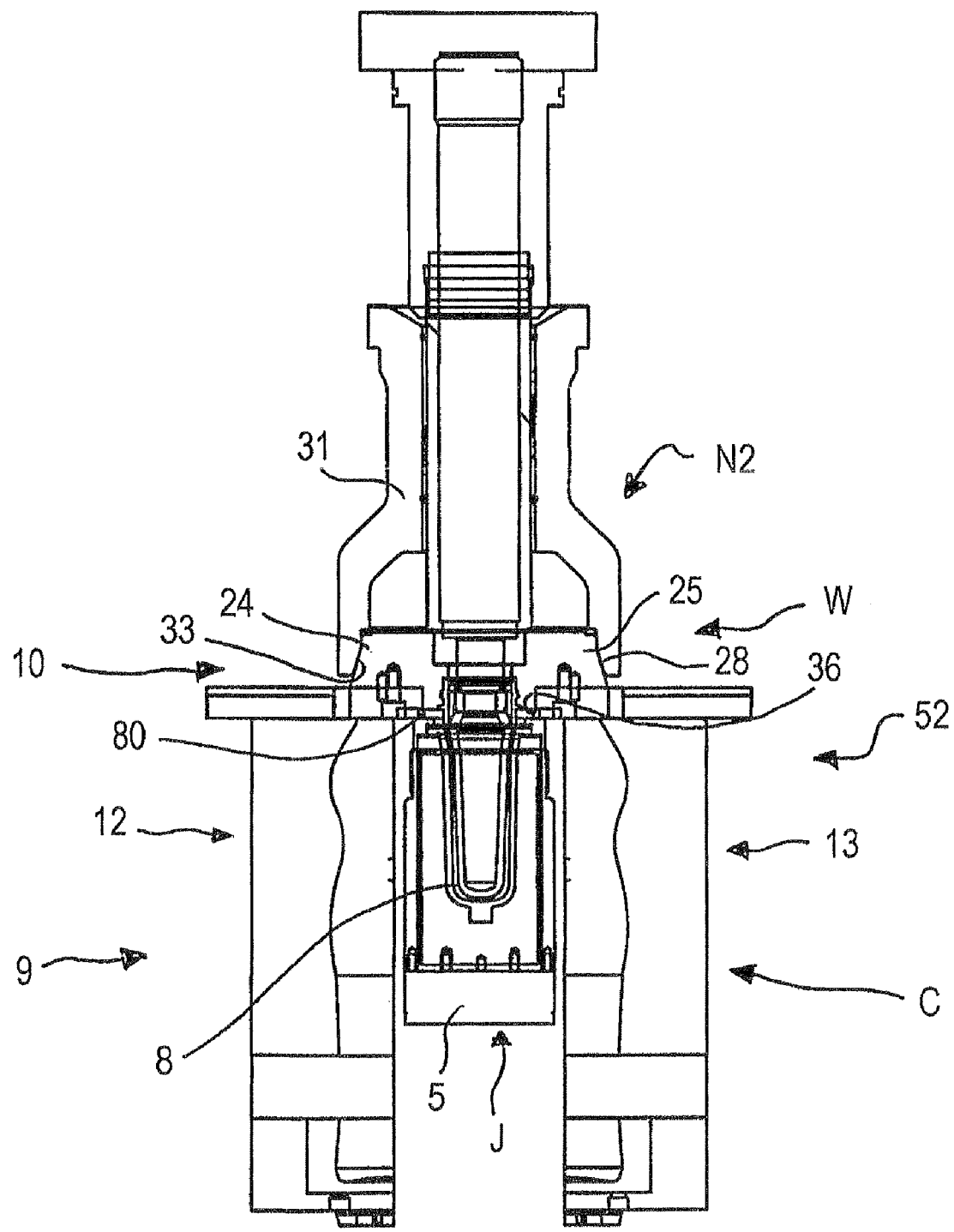

Subsequently, the further driving device bring the further first half-mould 24 and the further second half-mould 25 to the forming configuration W, as shown in FIG. 17.

The moving device moves the further die arrangement 5 from the lowered position K to the raised position J, in which the further die arrangement 5 interacts with the neck forming arrangement 10.

The further die arrangement 5 raises the neck forming arrangement 10, by overcoming the resistance of the elastic element, so that the supporting block—and consequently the first half-mould 12, the second half-mould 13, the further first half-mould 24 and the further second half-mould 25 fixed thereto—is brought to a further operating position S2, corresponding to a further upper position N2 of the blocking element 31.

When the supporting block is in the further operating position S2, the further conical surface 33 interacts with the further conical surface portions 28.

The forming element 30 is received in the neck forming arrangement 10 and in the further die arrangement 5 so that the dose 37 is compression-moulded to obtain a container preform 8.

In the raised position J, the conical surface 36 engages with corresponding conical zones 80 of the further first half-mould 24 and the further second half-mould 25 contributing to keeping the further half-mould 24 and the further second half-mould 25 in the forming configuration W.

The first half-mould 12 and the second half-mould 13 are maintained in the open configuration C.

Subsequently, as shown in FIG. 18, the moving device moves the further die arrangement 5 from the raised position J to the lowered position K.

The supporting block is maintained in the further operating position S2.

The further conical surface 33 interacts with the further conical surface portions 28 in such a way as to contribute to keeping the further first half-mould 24 and the further second half-mould 25 in the forming configuration W.

The first half-mould 12 and the second half-mould 13 are kept in the open configuration C.

The neck portion 11 of the container preform 8 is locked between the further first half-mould 24 and the further second half-mould 25.

The forming element 30 is kept inside the container preform 8 which has just been formed.

An internal surface of the container preform 8 adheres to a corresponding external surface of the forming element 30.

Figure 19:
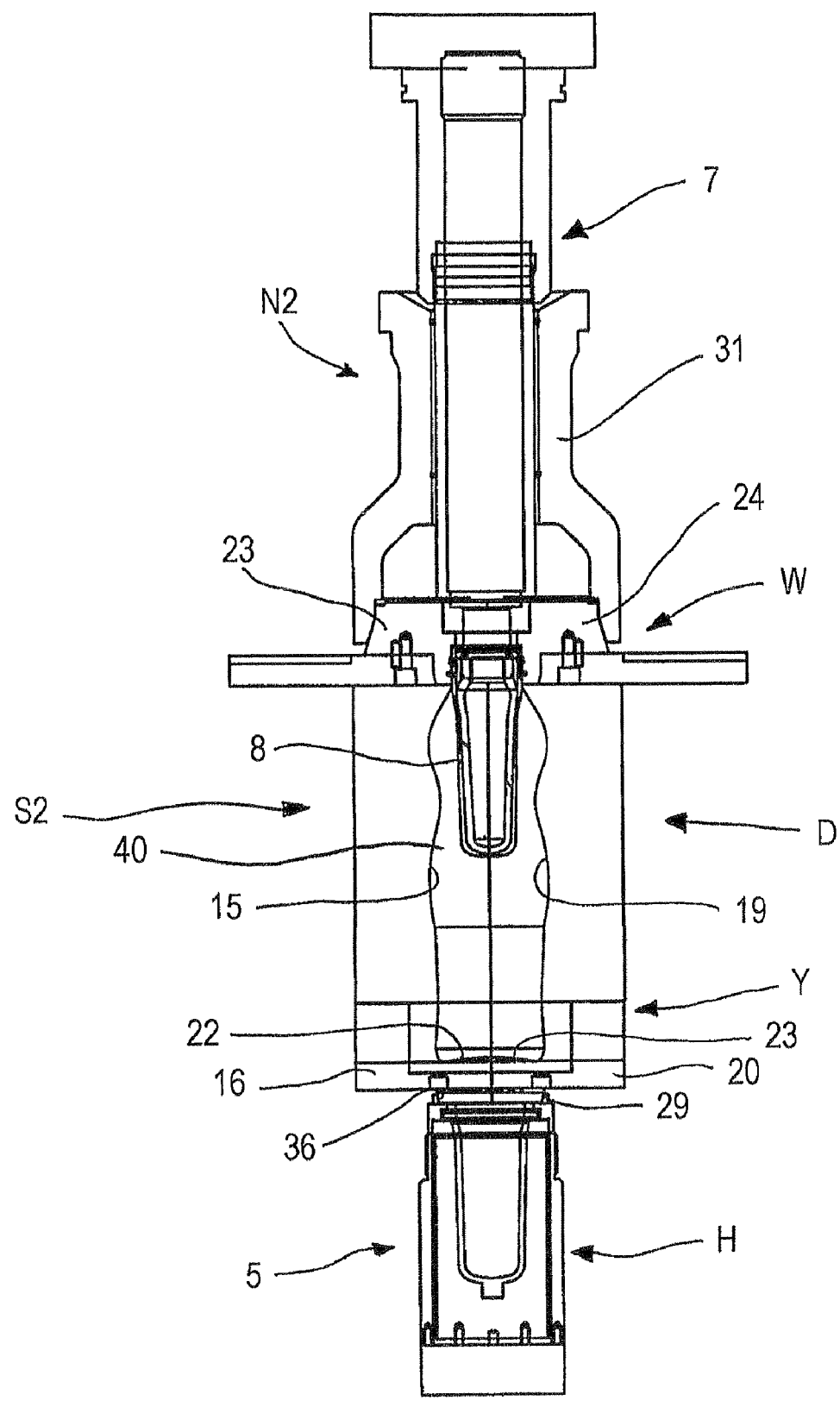

In a successive step of the working cycle shown in FIG. 19, the supporting block is in the further operating position S2, the blocking element 31 is in the further upper position N2, the further first half-mould 24 and the further second half-mould 25 are in the forming configuration W.

The further moving device brings the first half-mould 12 and the second half-mould 13 from the open configuration C to the closed configuration D, so that the first forming cavity 15, the second forming cavity 19, the further first forming cavity 22 and the further second forming cavity 23 delimit—after the first bottom element 16 and the second bottom element 20 have assumed the operating configuration Y—the chamber 40 of the die arrangement 9 inside which chamber the container preform 8 is subsequently expanded.

The moving device moves the further die arrangement 5 from the lowered position K to the blocking position H in which the further die arrangement 5 interacts with the die arrangement 9.

The further die arrangement 5, passing from the lowered position K to the blocking position H, interacts with the first bottom element 16 and the second bottom element 20 in such a way as to move the first bottom element 16 and the second bottom element 20 from the rest configuration X to the operating configuration Y.

In the blocking position H the conical surface 36 interacts with the conical surface portions 29 in such a way as to contribute to maintain the first half-mould 12 and the second half-mould 13 in the closed configuration D.

Figure 23:
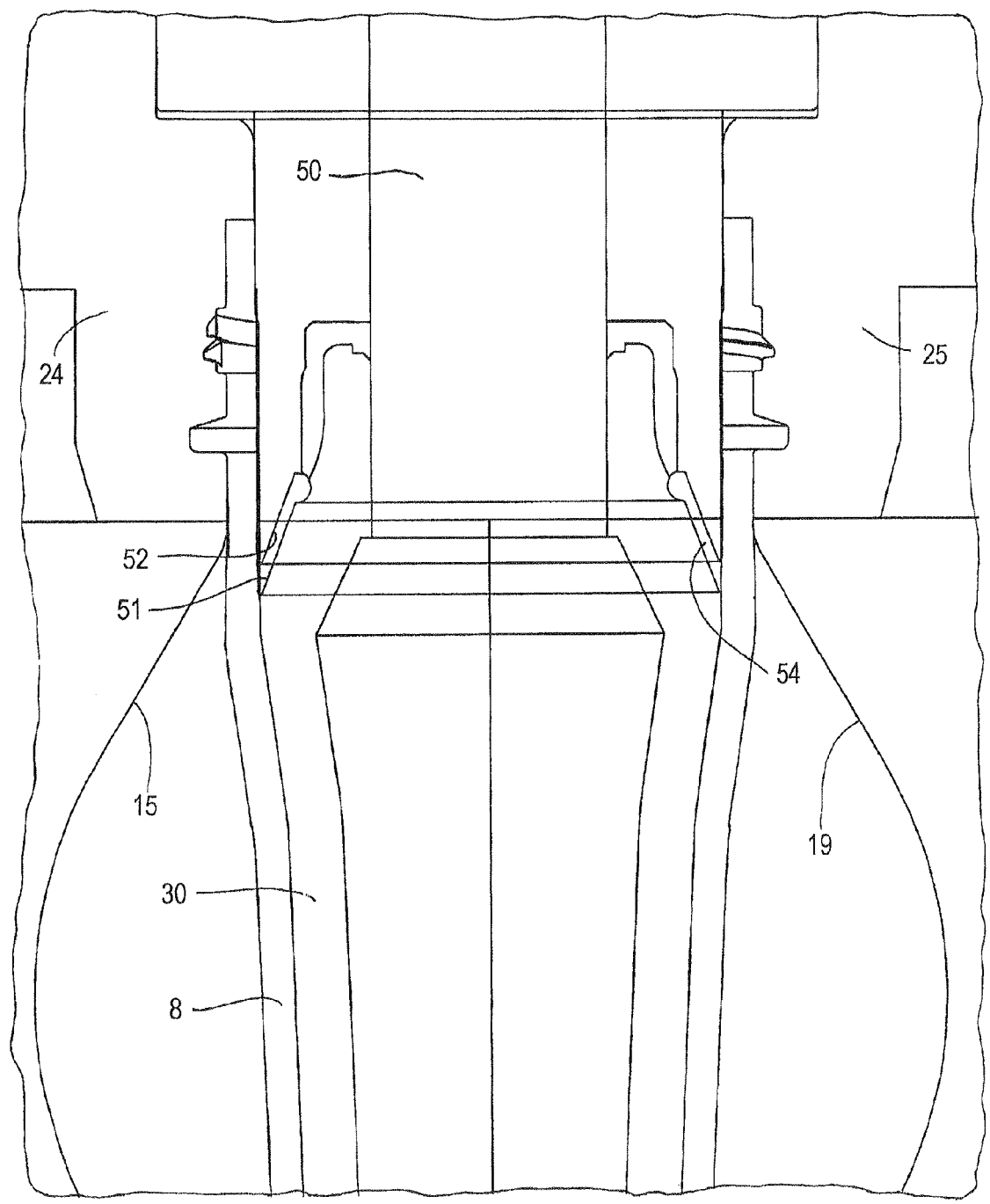
FIG. 23 is a partial longitudinal section of the apparatus in FIG. 1 in a still further step of the working cycle.

In a successive step of the working cycle shown in FIG. 23, the supporting block is in the further operating position S2, the blocking element 31 is in the further upper position N2, the further first half-mould 24 and the further second half-mould 25 are in the forming configuration W, the first half-mould 12 and the second half-mould 13 are in the closed configuration D and the further die arrangement 5 is in the blocking position H.

The stretching rod 50 is moved downwards starting from the retracted configuration F, in such a way that between the operating surface 51 and the further operating surface 52 a passage 54 is defined for supplying a pressurized fluid into the container preform 8 for carrying out a preliminary step in which the container preform 8 is blown or stretch-blow-moulded.

Figure 20:
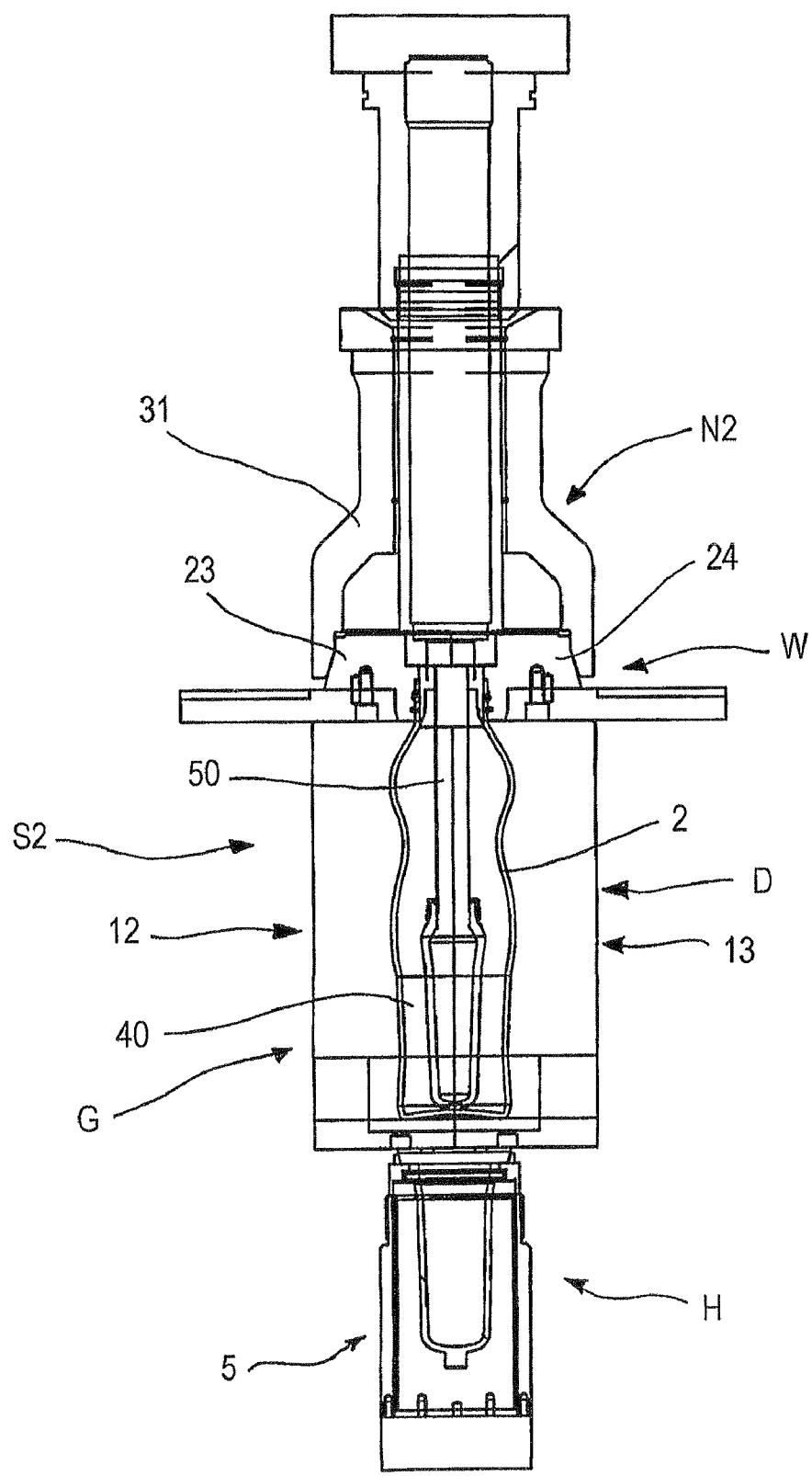

In a subsequent step of the working cycle shown in FIG. 20, the supporting block is in the further operating position S2, the blocking element 31 is in the further upper position N2, the further first half-mould 24 and the further second half-mould 25 are in the forming configuration W, the first half-mould 12 and the second half-mould 13 are in the closed configuration D and the further die arrangement 5 are in the blocking position H.

The stretching rod 50 is moved further downwards to assume an extended configuration G.

The forming element 30 thus stretches the container preform 8 while the pressurized fluid, which is supplied through conduits obtained in the punch 7, penetrates the container preform 8 to expand the latter inside the chamber 40.

The container preform 8 is deformed until it assumes the shape of the chamber 40 to create a container 2.

In a subsequent step of the working cycle shown in FIG. 21, the further first half-mould 24 and the further second half-mould 25 are in the forming configuration W, the first half-mould 12 and the second half-mould 13 are in the closed configuration D.

The stretching rod 50 is shown in the retracted configuration F.

The moving device moves the further die arrangement 5 from the blocking position H to the lowered position K.

The first elastic element 17 and the second elastic element 21 move the first bottom element 16 and the second bottom element 20, respectively, from the operating configuration Y to the rest configuration X.

The supporting block moves from the further operating position S2 to the operating position S1.

The elastic element moves the blocking element 31 from the further upper position N2 to the further lower position N1.

In a subsequent step of the working cycle shown in FIG. 22, the supporting block is in the operating position S1, the blocking element 31 is in the further lower position N1, the first half-mould 12 and the second half-mould 13 are in the open configuration C and the further die arrangement 5 are in the lowered position K.

The further moving device moves the first half-mould 12 and the second half-mould 13 from the closed configuration D to the open configuration C.

The still further moving device moves the further first half-mould 24 and the further second half-mould 25 from the forming configuration W to the release configuration Z.

The container 2 is retained by a positioning arrangement 90.

Subsequently the container 2 is removed by the positioning arrangement 90 and a further dose 37 is inserted into the receiving element 6.

The positioning arrangement 90 makes it possible to identify with precision a removal position at which the containers 2 are removed from the apparatus 1.

Apparatus 1 can thus start a new working cycle.

Figure 24:
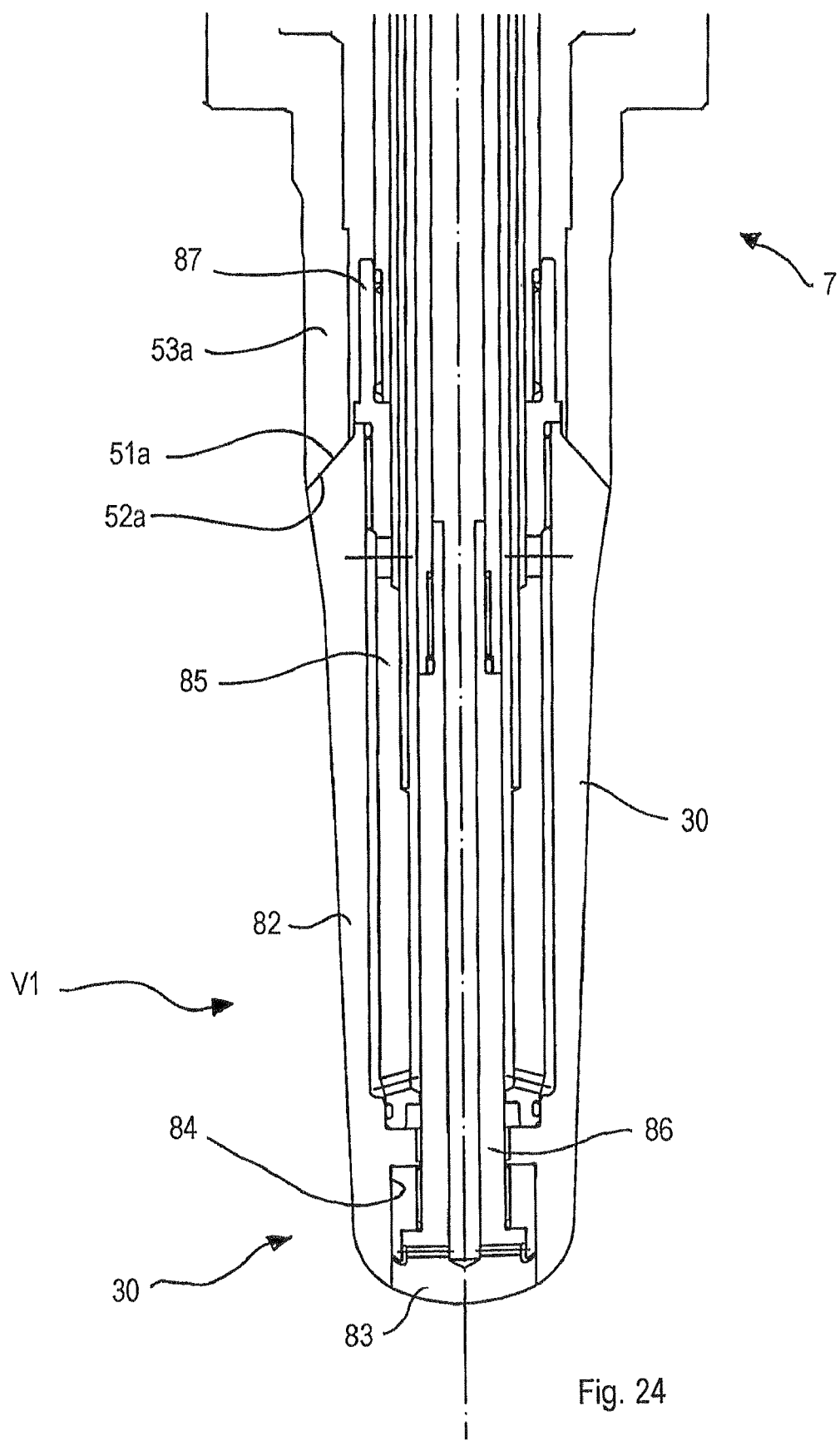
FIG. 24 is a longitudinal section showing a stretching arrangement in an operating configuration.
Figure 25:
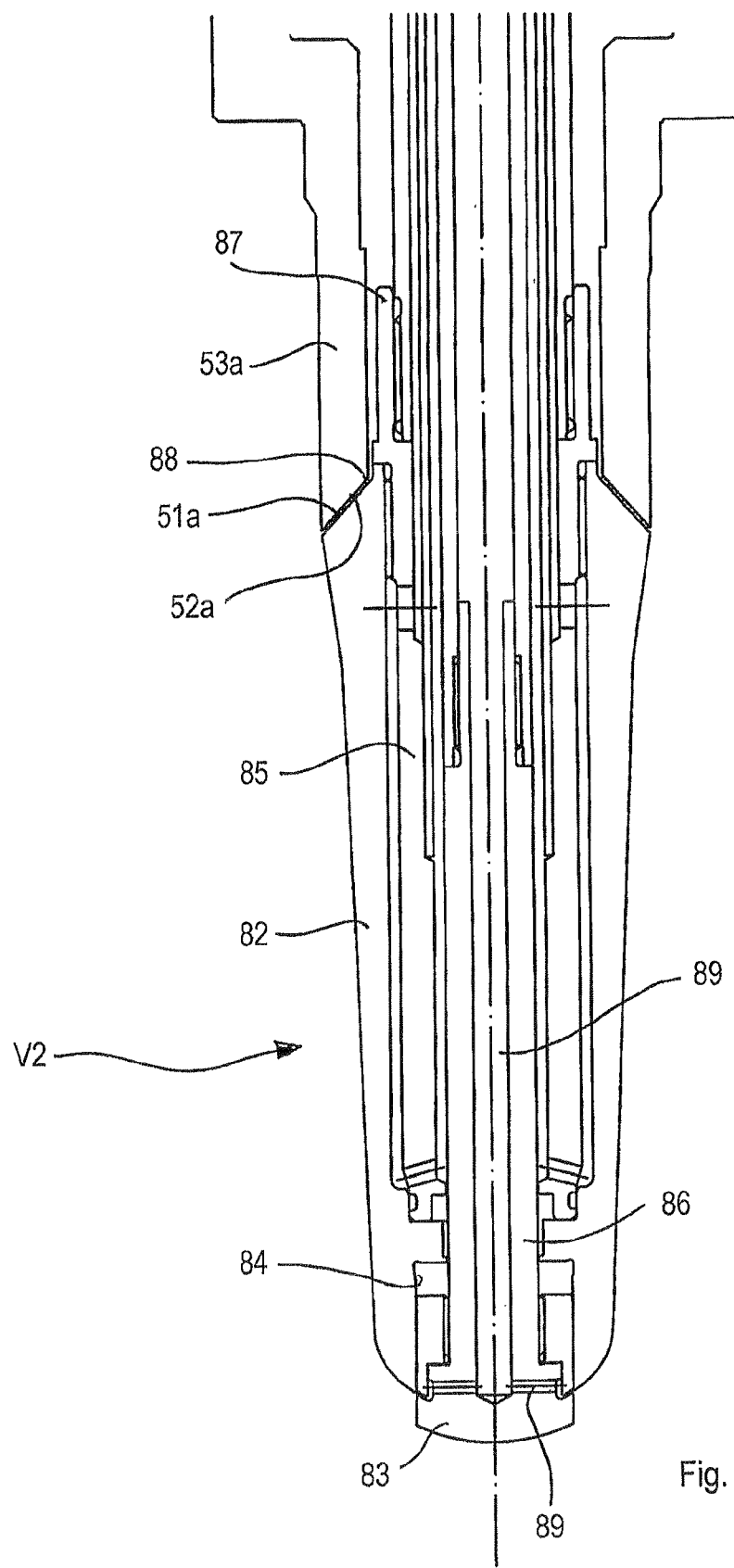
FIG. 25 is a section like the one in FIG. 24 showing the stretching arrangement in a further operating configuration.
Figure 26:
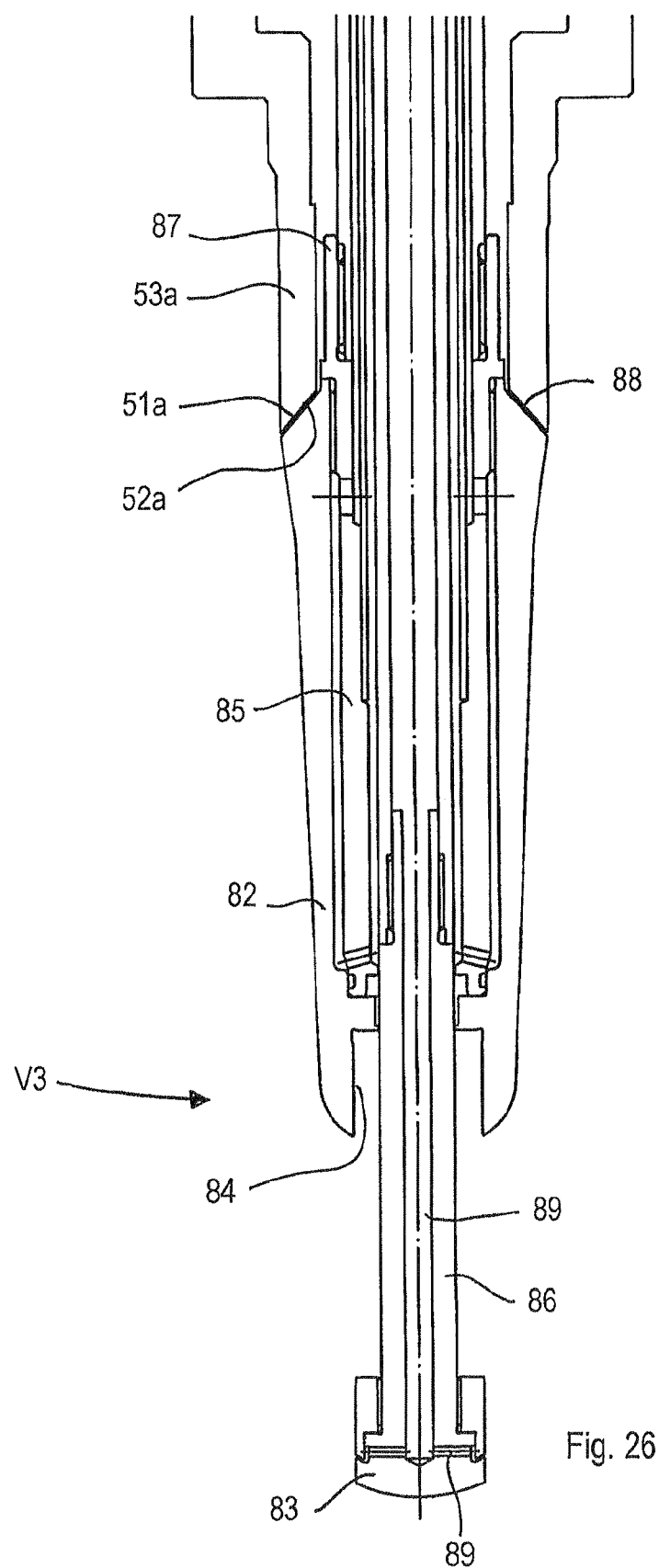
FIG. 26 is a section like the one in FIG. 24 showing the stretching arrangement in a still further operating configuration.

With reference to FIGS. 24 to 26, an embodiment is shown of the punch arrangement 7 in which the forming element 30 comprises a first forming body 82 and a second forming body 83.

In the first forming body 82 a seat 84 is made inside which the second forming body 83 can slide.

The stretching rod 50 comprises a first actuator member 85 to which the first forming body 82 is fixed and a second actuator member 86 to which the second forming body 83 is fixed.

The first actuator member 85 is tube-shaped and has an inside cavity which houses the second actuator member 86, so that the second actuator member 86 is slidable in relation to the first actuator member 85.

In an initial step of an expansion cycle of a container preform 8, shown in FIG. 24, the forming element 30 assumes an operating configuration V1, in which an operating surface 51a of the first forming body 82 rests on a corresponding further operating surface 52a of a tubular element 53a of the punch 7 inside which one end 87 of the first actuator member 85 can slide.

In the operating configuration V1 the second forming body 83 is received in the seat 84.

In the operating configuration V1 the first forming body 82 and the second forming body 83 do not stretch the container preform 8.

Furthermore, in the operating configuration V1 the preform is not expanded by blowing pressurized fluid.

In a subsequent step of the expansion cycle of the container preform 8, shown in FIG. 25, the forming element 30 assumes a further operating configuration V2, in which the first actuator member 85 moves the first forming body 82 away from the tubular element 53a, so that between the operating surface 51a and the further operating surface 52a a passage 88 is defined for supplying a pressurized fluid flow inside the container preform 8.

The above-mentioned pressurized fluid flow interacts with a first zone of the container preform 8, for example, a zone of the container preform 8 near the neck portion 11.

In the further operating configuration V2, furthermore, the second actuator member 86 moves the second forming body 83 away from the first forming body 82.

The second forming body 83 projects out of the seat 84 in such a way that a further pressurized fluid flow is introduced inside the container preform 8 by a conduit 89 which pass through the second actuator member 86 and the second forming body 83.

The above-mentioned further pressurized fluid flow interacts with a second zone of the container preform 8, for example, a zone of the container preform 8 opposite the neck portion 11.

In a still further successive step of the expansion cycle of the container preform 8, shown in FIG. 26, the forming element 30 assumes a still further operating configuration V3, in which the second actuator member 86 moves the second forming body 83 further away from the first forming body 82, in such a way as to stretch the container preform 8.

While the second forming body 83 moves away from the first forming body 82, the further pressurized fluid flow—together with the above-mentioned pressurized fluid flow—expands the container preform 8 completely in such a way as to give the container preform 8 the shape of the chamber 40 to create the container 2.

In the still further operating configuration V3, the first actuator member 85 maintains the first forming body 82 at a certain distance from the tubular element 53a, in such a way that the pressurized fluid flow continues to flow into the container preform 8 through the passage 88.

Since the forming element is made up of two parts—i.e. it comprises the first forming body 82 and the second forming body 83—it is possible to control the stretching action exerted at two different zones of the container preform 8, so as to improve the expansion of the container preform 8.

Furthermore, since two separate flows of forming fluid are used directed towards two separate zones of the container preform 8—i.e. the first fluid flow directed towards a neck zone and the second fluid flow directed towards an end zone—it is possible to control very precisely the modes in which the container preform 8 is expanded.

Figure 40:
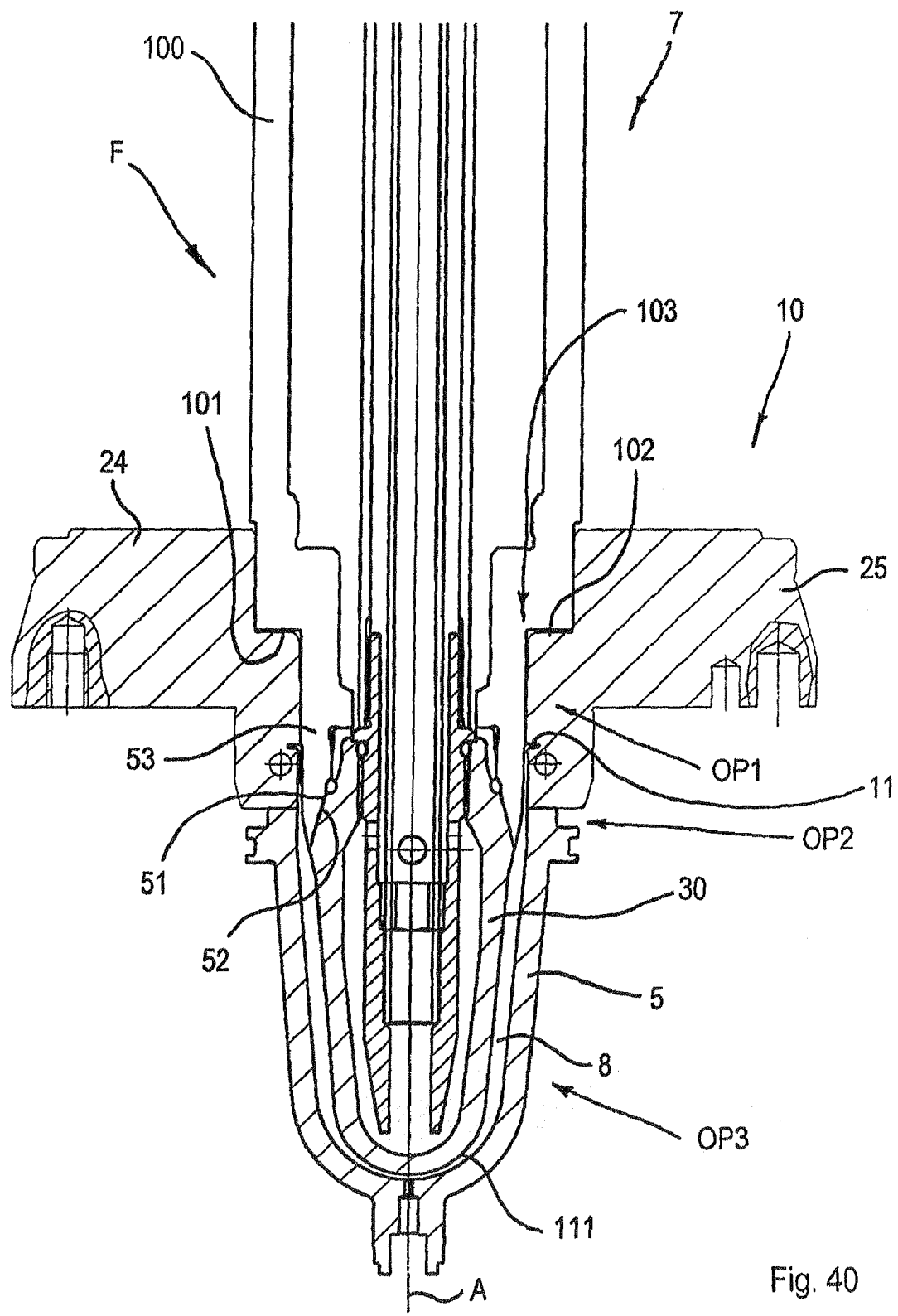
FIG. 40 is a longitudinal section showing the apparatus in an operating configuration.

With reference to FIG. 40, the punch 7 is shown in greater detail which comprises a body 100 from one end of which the tubular element 53 leads away.

The stretching rod 50, passing through the body 100 and the tubular element 53, carries the moulding element 30 at one end thereof.

The forming element 30 comprises the operating surface 51, which, when the stretching rod 50 is in the retracted configuration F, rests on the further operating surface 52 of the tubular element 53.

The body 100 is provided with an abutting surface 101 arranged for interacting with a stop surface 102 of which the neck forming arrangement 10 is provided.

The forming element 30 and the tubular element 53 are movable along the longitudinal A axis, independently of one another.

The forming element 30 and the tubular element 53 cooperate to define a forming punch arrangement 103.

In particular, the tubular element 53 forms a part of the container preform 8 nearest to an opening of the preform 8—i.e. an internal wall of the preform 8 arranged near the neck portion 11 of the preform 8—while the forming element forms a part of the container preforms farthest away from the above-mentioned opening.

FIG. 40 shows the same step of the working cycle like that shown in FIGS. 4 and 17, i.e. the compression-moulding step of the dose 37 of plastics to obtain a preform 8.

At the end of the compression-moulding step, the tubular element 53 is in an operating position OP1 in which the abutting surface 101 is in contact with the stop surface 102, the forming element 30 is in a further operating position OP2 in which the active surface 51 is in contact with the further active surface 52 and the further die arrangement 5 are in a still further operating position OP3, corresponding to the raised position J disclosed with reference to FIGS. 4 and 17.

At the end of the compression-moulding step, therefore, the preform 8 is compressed between the forming tools, i.e. the neck forming arrangement 10, the tubular element 53, the forming element 30 and the further die arrangement 5.

Since the temperatures of the above-mentioned forming tools are different from the temperature of the plastics, a non-uniform temperature profile is created between an internal zone and the (internal and external) walls of the preform 8.

The aforementioned non-uniform temperature profile—measured radially as well as axially in relation to the preform 8—does not correspond to the optimum conditions for the subsequent blowing or stretch-blow-moulding step of the preform 8. A better condition for the blowing or stretch-blow-moulding step will be obtained in case of a completely uniform temperature profile, i.e. if there is no difference in temperature between the internal zone and the walls of the preform.

It was observed that, subsequent to the compression-moulding and the dimensional contraction due to shrinking of the plastics, the preform shrinks on the forming punch arrangement 103, i.e. on the tubular element 53 and on the forming element 30.

To this effect a further effect is also added consisting of the mechanical stretching action (generated by the movement of the forming element 30 and, to a lesser extent, by the movement of the tubular element 53) which tends to cause the preform to shrink further on the forming punch arrangement 103.

Due to the two effects disclosed above it is possible that, during the expansion of the preform to obtain a container, the plastics surrounding the forming element 30—in particular the plastics which forms a bottom zone 111 of the preform 8 opposite the aforementioned opening—gets detached from the latter much later as compared to the remaining plastics—or even does not get detached at all—so as to result less stretched.

Consequently, the preform may have walls the thickness values of which vary axially as well as radially.

This could lead to unacceptable differences in the thickness between adjacent zones of the container obtained by expanding the preform and, in certain cases, tears and breakage of the container.

To overcome the aforementioned drawbacks—before starting with the blowing, or stretch-blow-moulding step, i.e. before expanding the preform to obtain a container—it is provided to retain the preform through the neck forming arrangement 10 and to detach the preform from the further die arrangement 5 and/or from the tubular element 53 and/or from the forming element 30.

This prevents parts of the preform from remaining attached to the forming punch arrangement 103 during the blowing or stretch-blow-moulding step, thus avoiding the formation of containers provided with walls in which the thickness values vary from one region to another of the containers in an unacceptable manner.

In addition, detachment of the preform from the forming tools, carried out by modes which will be disclosed in greater detail below, makes it possible to obtain a preform having a very limited temperature difference between an internal zone and the walls, which, as mentioned above, constitutes a particularly favourable condition for the blowing or stretch-blow-moulding step.

In particular, when the preform is detached from the further die arrangement 5 and/or from the tubular element 53 and/or from the forming element 30, the heat is transmitted from the innermost part to the walls, so that the innermost part, initially hotter, cools heating the walls, which were initially colder, until a more uniform temperature profile is reached.

Since the further die arrangement 5, the tubular element 53 and the forming element 30 are movable independently of one another, different combinations of the movements of forming tools are possible.

With reference to the FIG. 41, it is shown how, before the beginning of the blowing or stretch-blow-moulding step, the tubular element 53 is separated from the neck forming arrangement 10, after having moved from the operating position OP1, while the forming element 30 has not moved in relation to the neck forming arrangement 10 and has remained in the further operating position OP2.

The further die arrangement 5 are separated from the neck forming arrangement 10, after having moved from the further operating position OP3.

In particular, the body 100 has moved in relation to the neck forming arrangement 10 in such a way that there is a prefixed distance between the abutting surface 101 and the stop surface 102.

As shown in FIG. 41, the tubular element 53 is spaced apart from an internal wall 104 of the preform 8 and the further cavity arrangement 5 is spaced apart from an external wall 105 of the preform 8, which enables the preform 8 to assume a condition that is preliminary to the blowing or stretch-blow-moulding step, which is more favourable from the point of view of uniformity of the temperature profile compared with the case in which the tubular element 53 is maintained constantly in contact with the internal wall 104.

With the help of FIG. 41, it is possible to identify three operating modes corresponding to peculiar combinations of the movements of the forming tools.

In all the aforementioned operating modes, the tubular element 53 moves away from the neck forming arrangement 10—with an own law of motion—starting from the operating position OP1, while the forming element remains in the further operating configuration OP2 and does not move in relation to the neck forming arrangement 10.

In a first operating mode, the further die arrangement 5 moves away from the neck forming arrangement 10—with an own law of motion—starting from the still further operating position OP3, after a prefixed time following the beginning of the movement of the tubular element 53.

In a second operating mode, the further die arrangement 5 moves away from the neck forming arrangement 10—with an own law of motion—starting from the still further operating position OP3, substantially simultaneously with the beginning of the movement of the tubular element 53.

In a third operating mode, the further die arrangement 5 moves away from the neck forming arrangement 10—with an own law of motion—starting from the still further operating position OP3, before the tubular element 53 starts moving. The tubular element 53 starts moving after a prefixed time following the beginning of the movement of the further die arrangement 5.

As shown in FIG. 41, in the first operating mode, in the second operating mode and in the third operating mode, after the further cavity arrangement 5 has moved away from the neck forming arrangement 10, the tubular element 53 is not in contact with the preform 8 and the forming element 30 is in contact with the preform 8. In these operating configurations, the thermal balancing of the preform 8 is by convection in the external wall 105, by convection in a portion of the internal wall 104 which is spaced apart from the tubular element 53 and by conduction in a further portion of the internal wall 104 which is in contact with the forming element 30.

With reference to FIG. 42, it is shown how, before starting with the blowing or stretch-blow-moulding step, the tubular element 53 and the forming element 30 are separated from the neck forming arrangement 10, after having moved from the operating position OP1 and the further operating position OP2, respectively.

The further die arrangement 5 are separated from the neck forming arrangement 10, after having moved from the further operating position OP3.

In particular, the body 100 has moved in relation to the neck forming arrangement 10 in such a way that a prefixed distance has been interposed between the abutting surface 101 and the stop surface 102.

As shown in FIG. 42, the tubular element 53 and the forming element 30 are spaced apart from the internal wall 104 and the further cavity arrangement 5 are spaced apart from the external wall 105, which makes it possible to prevent some parts of the preform 8 from being stretched less than the remaining parts of the preform 8, giving rise to a container having walls with non-uniform thickness, and to improve the uniformity of the temperature profile of the preform 8 as compared with the case in which the tubular element 53 and the forming element 30 are maintained constantly in contact with the internal wall 104.

It should be noted that the tubular element 53 and the forming element 30 have conical external surfaces and cross sections which decrease from the body 100 towards the further die arrangement 5, along the longitudinal axis A.

As a result even extremely reduced movements of the tubular element 53 and the forming element 30 make it possible to ensure that there are no zones of contact between the aforementioned external surfaces and the internal surface 104.

With the help of FIG. 42, it is possible to identify three further operating modes corresponding to peculiar combinations of the movements of the forming tools.

In all the aforementioned further operating modes, the tubular element moves away from the neck forming arrangement 10—with an own law of motion—starting from the operating position OP1 and the forming element 30 moves away from the neck forming arrangement 10—with an own law of motion—starting from the further operating position OP2.

The laws of motion and the movements of the tubular element 53 and the forming element 30 may be similar or different to one another. The movement of the forming element 30 must be less than, or in case equal to, the movement of the tubular element 53.

FIG. 42 shows a configuration in which the movement of the forming element 30 is less than the movement of the tubular element 53.

If the movement of the forming element 30 is equal to the movement of the tubular element 53, the active surface 51 will come into contact with the further active surface 52.

In a fourth operating mode, the further die arrangement 5 moves away from the neck forming arrangement 10—with an own law of motion—starting from the still further operating position OP3, after a prefixed time from the beginning of the movement of the tubular element 53 and the movement of the forming element 30.

In a fifth operating mode, the further die arrangement 5 moves away from the neck forming arrangement 10—with an own law of motion—starting from the still further operating position OP3, substantially simultaneously with the beginning of the movement of the tubular element 53 and the movement of the forming element 30.

In a sixth operating mode, the further die arrangement 5 moves away from the neck forming arrangement 10—with an own law of motion—starting from the still further operating position OP3, before the tubular element 53 and the forming element 30 start moving. The tubular element 53 and the forming element 30 start moving after a prefixed time following the beginning of the movements of the further die arrangement 5.

As shown in FIG. 42, in the fourth operating mode, in the fifth operating mode and in the sixth operating mode, after the further cavity arrangement 5 has moved away from the neck forming arrangement 10, the tubular element 53 and the forming element 30 are not in contact with the preform 8. In these operating configurations, the thermal balancing of the preform 8 is by convection in the external wall 105 and by convection in the internal wall 104.

With reference to FIG. 43, it is shown how, before the start of the blowing or stretch-blow-moulding step, the tubular element 53 and the forming element 30 have not moved in relation to the neck forming arrangement 10 and have remained in the operating position OP1 and the further operating position OP2, respectively.

The further die arrangement 5 are separated from the neck forming arrangement 10, after having moved from the further operating position OP3.

In particular, the body 100 has not moved in relation to the neck forming arrangement 10, since the abutting surface 101 is in contact with the stop surface 102.

As shown in FIG. 43, the further cavity arrangement 5 is spaced apart from the external wall 105 of the preform 8, which makes it possible to improve the uniformity of the temperature profile of the preform 8.

With the help of FIG. 43, it is possible to identify a seventh operating mode corresponding to a peculiar combination of the movements of the forming tools.

In this seventh operating mode, the tubular element 53 remains in operating configuration OP1 and does not move in relation to the neck forming arrangement 10, the forming element 30 remains in the further operating configuration OP2 and does not move in relation to the neck forming arrangement 10, and the further die arrangement 5 moves away from the neck forming arrangement 10—with an own law of motion—starting from the still further operating position OP3.

As shown in FIG. 43, in the seventh operating mode, after the further cavity arrangement 5 has moved away from the neck forming arrangement 10, the tubular element 53 and the forming element 30 are in contact with the preform 8. In this operating configuration, the temperature balancing of the preform 8 is by convection in the external wall 105 and by conduction in the internal wall 104.

Figure 44:
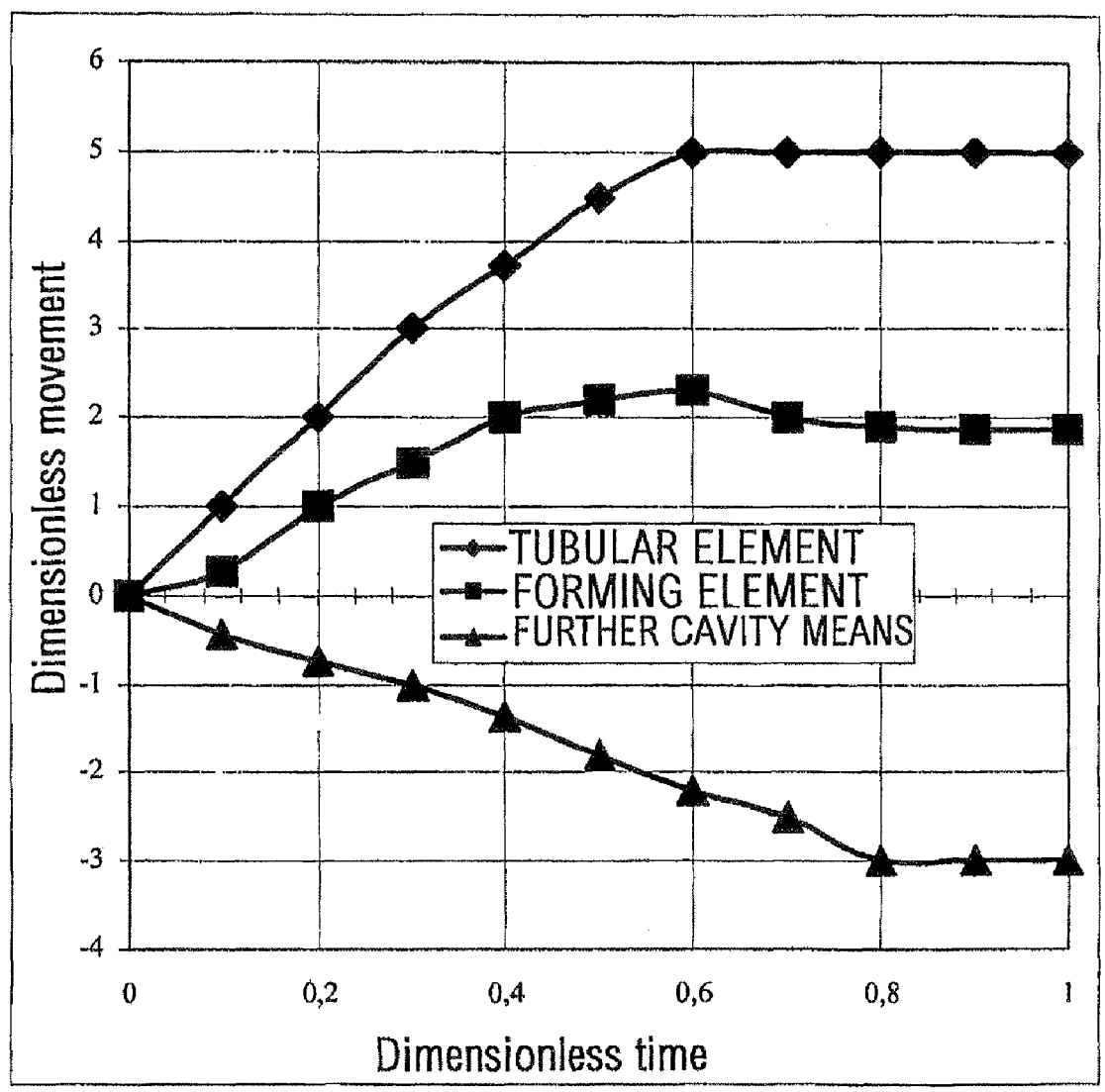
FIG. 44 is a graph showing a combination of movements of forming tools of the apparatus as a function of time.
Figure 45:
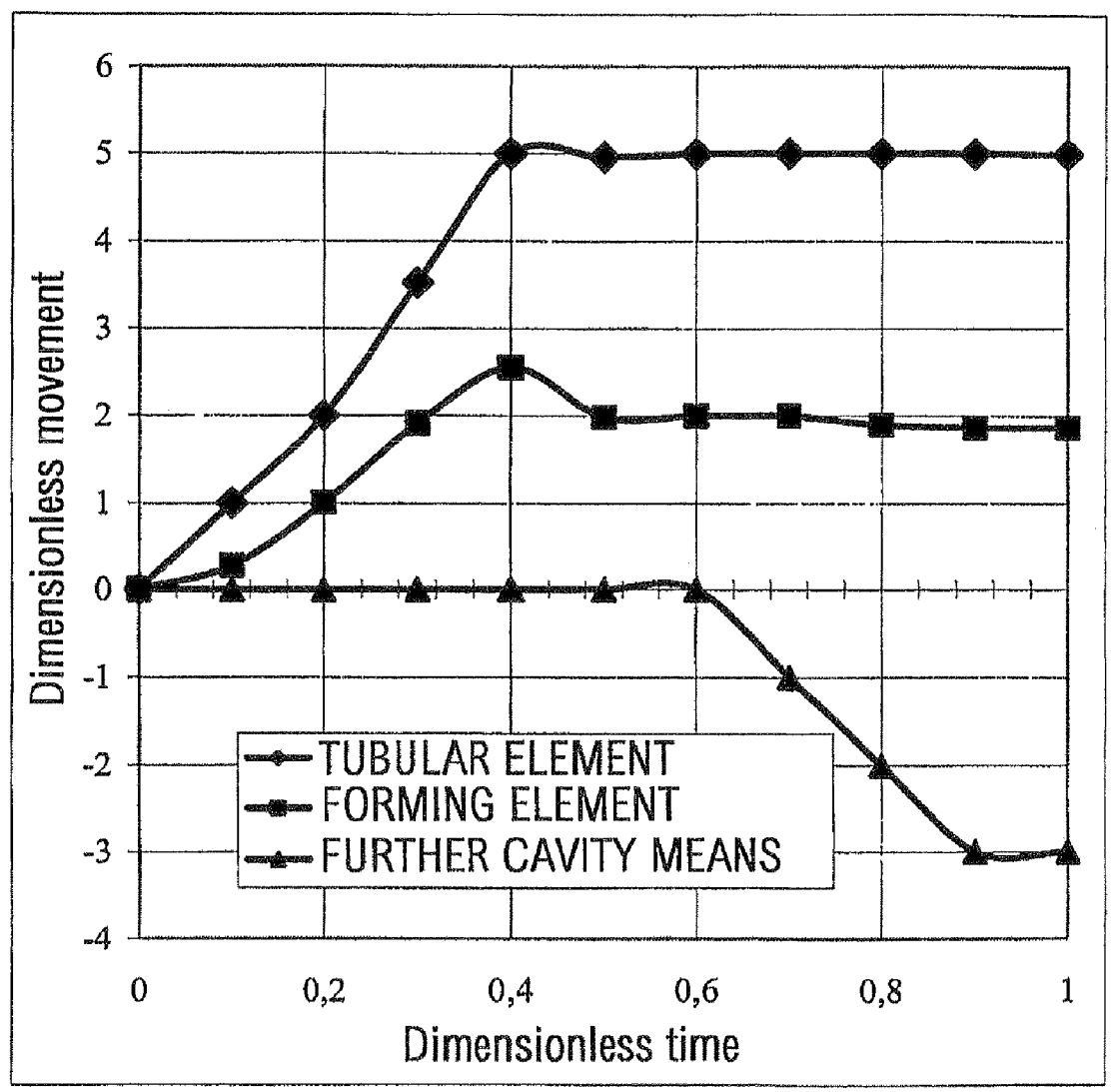
FIG. 45 is a graph like the one in FIG. 44 showing a further combination of movements of the forming tools as a function of time.

FIGS. 44 and 45 reproduce two graphs which show two possible combinations of the movements of the tubular element 53 and/or of the forming element 30 and/or of the further cavity arrangement 5.

In FIGS. 44 and 45, movements greater than zero indicate rising of the tubular element 53 and/or of the forming element 30, while movements less than zero indicate a lowering of the further die arrangement 5. The aforementioned Figures presuppose an apparatus 1 positioned as shown in the FIGS. 1 to 26, i.e. positioned so that the longitudinal axis A is placed substantially vertically and the punch 7 is arranged above the further die arrangement 5.

The moving speed of the tubular element 53, of the forming element 30 and of the further cavity arrangement 5 may be different from one another and can be changed independently during the same working cycle.

Furthermore, the trajectories of the tubular element 53 and the forming element 30—and, in case, of the further cavity arrangement 5—may comprise, subsequent to moving away from the neck forming arrangement 10, a partial moving towards the neck forming arrangement 10.

In an embodiment that is not shown, the forming punch arrangement 103 can be made by a single piece, i.e. the tubular element 53 and the forming element 30 can be joined together firmly.

In this case, it is possible to identify a plurality of operating modes corresponding to peculiar combinations of the movements of the forming punch arrangement 103 and the further cavity arrangement 5. In particular, the forming punch arrangement 103 can get detached from the preform before the blowing or stretch-blow-moulding step.

In a further embodiment, disclosed with reference to FIGS. 24 to 26, the forming element 30 may comprise a first forming body 82 and a second forming body 83.

In this case, it is possible to identify a plurality of operating modes corresponding to peculiar combinations of the movements of the tubular element 53 and/or of the first forming body 82 and/or of the second forming body 83 and/or of the further cavity arrangement 5.

Each of the aforementioned forming tools is movable in relation to the other forming tools and independently of the other forming tools with an own law of motion. In particular, the speed of each forming tool and the movement of each forming tool may be selected appropriately in order to obtain optimum detachment of the preform from the forming tools before the blowing or stretch-blow-moulding step, and an adequate homogenization of the temperature profile of the preform.

To facilitate detachment of the preform 8 from the forming tools, a fluid is insufflated between the forming punch arrangement 103 and the internal surface 104 and/or between the further die arrangement 5 and the external surface 105.

The aforementioned insufflation of fluid may be provided as an alternative, or more effectively, in addition to the relative movement of the forming tools, as disclosed above with reference to FIGS. 40 to 45.

In particular, a flow of fluid may be introduced between the forming punch arrangement 103 and the internal surface 104 through the passage 54 defined between the surface 51 of the forming element 30 and the further surface 52 of the tubular element 53.

Figure 46:
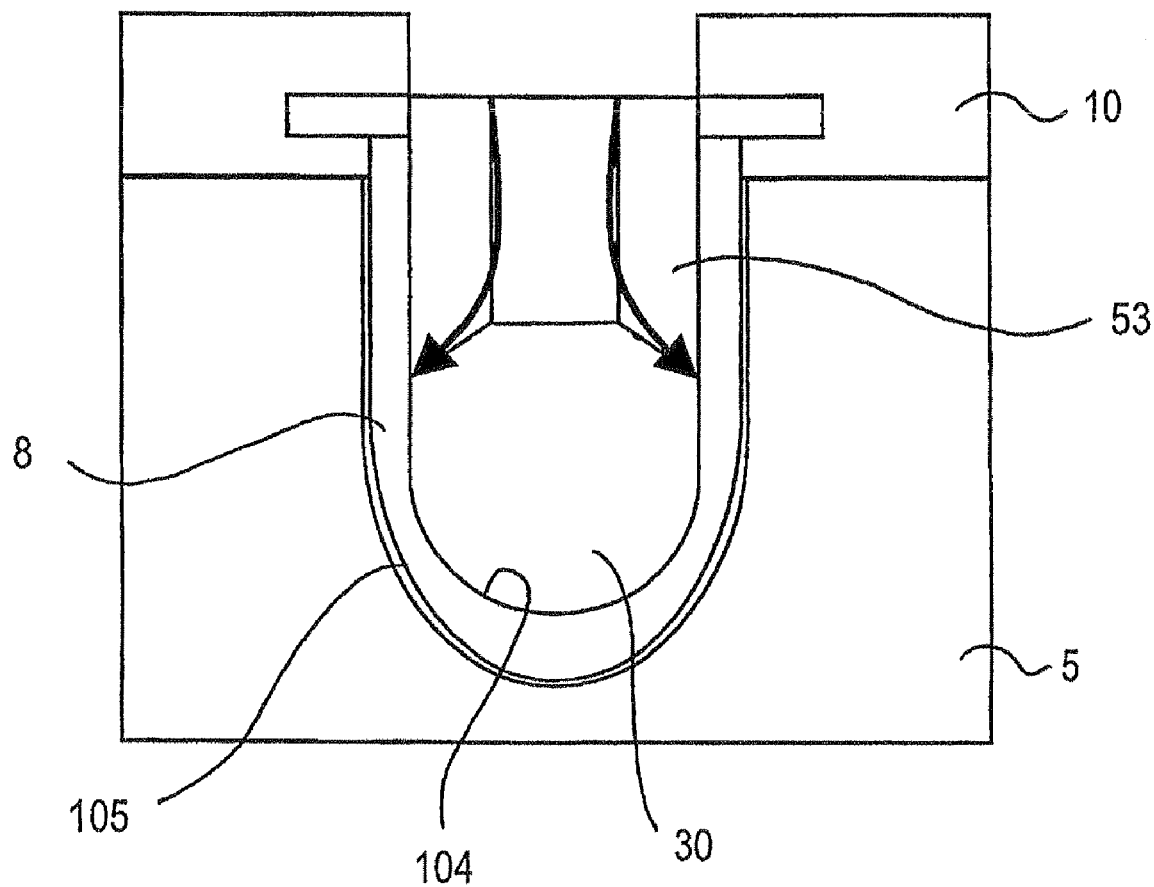
FIG. 46 is a schematic longitudinal section showing an operating configuration in which a fluid flow is introduced between a forming punch arrangement and an internal wall of a preform.

As shown in FIG. 46, the flow of fluid may be insufflated before the movement of the tubular element 53, of the forming element 30 and of the further cavity arrangement 5, in such a way that the flow of fluid exerts a detaching action even before the forming tools move away from the preform 8.

Figure 47:
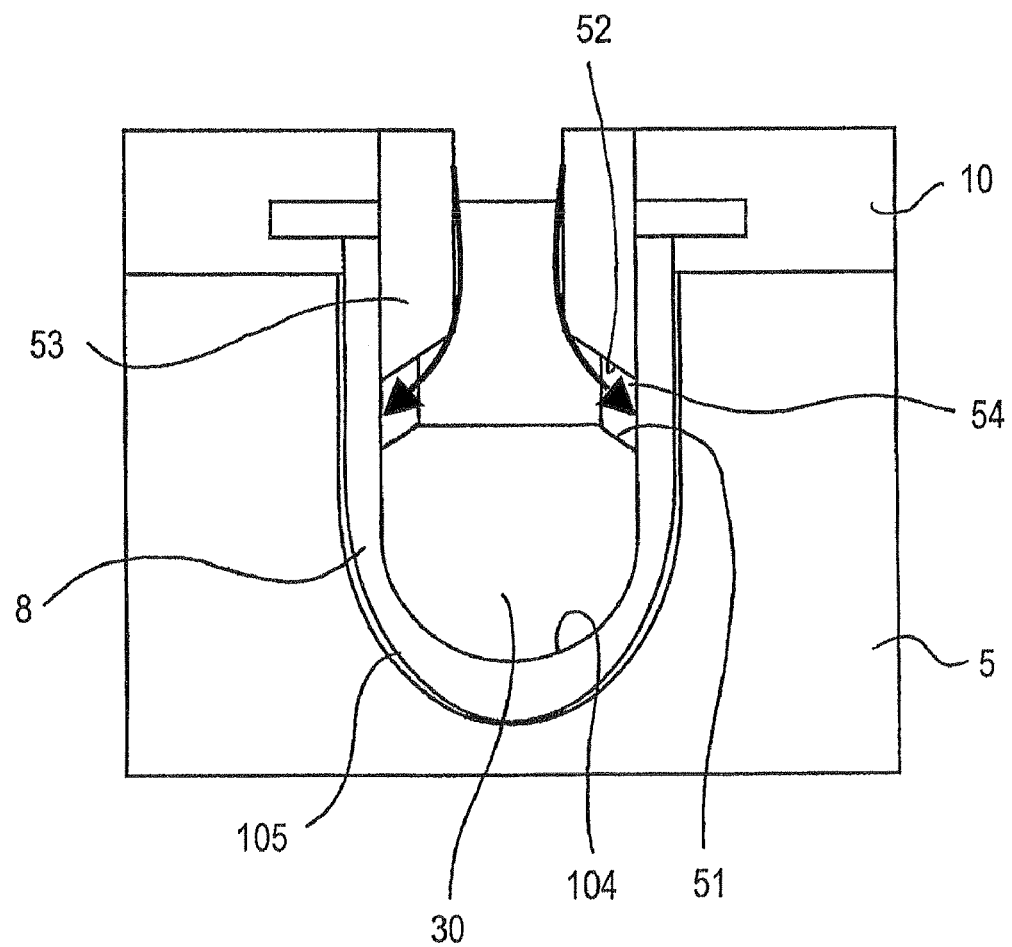
FIG. 47 is a section like the one in FIG. 46 showing another operating configuration in which a fluid flow is introduced between a forming punch arrangement and an internal wall of a preform.

As shown in FIG. 47, the flow of fluid may be insufflated while the forming tools move away from the preform 8, in particular during the movement of the tubular element 53 and/or of the forming element 30 to facilitate detachment of the preform 8 from the tubular element and/or from the forming element 30.

Figure 48:
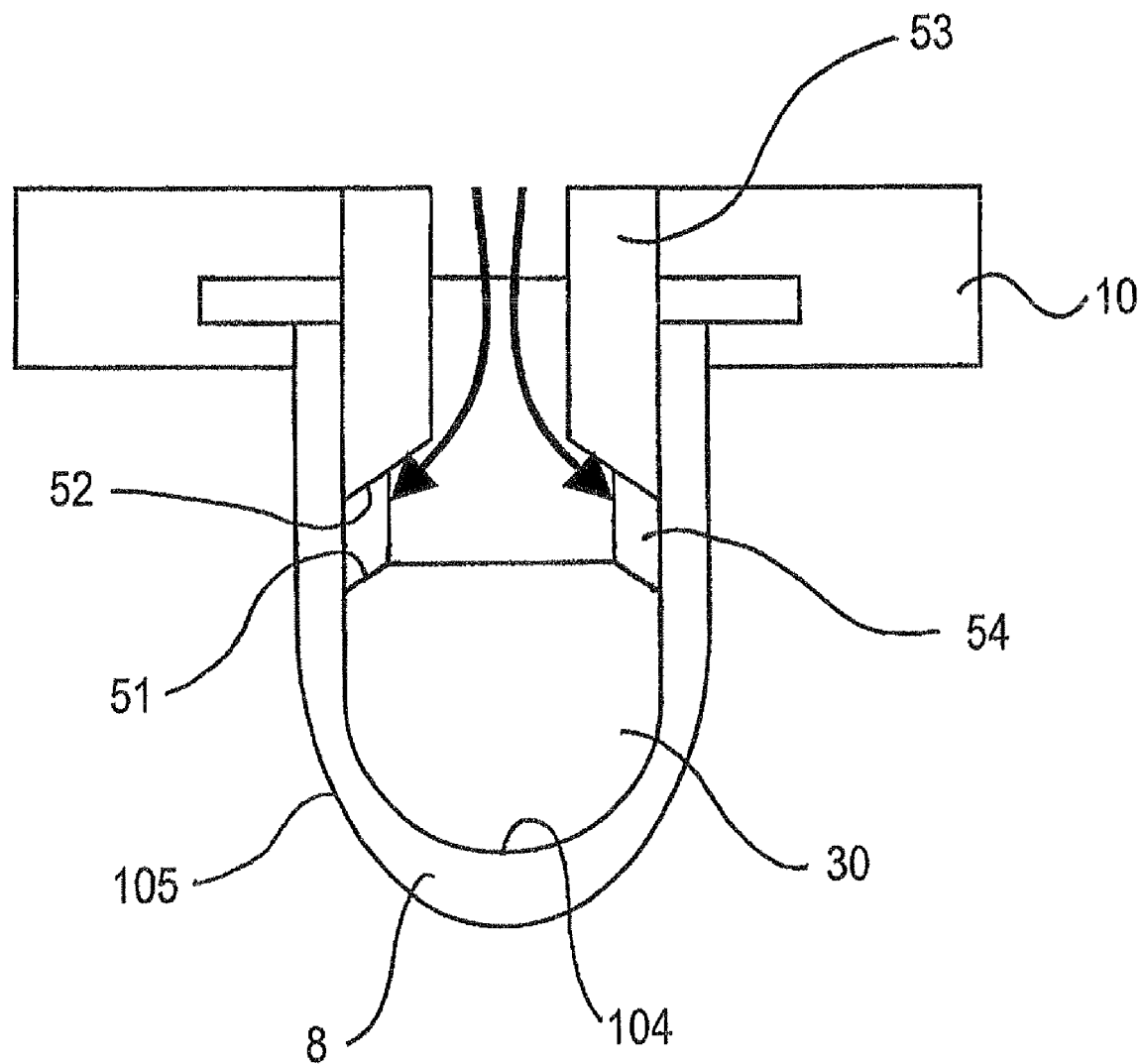
FIG. 48 is a section like the one in FIG. 46 showing a further operating configuration in which a fluid flow is introduced between a forming punch arrangement and an internal wall of a preform.

As shown in FIG. 48, the flow of fluid can be insufflated after the tubular element 53, the forming element 30 and the further die arrangement 5 have moved away from the preform 8. In this case, the flow of fluid can carry out a preliminary stretching of the preform 8.

If the forming punch arrangement 103 is made as shown in FIGS. 24 to 26—i.e. if the forming element 30 comprises a first forming body 82 and a second forming body 83—in place of the flow of fluid mentioned above a first flow of fluid may be provided, which is delivered through the passage 88 defined between the tubular element 53a and the first forming body 82, and a second fluid flow may be provided, which is delivered through a further passage 188 (FIG. 53) defined between the second forming body 83 and the first forming body 82, or through the conduit 89 associated with the second forming body 83.

Figure 49:
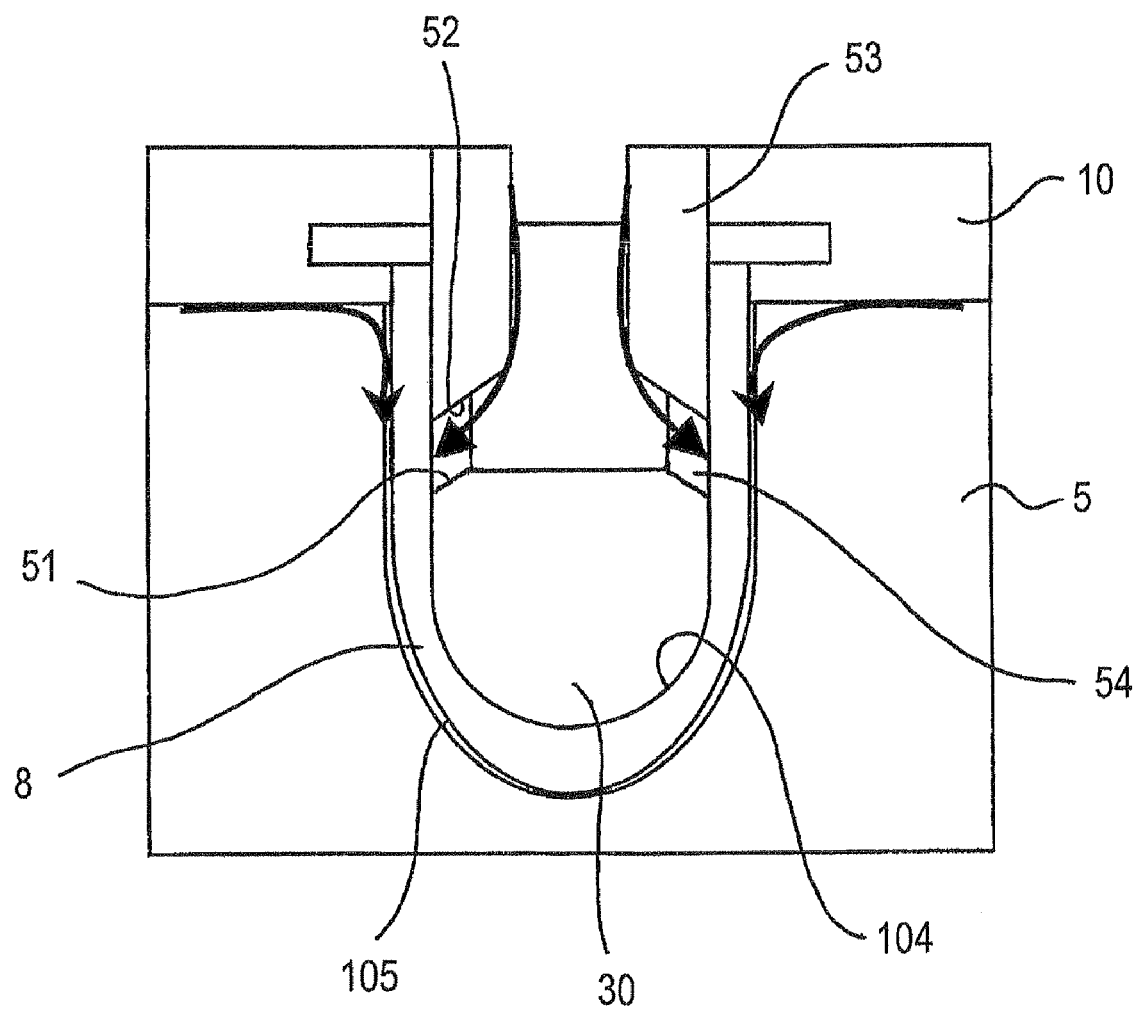
FIG. 49 is a section like the one in 46 showing a still further operating configuration in which a further fluid flow is introduced between a forming die arrangement and an outer wall of a preform.

As shown in FIG. 49, a further flow of fluid may be introduced between the further die arrangement 5 and the external surface 105, to facilitate detachment of the preform 8 from the further die arrangement 5.

The fluid flow and the further fluid flow may be insufflated in succession, or simultaneously, or alternatively.

It is also possible to insufflate only the flow of fluid, or only the further flow of fluid.

The flow of fluid and the further flow of fluid may comprise an air flow and a further air flow, respectively.

The flow of fluid and the further flow of fluid can be adjusted independently of one another as regards pressure and flow rate.

The flow of fluid and the further flow of fluid make it possible to obtain a detachment of the preform from the forming tools that is uniform and homogeneous axially as well as radially.

In addition, if the expansion of the preform can be difficult, for example, because of the properties of the plastics of which the preform is made, or for obtaining containers having particularly complex geometries, the flow of fluid and the further flow of fluid can provide for a first partial blow-moulding of the preform which facilitates the successive blowing or stretch-blow-moulding step.

Figure 50:
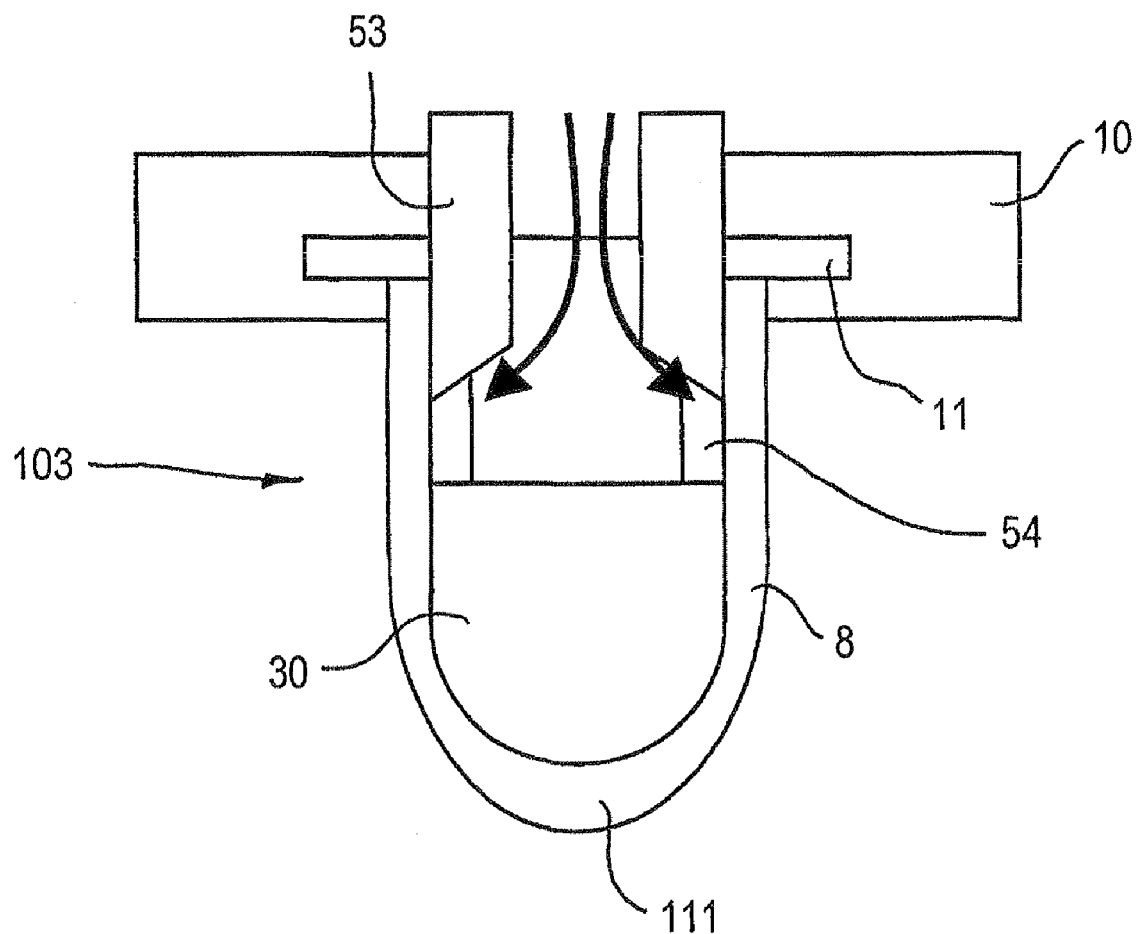
FIG. 50 is a section like the one in FIG. 46 showing an embodiment of a forming punch arrangement of the apparatus.

With reference to FIG. 50 a forming punch arrangement 103 is shown schematically, which forming punch arrangement is shaped like the ones in FIGS. 11 to 13.

In these forming punch arrangements 103 the contact zone between the tubular element 53 and the forming element 30, and therefore the passage 54, are located near a "high" portion of the preform, where the high portion in this description means a portion of the preform 8 between the neck portion 11 of preform 8 and half-way up the height of the body of the preform 8.

During the blowing or stretch-blow-moulding step, the blowing fluid comes from the passage 54.

Figure 55:
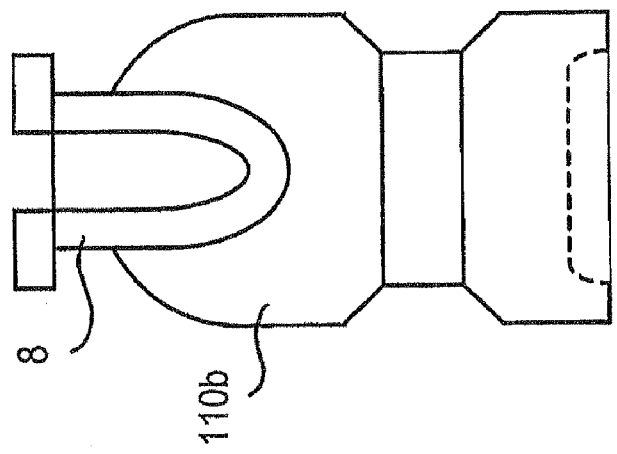
Figure 54:
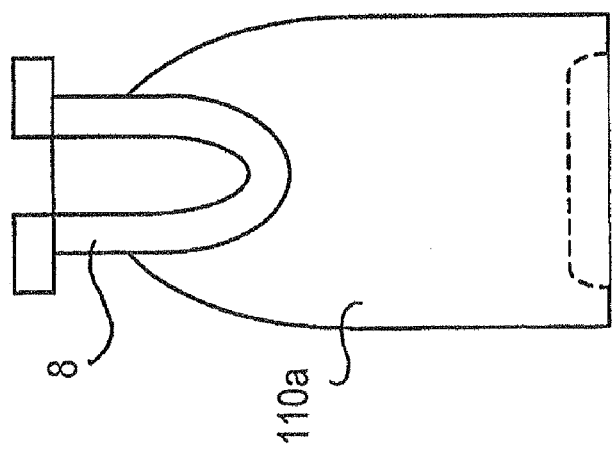

The configuration of the forming punch arrangement 103 shown in FIG. 50 makes it possible to locate a portion of plastics intended for forming a bottom region of a container. This configuration may be used effectively to obtain the containers 110a and 110b shown in FIGS. 54 and 55, respectively.

In the configuration of the forming punch arrangement 103 shown in FIG. 50, the blowing fluid is introduced at the high portion of the preform 8 and the stretching effect starts from the high portion of the preform 8.

Figure 51:
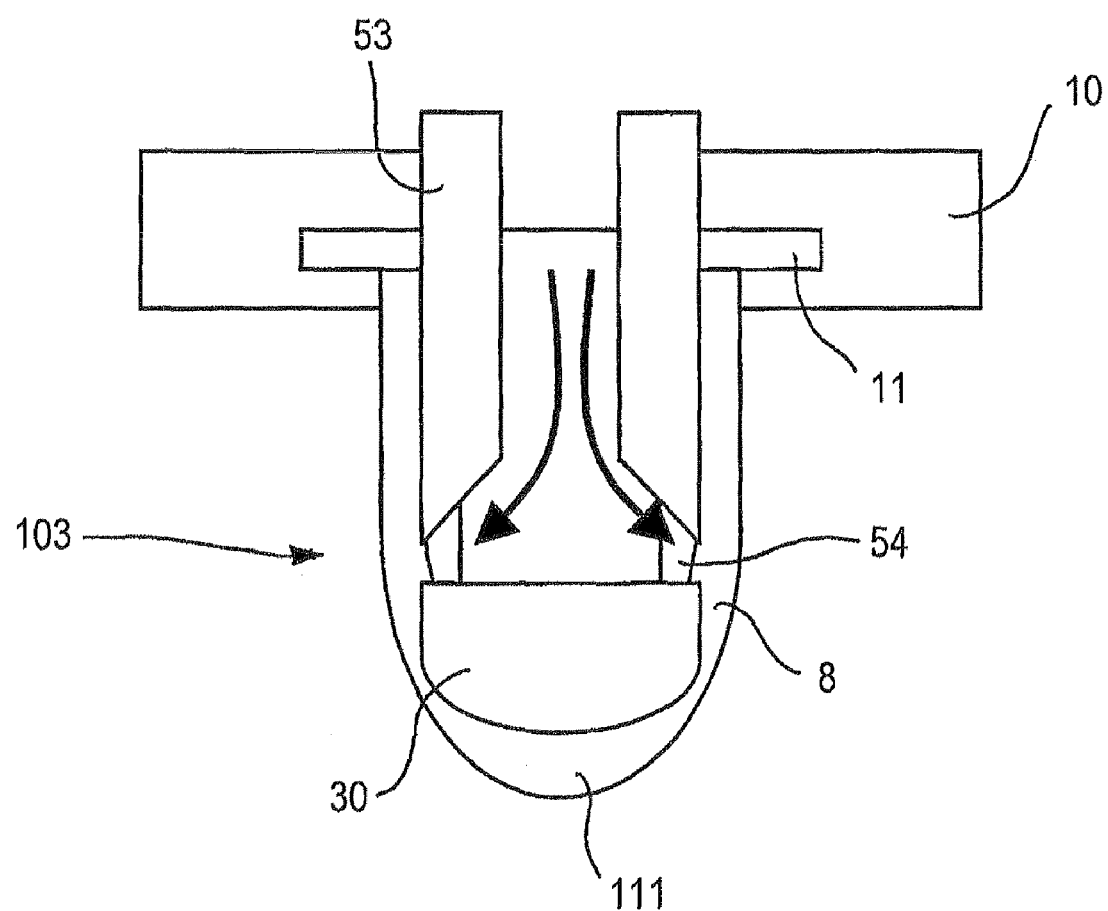
FIG. 51 is a section like the one in FIG. 46 showing another embodiment of a forming punch arrangement of the apparatus.

With reference to FIG. 51, a forming punch arrangement 103 is shown schematically in which the contact zone between the tubular element 53 and the forming element 30, and therefore the passage 54, are located near a "low" portion of the preform, where the low portion in this description means a portion of the preform 8 interposed between half-way up the height of the body of the preform 8 and the bottom zone 111.

During the blowing or stretch-blow-moulding step, the blowing fluid comes from the passage 54.

Figure 56:
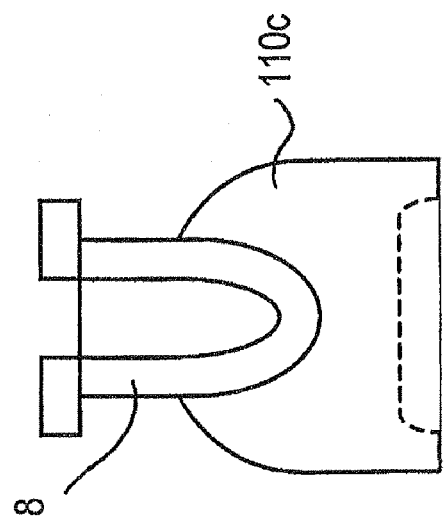
FIGS. 54 to 56 are schematic longitudinal sections of containers that can be obtained using the apparatus.

The configuration of the forming punch arrangement 103 shown in FIG. 51 can be used effectively for obtaining a container 110c shown in FIG. 56.

In the configuration of the forming punch arrangement 103 shown in FIG. 51 the blowing fluid is introduced at the low portion of the preform 8 and the stretching effect starts from the low portion of the preform 8.

Figure 52:
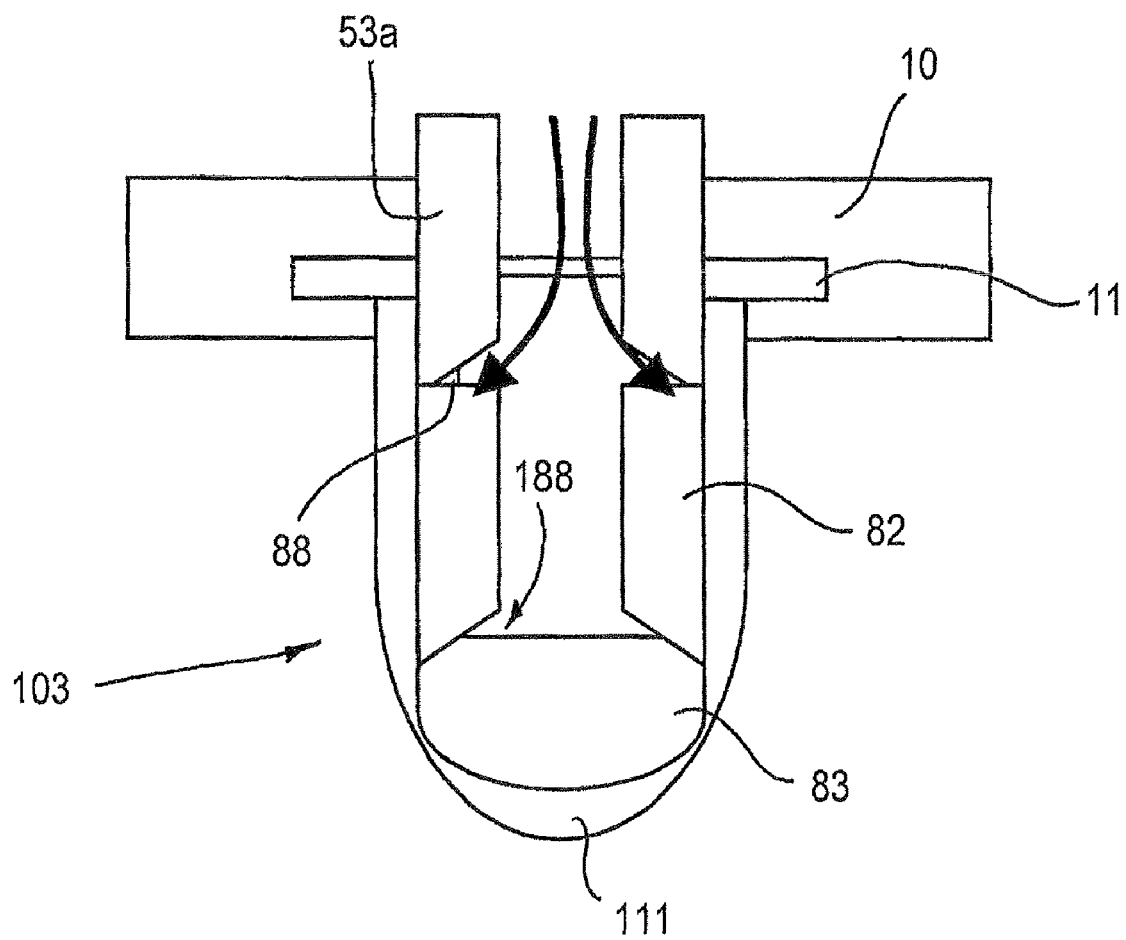
FIG. 52 is a section like the one in FIG. 46 showing a further embodiment of a forming punch arrangement of the apparatus.
Figure 53:
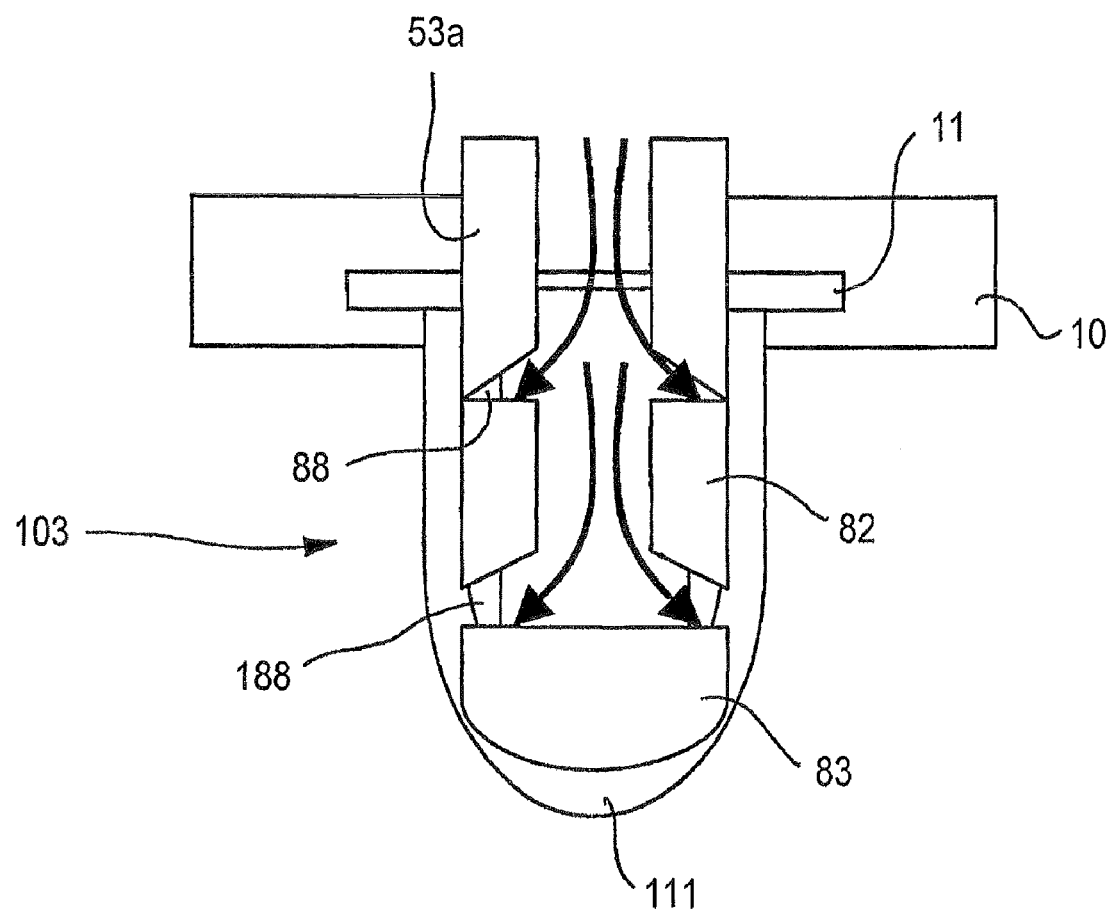
FIG. 53 is a section like the one in FIG. 46 showing a still further embodiment of a forming punch arrangement of the apparatus.

With reference to FIGS. 52 and 53 a forming punch arrangement 103 is shown schematically, which forming punch arrangement is shaped like the ones in FIGS. 24 to 26.

In these forming punch arrangements 103, the contact zone between the tubular element 53a and the first forming body 82, and therefore the passage 88, are located at the high portion of the preform, while the contact zone between the first forming body 82 and the second forming body 83, and therefore the further passage 188, are located in the low portion of the preform, the aforementioned high portion and the aforementioned low portion being defined as disclosed with reference to FIGS. 50 and 51.

In a first operating mode, shown in FIG. 52, the blowing fluid is insufflated only through the passage 88.

In this operating mode, it is possible to control the width of the opening through which the blowing fluid flows, i.e. the width of the passage 88, and the stroke of the second moulding body 83, independently.

In the first operating mode the blowing fluid is introduced at the high portion of the preform 8, while the stretching effect starts from the low portion of the preform 8.

In a second insufflated through the passage 88 as well as through the further passage 188.

In the second operating mode the blowing fluid is introduced in the high portion as well as in the low portion of the preform 8 and the stretching effect starts from the low portion of the preform 8.

It must be pointed out that the forming punch arrangement shown in FIGS. 50 to 53 can function according to an operating mode in which the preform 8 is subjected substantially only to a blowing action and not a stretching action.

In this case, the length of the preform 8 may be substantially equal to that of the container to be obtained.

In this operating mode, in the case of the forming punch arrangement 103 shown in FIGS. 50 and 51, the forming element 30 and the tubular element 53 move to a very limited distance in relation to one another, for example a few millimeters, so that between the forming element 30 and the tubular element 53 the passage 54 is defined, for blowing the blowing fluid.

Similarly, in the case of the forming punch arrangement 103 shown in FIGS. 52 and 52, the second forming body 83, the first forming body 82 and the tubular element 53a move to a very limited distance in relation to one another, for example a few millimeters, so that the passage 88 is defined between the tubular element 53a and the first forming body 82 and the further passage 188 is defined between the first forming body 82 and the second forming body 83, for blowing the blowing fluid.

Depending on the different types of a forming punch arrangement 103 shown with reference to FIGS. 50 to 53—in particular depending on the position of the zone of the preform at which separation occurs between the tubular element 53 and the forming element 30 (or depending on the positions of the zone at which separation occurs between the tubular element 53a and the first forming body 82 and of the zone at which separation occurs between the first forming body 82 and the second forming body 83), and therefore depending on the position of the zone (or zones) at which the forming fluid is insufflated—depending on the plastics processed and on the shapes of the containers to be produced, different types of preforms can be provided.

Figure 63:
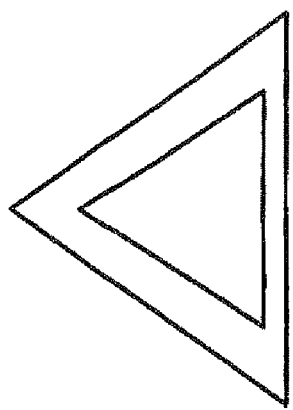
FIGS. 61 to 63 are schematic cross sections of preforms which can be obtained and expanded using the apparatus.
Figure 62:
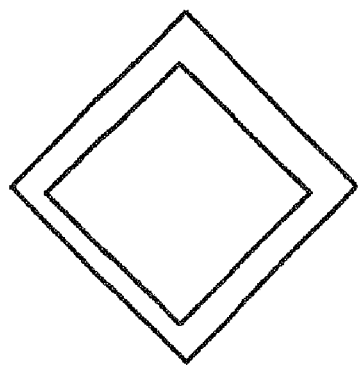
Figure 61:
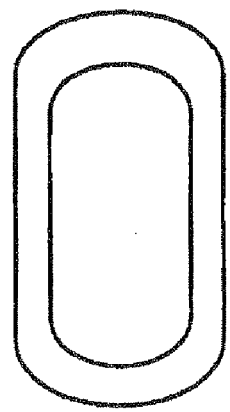

The preforms may have the following features:
- the thickness of the preforms may show extremely small variations, or may be substantially constant to make it easier to obtain a uniform temperature profile (FIG. 57);
- the thickness of the preforms may be greater near the separation zone between the tubular element 53 and the forming element 30, in such a way as to compensate a localization of the stretching that is present near the aforementioned separation zone (FIG. 59);
- the thickness of the bottom zone 111 of the preforms may be variable, and in particular thin in relation to the thickness of the side wall (FIGS. 59 and 60);
- the preforms may have draft angles which enable the forming element 30 to be detached from the preforms before the blowing or stretch-blow-moulding step, these draft angles, having, for example, amplitudes belonging to an interval 3°-7° (the preforms shown in FIGS. 57, 58 and 59 have the same weight, but different geometries);
- the preforms may show axial localization of plastics depending on the shape of the container to be produced (FIG. 60);
- the preforms may have a cross-section that is not circular, but, for example may be elliptical (FIG. 61) or polygonal, for example quadrangular (FIG. 62), or triangular (FIG. 63)—with perimeter thickness localizations depending on the shape of the container to be produced.

A working cycle of the apparatus 1 also comprises a compression-moulding step of a dose of plastics to obtain a preform, a step of detachment of the obtained preform from the forming tools, a step of temperature balance and a step of blowing or stretch-blow-moulding of the preform.

The temperatures of the forming tools must therefore be adjusted accordingly to optimize the aforementioned steps.

Furthermore, the geometry of the preform may show various thicknesses or parts which, depending on the shape of the container to be obtained, require a different kind of cooling in comparison to the remaining parts of the preform.

The forming tools can, therefore, be thermally adjusted, for example, through the modes disclosed below:
- the forming tools pass from a temperature nearing the temperature of the polymeric melt during the dose inserting step and the compression-moulding step to a temperature below 80-160° C. in the step of detachment of the obtained preform from the forming tools, the step of thermal balance and the step of blowing, or stretch-blow-moulding, of the preform;
- the temperature of the forming tools is differentiated by using different circuits along the external body of the further cavity arrangement 5 and inside the forming punch arrangement 103 and/or acting on the flow rate and pressure of the cooling fluids that flow through the aforementioned circuits. For example, parts of the preform intended for undergoing deformation to different extents can be brought to different temperatures, in particular parts of the preform intended for being deformed considerably during the blowing or stretch-blow-moulding step, are brought to higher temperatures in comparison to parts of the preform intended for being deformed to a lesser extent;
- the forming tools are subjected to the action of a thermal conditioning device arranged outside the forming tools (a radiations generating device, an air blow generating device, etc.) or inside the forming tools (conditioning fluids, electric heating elements, etc.) in such a way as to adjust only the surface temperature of the parts of the forming tools which come into contact with the plastics.

Figure 27:
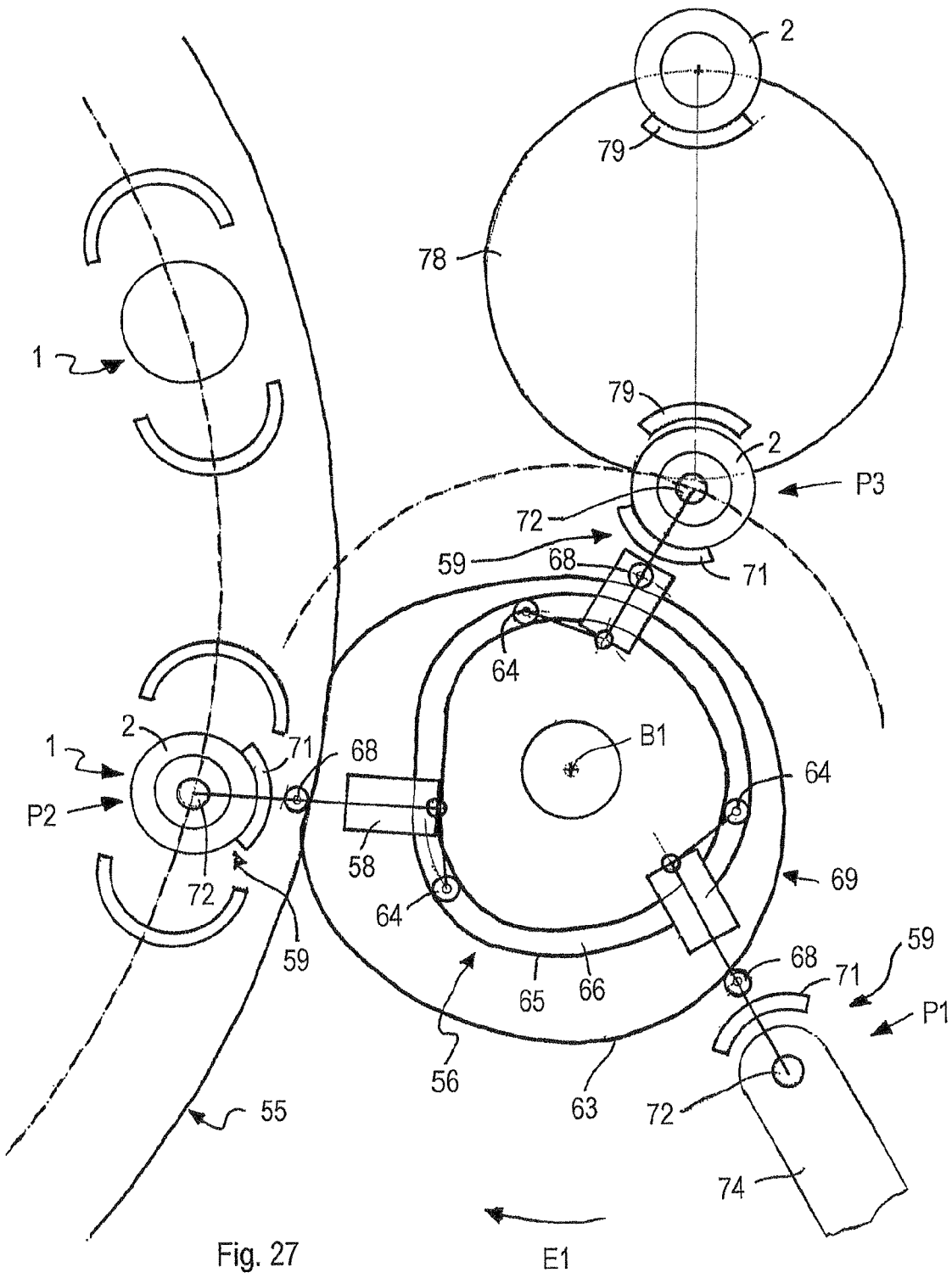
FIG. 27 is a schematic plan view of a plant for forming containers.

With reference to FIG. 27 a forming carousel 55 is shown, provided with a plurality of apparatuses 1 of the type disclosed above.

The apparatuses 1 are arranged on a peripheral edge zone of the forming carousel 55 at substantially constant angular intervals.

A moving carousel 56 is also provided, arranged for removing a formed container 2 from the die arrangement 9 of one of the apparatuses 1 and for delivering a dose 37 intended for forming a further container 2 to the further die arrangement 5 of the same apparatus 1. An apparatus 1 receives a dose 37 from the moving carousel 56.

Subsequently, during the rotation of forming carousel 55, the apparatus 1 carries out the working cycle steps disclosed with reference to FIGS. 2 to 26, to obtain a container preform 8 from the dose 37 and to expand the container preform 8 to obtain a container 2.

The aforementioned working cycle steps are carried out while the forming carousel 55 rotates by an angle less than 360°.

When the forming carousel 55 has rotated substantially by an angle of 360°, the moving carousel 56 removes the container 2 from the apparatus 1 and delivers a further dose 37 to the apparatus 1.

Figure 28:
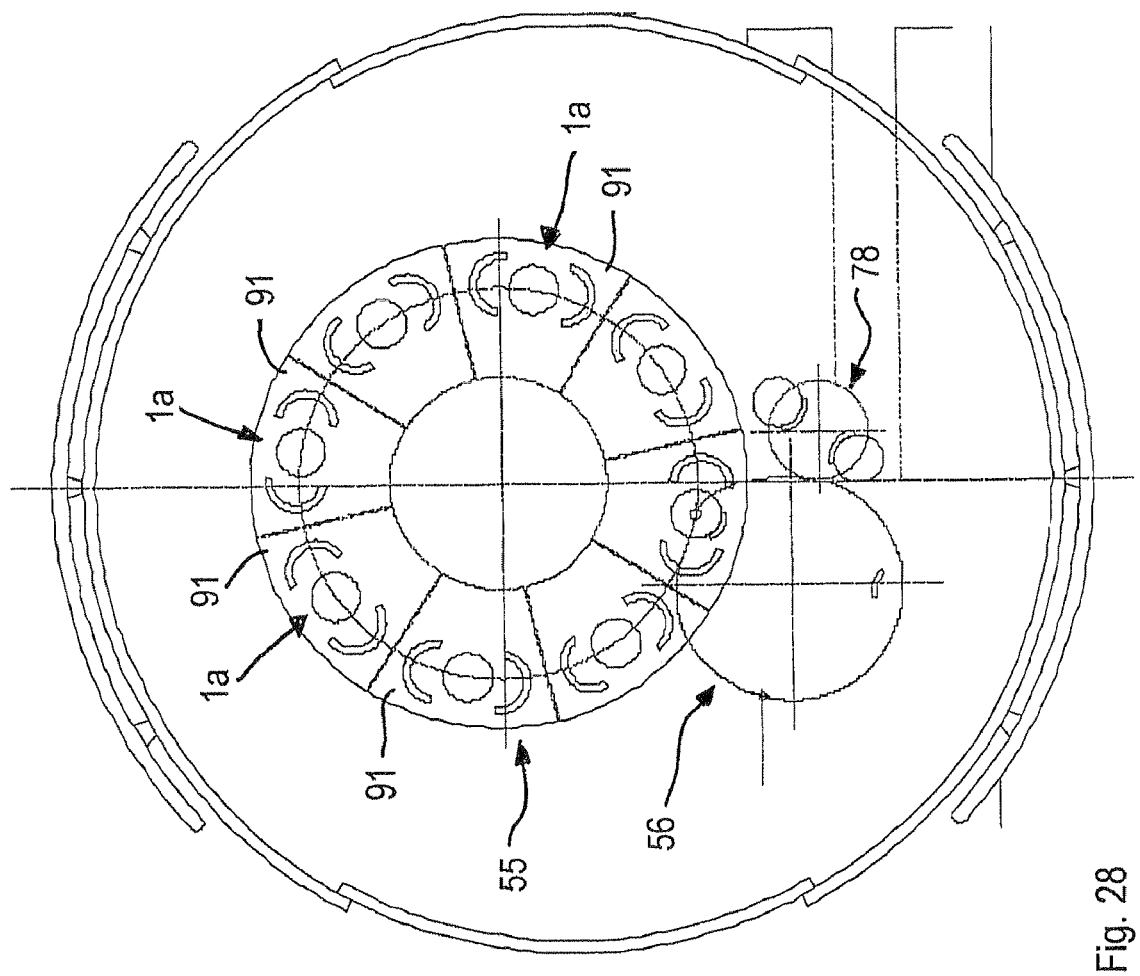
FIG. 28 is a schematic plan view of a variation of the apparatus in FIG. 27.

With reference to FIG. 28, a forming carousel 55 is shown to which eight apparatuses 1*a* are associated.

The apparatuses 1*a* are so shaped as to produce containers 2 having a prefixed dimension.

The apparatuses 1*a* are associated with supporting blocks 91 each of which has an angular extension substantially equal to 45°.

Figure 29:
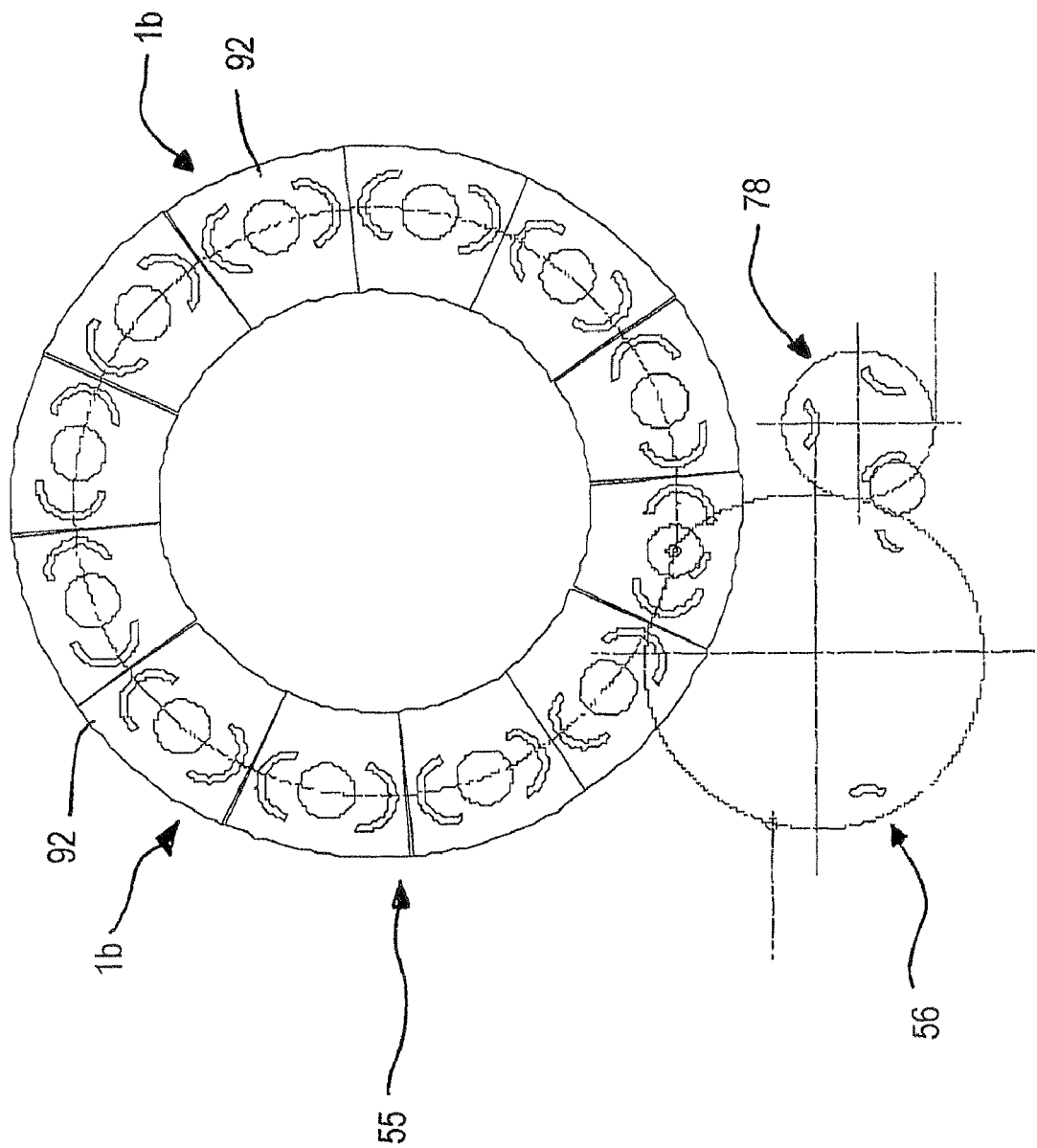
FIG. 29 is a schematic plan view of a further variation of the apparatus in FIG. 27.

With reference to FIG. 29 a forming carousel 55 is shown as in FIG. 28, in which the eight apparatuses 1*a* are replaced with twelve further apparatuses 1*b*.

The further apparatuses 1*b* are structurally similar to the apparatuses 1*a* and are so shaped as to produce further containers 2 having a further prefixed dimension less than the aforementioned prefixed dimension.

The further apparatuses 1*b* are associated with further supporting blocks 92 each of which has an angular extension substantially equal to 30°.

Figure 30:
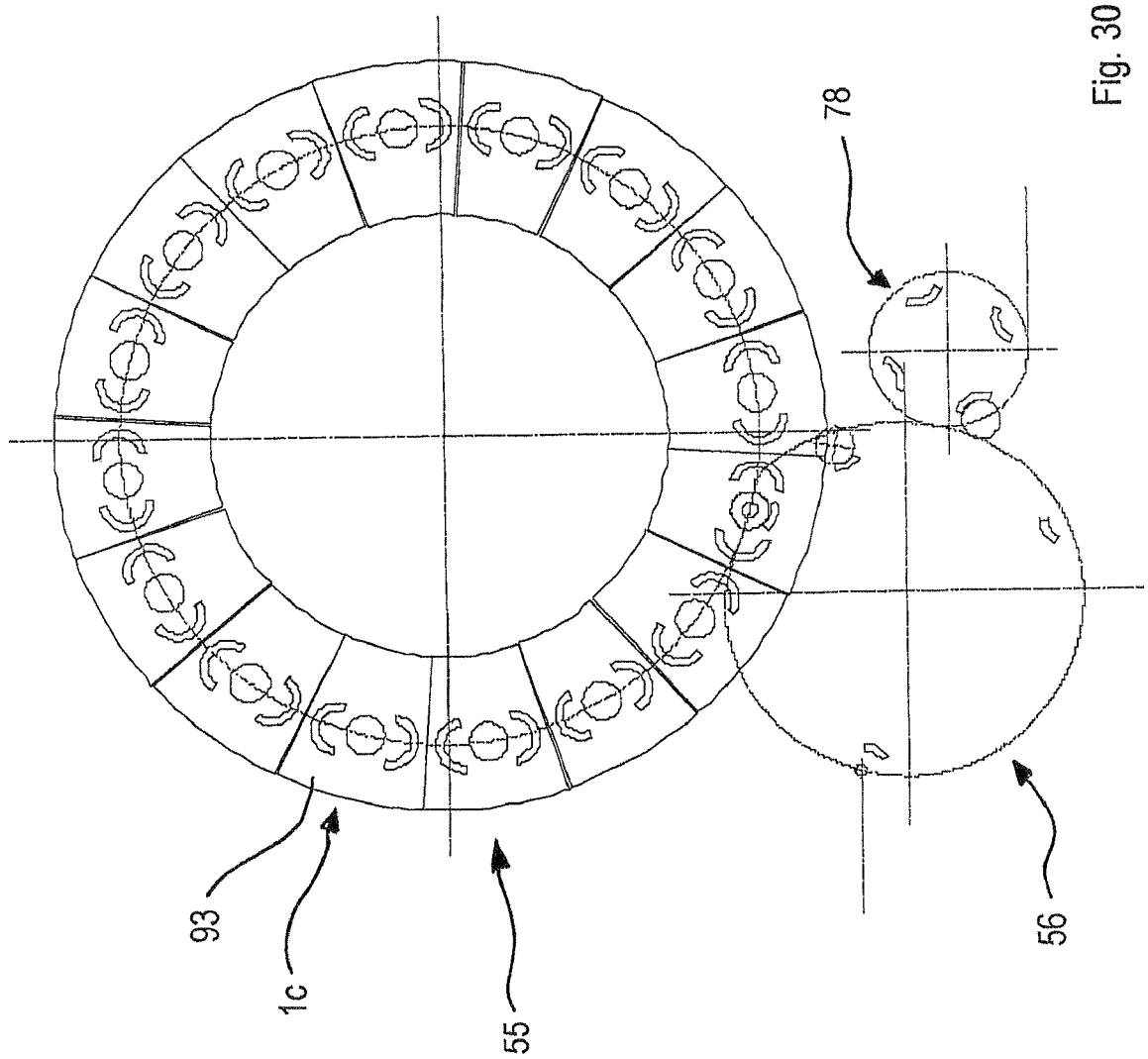
FIG. 30 is a schematic plan view of a still further variation of the apparatus in FIG. 27.

With reference to FIG. 30 the forming carousel 55 is shown as in FIG. 28, in which the eight apparatuses 1*a* are replaced with sixteen still further apparatuses 1*c*.

The still further apparatuses 1*c* are structurally similar to the apparatuses 1*a*—and to the further apparatuses 1*b*—and are so shaped as to produce still further containers 2 having a still further prefixed dimension less than the aforementioned prefixed dimension and aforementioned further prefixed dimension.

The still further apparatuses 1*c* are associated with still further supporting blocks 93 each of which has an angular extension substantially equal to 22.5°.

A different number of apparatuses 1 can, therefore, be associated with a same turntable of the forming carousel 55, this number depending, for example, on the shape and dimensions of the containers to be obtained.

Consequently, the carousel 55 can be made in modular form, and therefore, is found to be very versatile.

In operation, to pass from the production of containers having a certain dimension to containers having a different dimension, it is sufficient to replace the apparatuses—by acting on the respective supporting blocks—without having to replace the turntable of the forming carousel 55 and the moving and controlling devices associated therewith.

With reference to FIGS. 31 to 34, the positioning arrangement 90 are shown mounted on the forming carousel 55.

In particular, the positioning arrangement 90 may comprise a plurality of positioning elements each of which cooperates with a respective apparatus 1.

A motor arrangement is provided, not shown, which moves the positioning arrangement 90 towards and away from the apparatus 1. In particular, the motor arrangement moves the positioning arrangement 90 along a direction arranged substantially radial in relation to the forming carousel 55.

Figure 31:
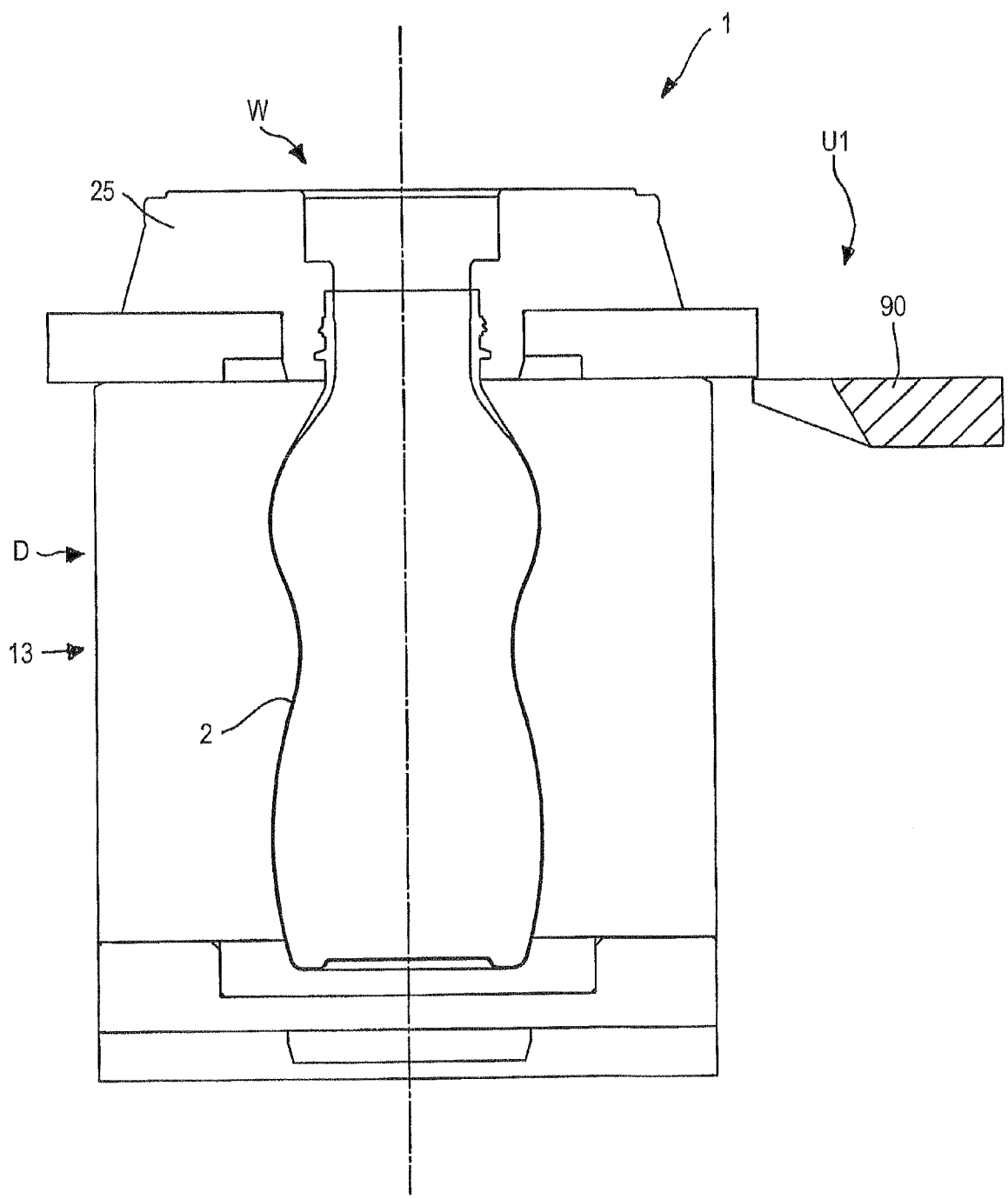
FIG. 31 is a schematic longitudinal section of the apparatus in FIG. 1 showing a blow-moulding arrangement in a closed configuration, a neck forming arrangement in a forming configuration and a supporting element, arranged for supporting containers, in a retracted configuration.
Figure 32:
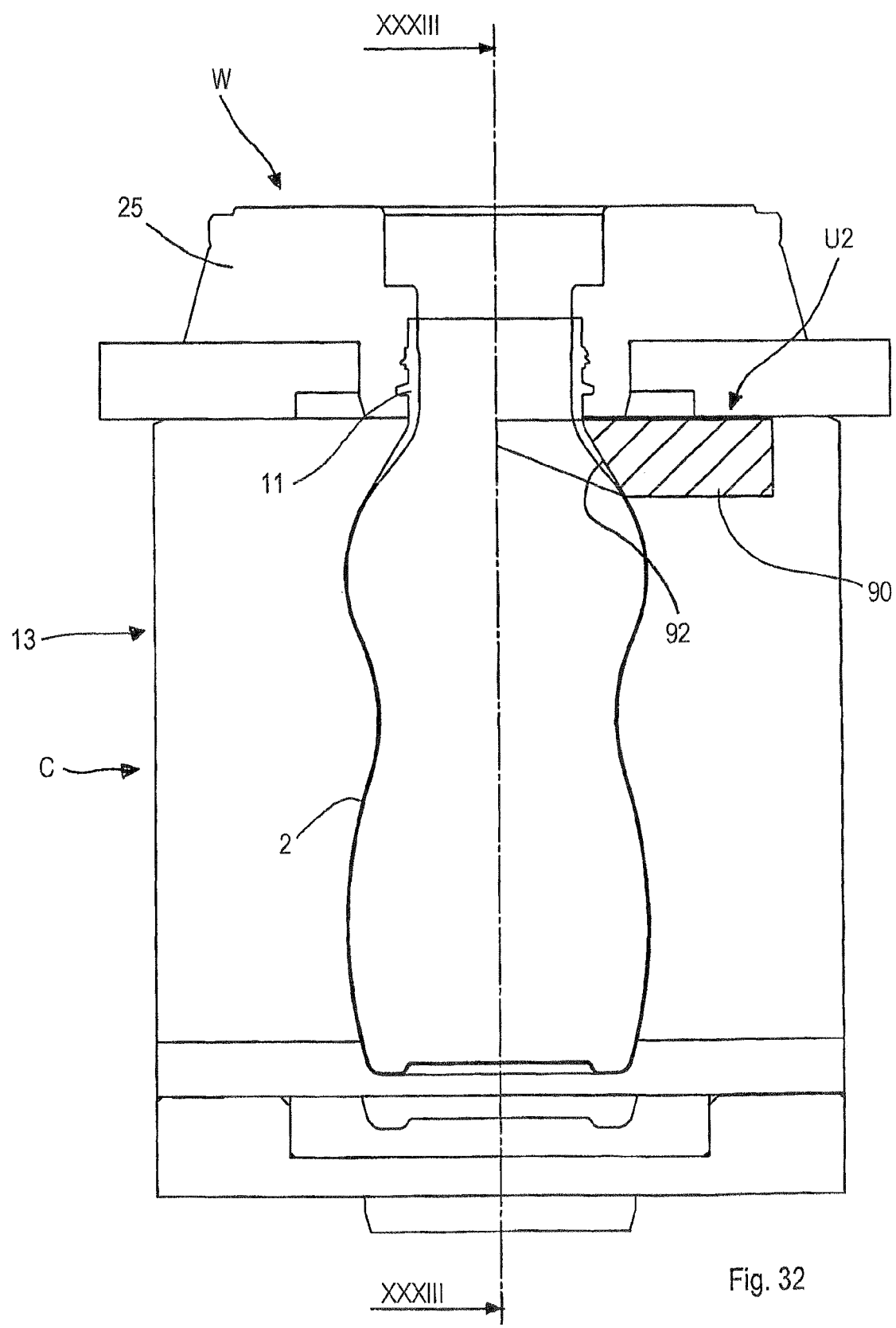
FIG. 32 is a section like the one in FIG. 31 showing the blow-moulding arrangement in an open configuration, a neck forming arrangement in closed configuration and a supporting element, arranged for supporting containers, in an advance configuration.
Figure 33:
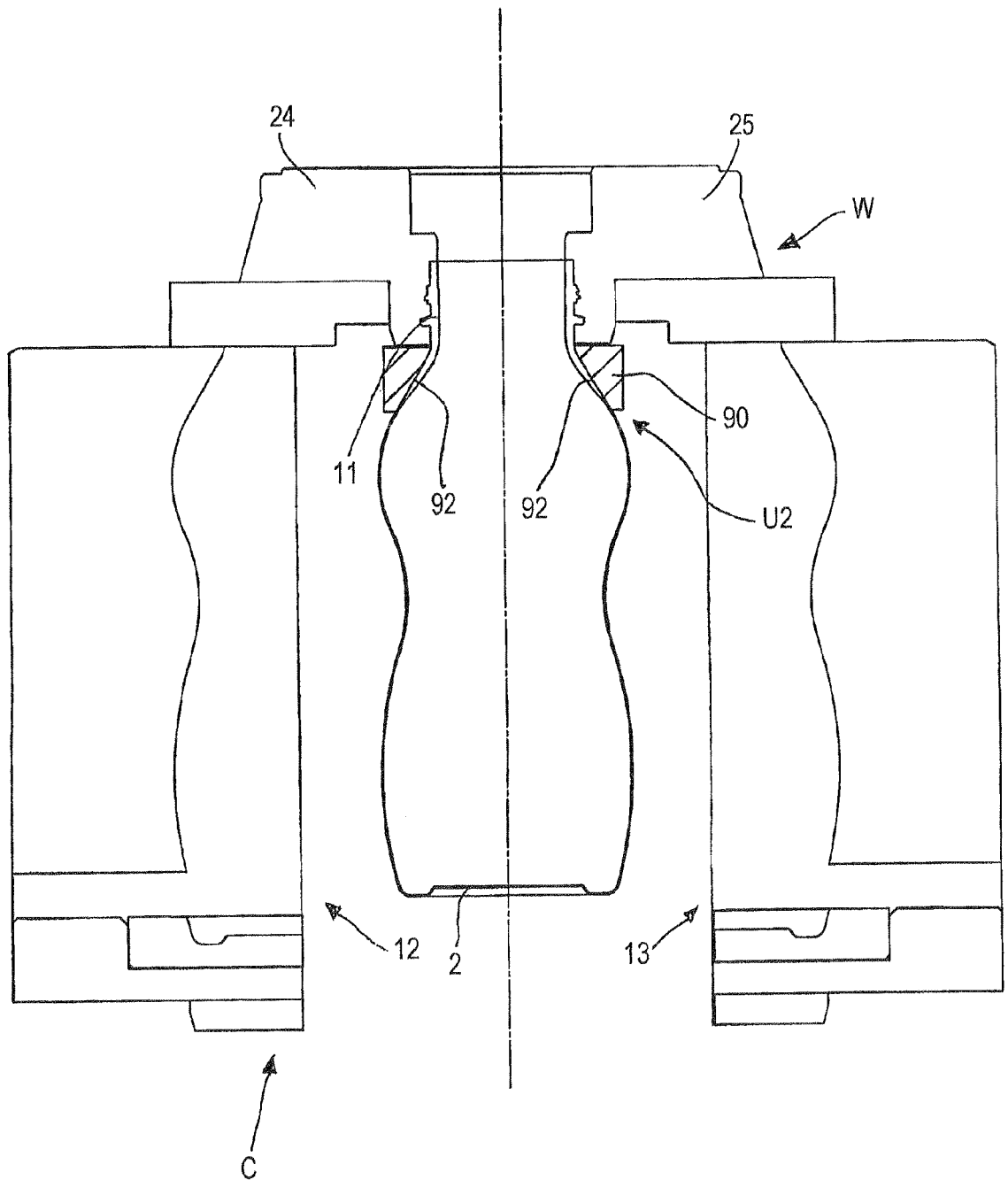
FIG. 33 is a section taken along a plane XXXIII-XXXIII of FIG. 32.
Figure 34:
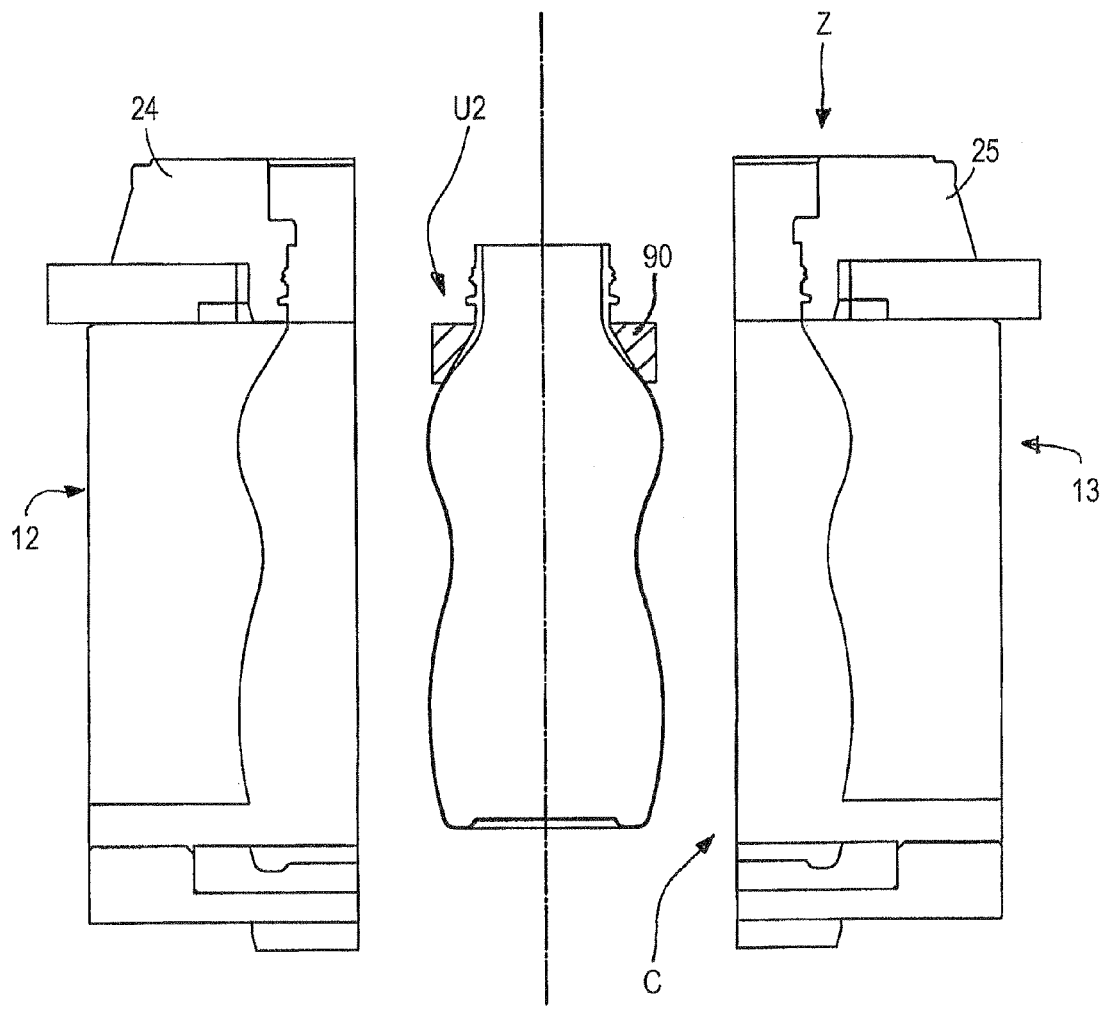
FIG. 34 is a section like the one in FIG. 33 showing the blow-moulding die arrangement in an open configuration, the neck forming arrangement in a release configuration and the supporting element in the advanced configuration.

The motor arrangement moves the positioning arrangement between a retracted configuration U1, shown in FIG. 31, in which the positioning arrangement 90 does not interact with a container 2, and an advanced configuration U2, shown in FIGS. 32, 33 and 34, in which the positioning arrangement 90 interacts with the container 2 and supports the container 2.

In a step of the working cycle shown in FIG. 31, the first half-mould 12 and the second half-mould 13 are in the closed configuration D, the further first half-mould 24 and the further second half-mould 25 are in the forming configuration W, the positioning arrangement is in the retracted configuration U1.

In a successive step of the working cycle shown in FIGS. 32 and 33, the first half-mould 12 and the second half-mould 13 are in the open configuration C, the further first half-mould 24 and the further second half-mould 25 are in the forming configuration W, the positioning arrangement is in the advanced configuration U2, in which it partially surrounds a zone 92 of the container 2 arranged near the neck portion 11.

In a successive step of the working cycle shown in FIG. 34, the first half-mould 12 and the second half-mould 13 are in the open configuration C, the further first half-mould 24 and the further second half-mould 25 are in the release configuration Z, the positioning arrangement is in the advanced configuration U2, in which it supports the container 2 released by the neck forming arrangement 10.

In a subsequent step of the working cycle, not shown, removing elements 59 of the forming carousel 56 remove the container 2 from the positioning arrangement 90.

The positioning arrangement 90 makes it possible to substantially maintain a fixed position in which the removing elements 59 removes the containers 2 from the positioning arrangement 90.

In an embodiment that is not shown, the positioning arrangement is not installed on the forming carousel 55.

In this embodiment, the positioning arrangement interacts in succession with the apparatuses 1 while the forming carousel 55 rotates.

With reference to FIG. 27 and FIGS. 35 to 39, the moving carousel 56 comprises a rotating body 57 rotatable around a rotation axis B1 in a rotation direction E1.

Supporting elements 58 bearing removing elements 59 are rotatably supported to the rotating body 57 and will be disclosed in greater detail below.

The supporting elements 58 are arranged on a peripheral edge zone of the rotating body 57 at substantially constant angular intervals.

Figure 35:
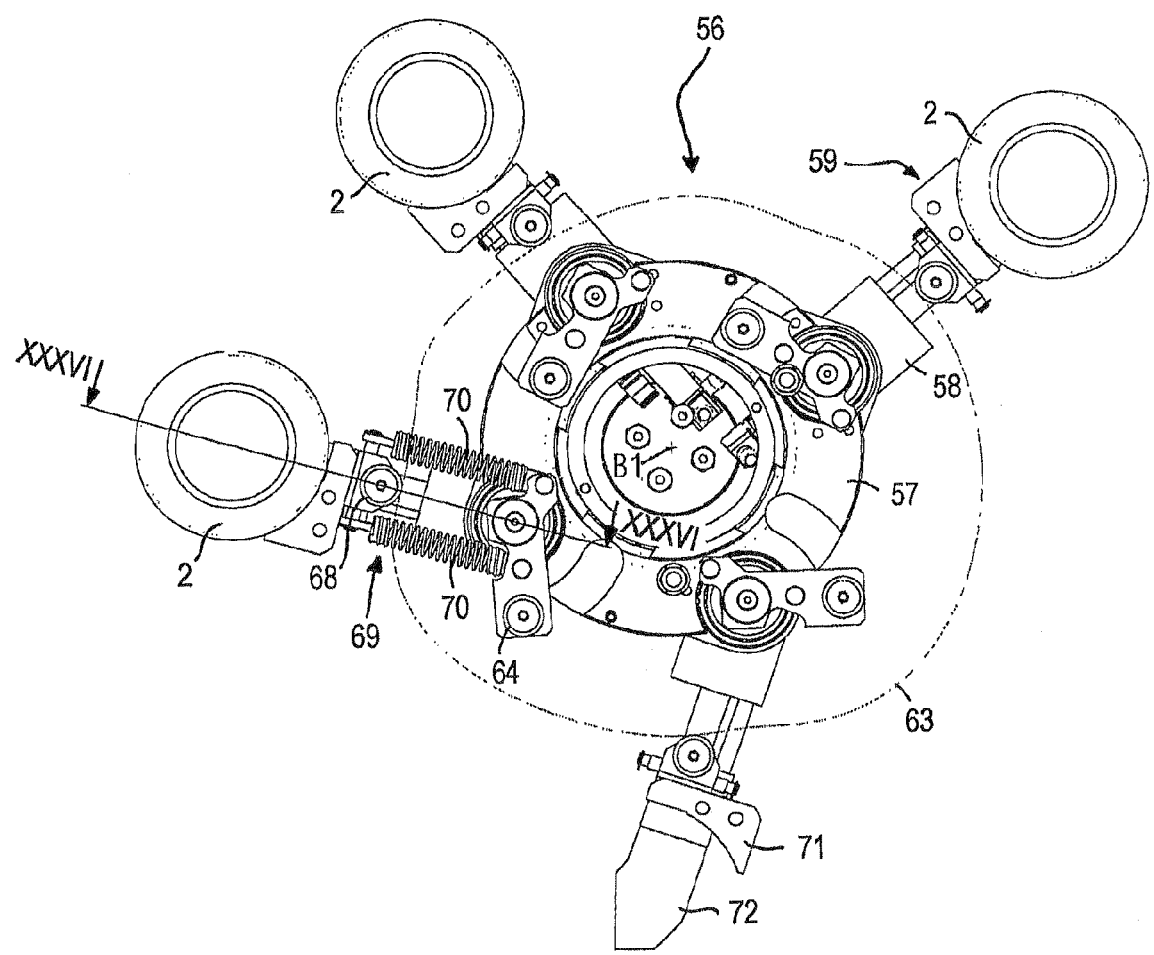
FIG. 35 is a schematic plan view of a moving carousel.
Figure 36:
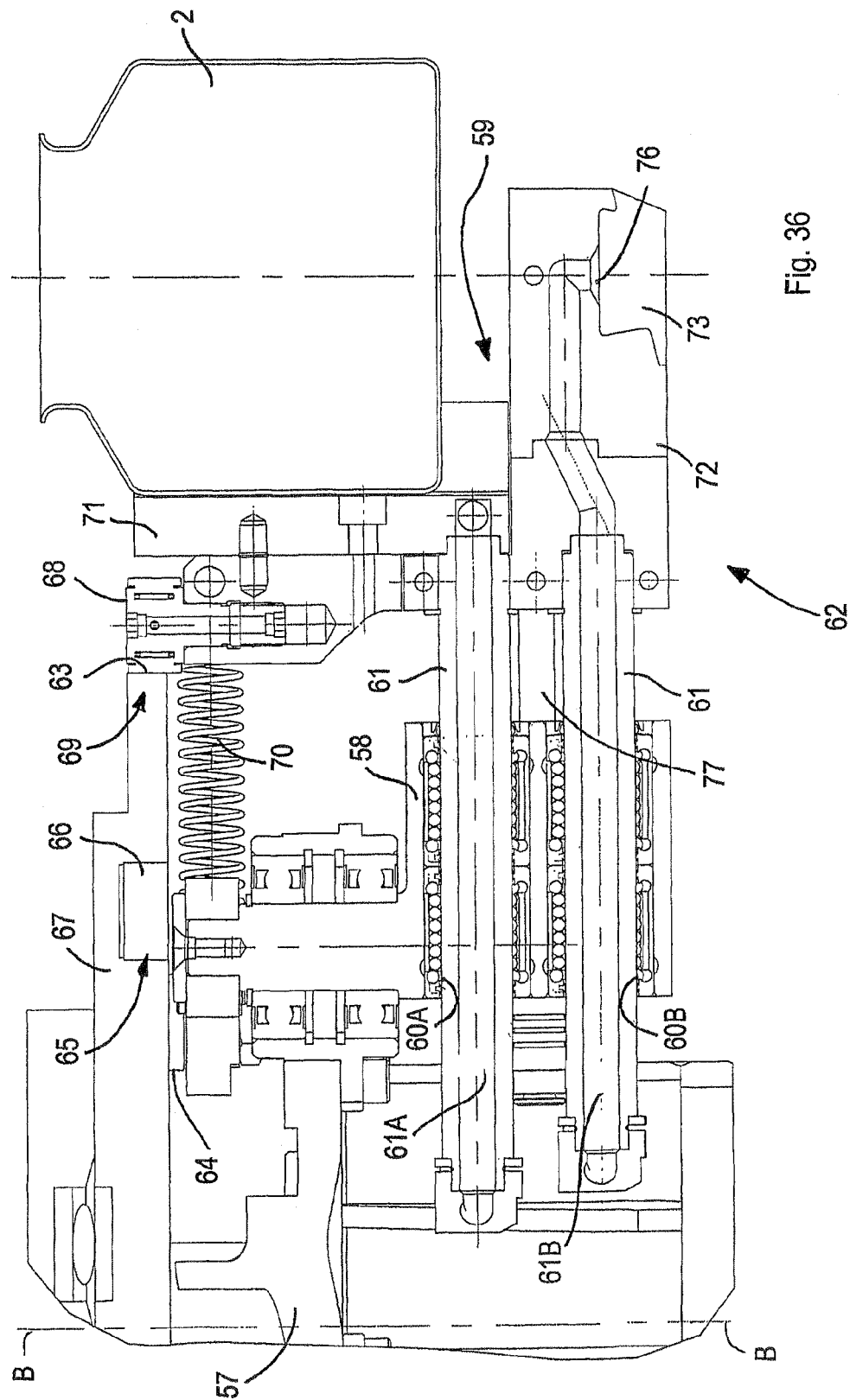
FIG. 36 is a section taken along a plane XXXVI-XXXVI of FIG. 35.
Figure 37:
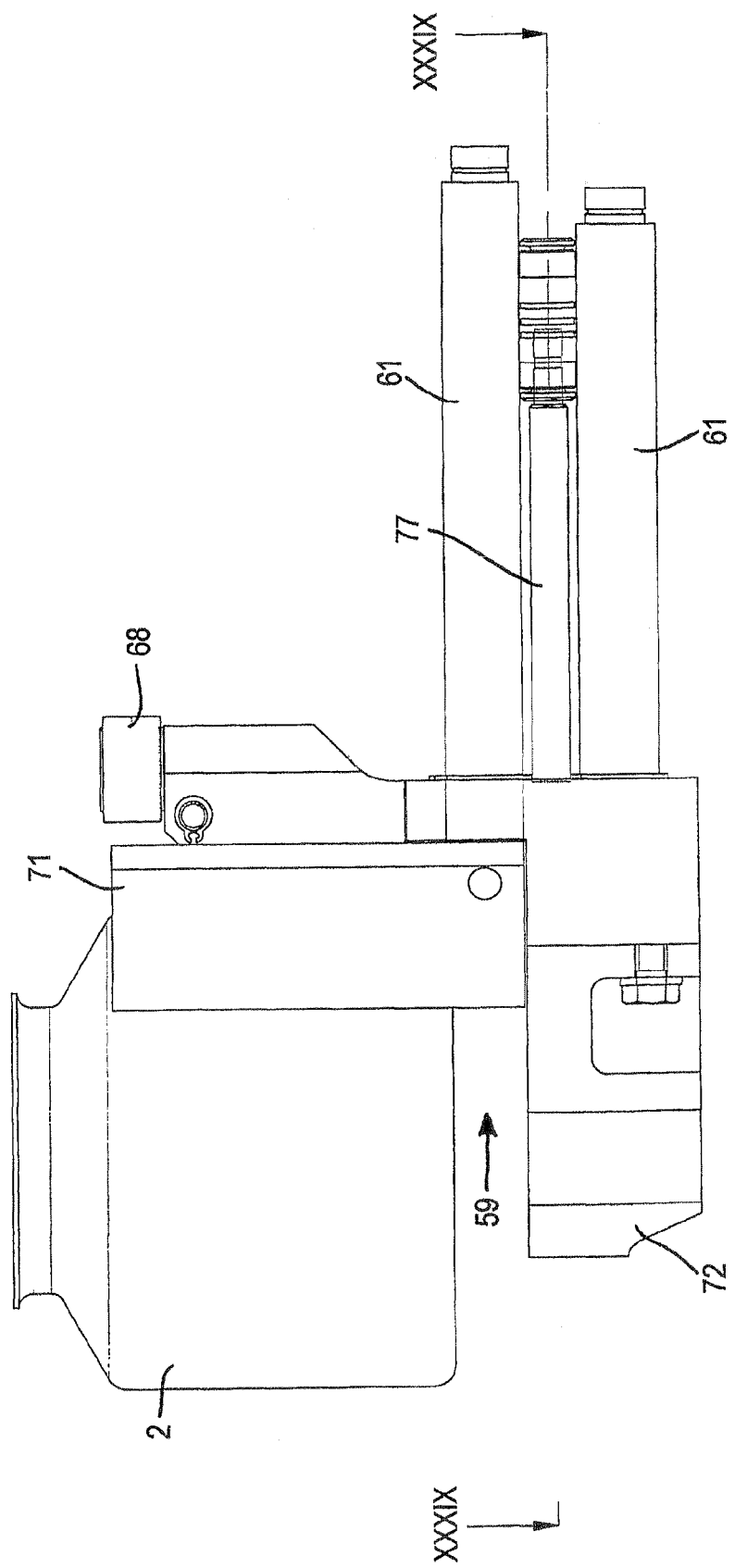
FIG. 37 is a side view of the holding element of the carousel in FIG. 35.
Figure 38:
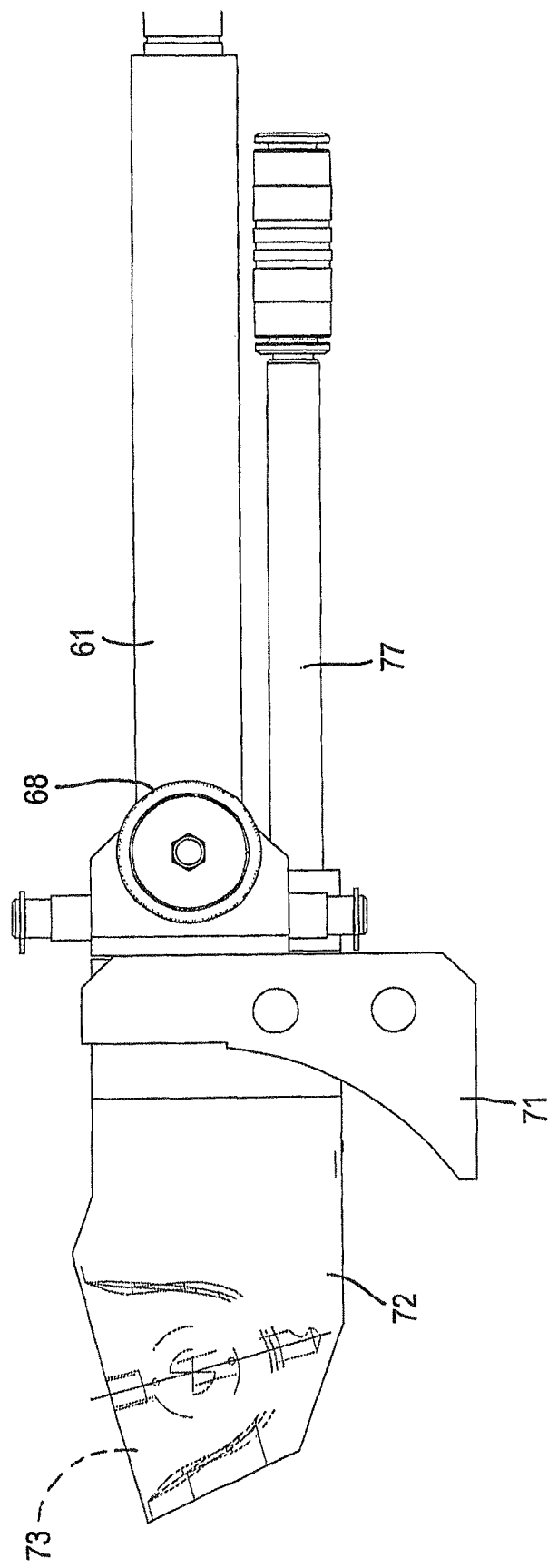
FIG. 38 is a plan view of the holding element in FIG. 37.
Figure 39:
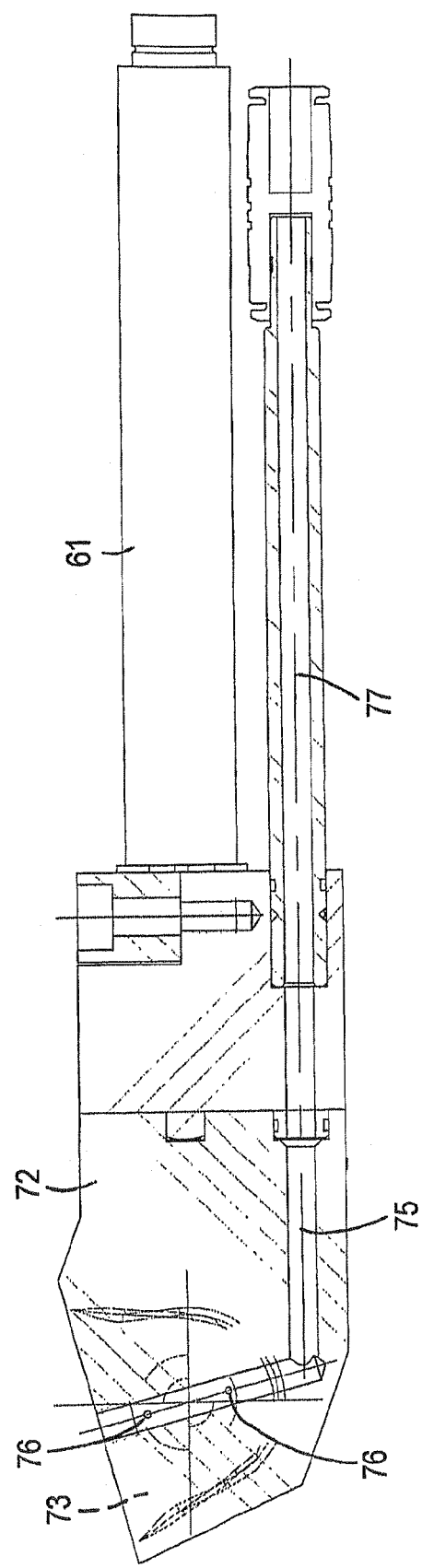
FIG. 39 is a section taken along a plane XXXIX-XXXIX of FIG. 37.

FIG. 27 shows an embodiment of the moving carousel 56 comprising three supporting elements 58, while FIG. 35 shows an embodiment of the moving carousel 56 comprising four supporting elements 58.

Each supporting element 58 is provided with a hole arrangement 60 inside which a guiding bar arrangement 61 slides, a respective removing element 59 being fixed at an end zone 62 of said guiding bar arrangement 61.

The hole arrangement 60 comprises a first hole 60A and a second hole 60B, The guiding bar arrangement 61 comprises a first guiding bar 61A, which is slidable in the first hole 60A, and a second guiding bar 61B, which is slidable in the second hole 60B.

A rolling element 64 is rotatably supported to each supporting element 58, said rolling element 64 being arranged for engaging with a cam device 65.

The cam device 65 is shaped like a groove 66 made in a plate 67 of the moving carousel 55 which is maintained in a fixed position when the rotating body 57 starts rotating.

The rolling element 64 by interacting with the cam device 65 causes the supporting element 58 to rotate in relation to the rotating body 57.

A further rolling element 68 is rotatably supported to each removing element 59, said further rolling element 68 being arranged for engaging with a further cam device 69.

The further cam device 69 is shaped like a track 63 made in an edge zone of the plate 67.

An elastic element 70, which is shaped, for example, like a helical spring, is interposed between each supporting element 58 and the corresponding removing element 59, said elastic element 70 acting as return element arranged to cause a sliding of the guiding bar arrangement 61 in relation to the hole arrangement 60, which sliding tends to bring the removing element 59 near the supporting element 58.

The further rolling element 68, by cooperating with the elastic element 70 and interacting with the further cam device 69, causes the guiding bar arrangement 61 to slide inside the hole arrangement 60, and, consequently, it causes the removing element 59 to move towards, or away from, the supporting element 58.

Each removing element 59 comprises a first handling element 71 arranged for removing a container 2 from an apparatus 1 of the forming carousel 55 and a second handling element 72 arranged for delivering a dose 37 to the aforementioned apparatus 1.

The first handling element 71 may comprise a suction cup device arranged for creating a vacuum which retains the containers 2.

The suction cup device can be shaped so as to generate a flow of pressurized fluid arranged to facilitate release of the containers 2 by the first handling element 71.

The second handling element 72 comprises a cavity 73 arranged for removing a dose 37 from an extruder 74 and for containing the dose 37, when rotating body 57 rotates.

A conduit 75 is made in the second handling element 72, said conduit 75 being arranged for conveying a pressurized fluid, for example compressed air, which penetrates inside the cavity 73 through an orifice 76.

The aforementioned flow of fluid promotes ejection of the dose 37 from the cavity 73 and the insertion of the dose 37 in the further die arrangement 5, as disclosed below in greater detail.

The conduit 75 is connected to a further conduit 77 supplied by pressurized a fluid generating device, which is not shown.

Alternatively, the rotating body 57 and the supporting element 58 can be moved by means of another type of device, such as for example a pneumatic actuating device or electro-mechanical actuating device, instead of by the cam device and the further cam device.

In an embodiment that is not shown, the supporting elements can slide in relation to the moving carousel and rotatably support the removing elements.

In this case, a cam device is provided which controls the sliding of the supporting elements in relation to the moving carousel and a further cam device which controls the rotation of the removing elements in relation to the supporting elements.

Alternatively, the supporting elements and the removing elements can be moved by means of another type of device, such as for example a pneumatic actuating device or an electromechanical actuating device, instead of by the cam device and the further cam device.

In an embodiment that is not shown, the cam device and the further cam device can be associated with the forming carousel 55 instead of with the moving carousel 56.

In particular, the cam device and the further cam device can comprise an abutting arrangement placed on the forming carousel 55, for example on the stretch-blow-moulding moulds 4.

In another embodiment that is not shown, the extracting elements comprise a first supporting block slidable in relation to the rotating body 57 and a second supporting block supporting a removing element and slidable in relation to the first supporting block (system with interpolating axes).

In a further embodiment that is not shown, the extracting elements comprise a first arm, which is oscillatable in relation to the rotating body 57 and a second arm, which supports a removing element and is oscillatable in relation to the first arm.

In these cases too, cam driving devices or pneumatic driving devices or electromechanical driving devices may be provided.

With reference to FIG. 27, a working cycle of the moving carousel 56 is disclosed.

When the moving carousel 56 rotates in the direction E1, the removing elements 59 successively assume a plurality of operating positions.

In a first operating position P1, a removing element 59 interacts with the extruder 74.

In the first operating position P1, the second handling element 72 of the aforementioned removing element 59 removes a dose 37 from the extruder 74. No container 2 is associated with the first handling element 71.

In a second operating position P2, the removing element 59 interacts with the forming carousel 55.

In the operating position P2 the first handling element 71 removes a container 2 from an apparatus 1, while the second handling element 72 releases the dose 37 to the aforementioned apparatus 1.

In a third operating position P3, the removing element 59 interacts with a removing carousel 78.

In the third operating configuration P3, the first handling element 71 releases the container 2 to a receiving unit 79 of a plurality of receiving units provided on the removing carousel 78. No dose is associated with the second handling element 72.

The cam device 65 and the further cam device 69 are so shaped that the first handling element 71 and the second handling element 72 travel along a trajectory which partially overlaps a further trajectory identified by the apparatuses 1, when the forming carousel 55 rotates.

This makes it possible to provide a prolonged time interval during which the first handling element 71 and the second handling element 72 interact with the die arrangement 9 and the further die arrangement 5, respectively, so that a container 2 can be removed more easily from the apparatus 1 and a dose 37 can be introduced with greater precision in the apparatus 1.

Furthermore, the cam device 65 and the further cam device 69 are so shaped that the first handling elements 71, near the forming carousel 55, travel along a trajectory which is such as not to interfere with the first half-mould 12 and the second half-mould 13, which are in the open configuration C, and with the further first half-mould 24 and the further second half-mould 25, which are in the release configuration Z.

In this way, a container 2—i.e. a very bulky object—can be removed from a narrow space like that identified between the first half-mould 12 and the further first half-mould 24 on the one side, and the second half-mould 13 and the further second half-mould 25 on the other side, without the first handling element 71—or the container 2 retained by the first handling element 71—knocking against the neck forming arrangement 10 and/or the die arrangement 9.

Furthermore, the cam device 65 and the further cam device 69 can be so shaped as to enable removing elements 59 to remove a container 2 from the forming carousel 1 and to release the container 2 to the removing carousel 78 also if the pitch between two apparatuses 1 arranged in adjacent positions on the forming carousel 55 differs from the pitch between two receiving units 79 arranged in adjacent positions on the removing carousel 78.

With reference to FIGS. 64 to 69, a moving carousel 256 is shown, comprising an inserting arrangement 201 provided with a body 206, which is rotatable around an axis B2 and supports inserting elements 202 arranged for delivering the doses 37 to the apparatuses 1 mounted on the forming carousel 55. The body 206 is substantially cylinder-shaped.

The moving carousel 256 further comprises an extracting arrangement 203 provided with a further body 207 rotating around the axis B2 and positioned above the body 206. The further body 207 is substantially tubular.

The further body 207 supports extracting elements 204 arranged for removing the containers 2 from the apparatuses 1.

The further body 207 is moved by means of a moving device 205, so as to rotate in a synchronized manner in relation to the body 206.

The moving device 205 may comprise a motor arrangement arranged for driving the body 206, or the further body 207, and transmission arrangement 208 arranged for transmitting motion to the further body 207, or the body 206, respectively. In this way, the movement of the body 206 is synchronized with the movement of the further body 207.

Alternatively, the moving device 205 may comprise a first motor arranged for driving the body 206 and a second motor, independent of the first motor, arranged for driving the further body 207.

The first motor and the second motor are synchronized by means of an electronic control unit.

In both the cases disclosed above, it is possible to synchronize a rotation speed and/or an angular position of the body 206 with a further rotation speed and/or a further angular position of the further body 207.

Figure 64:
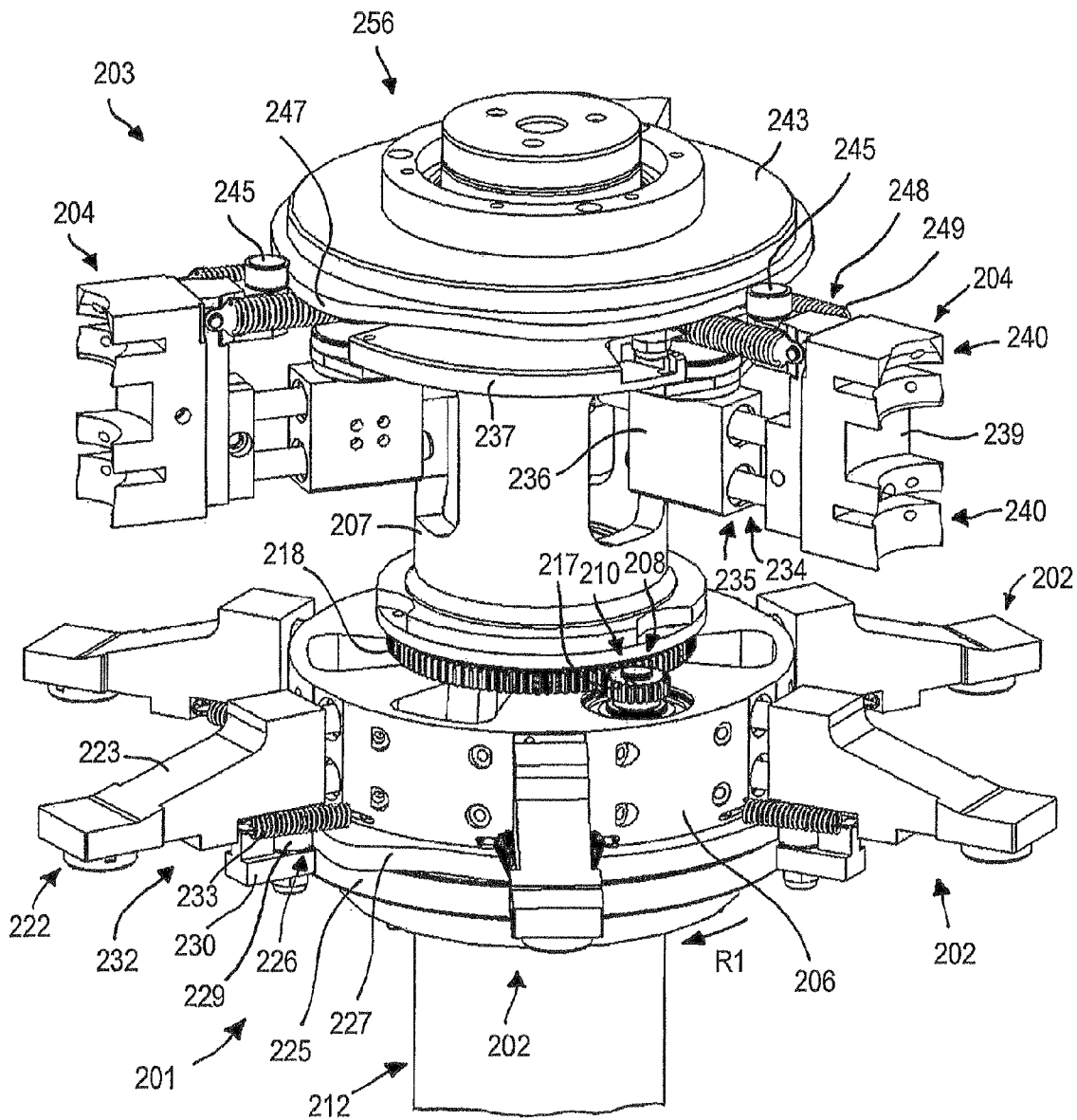
FIG. 64 is a perspective view of an embodiment of a moving carousel.
Figure 65:
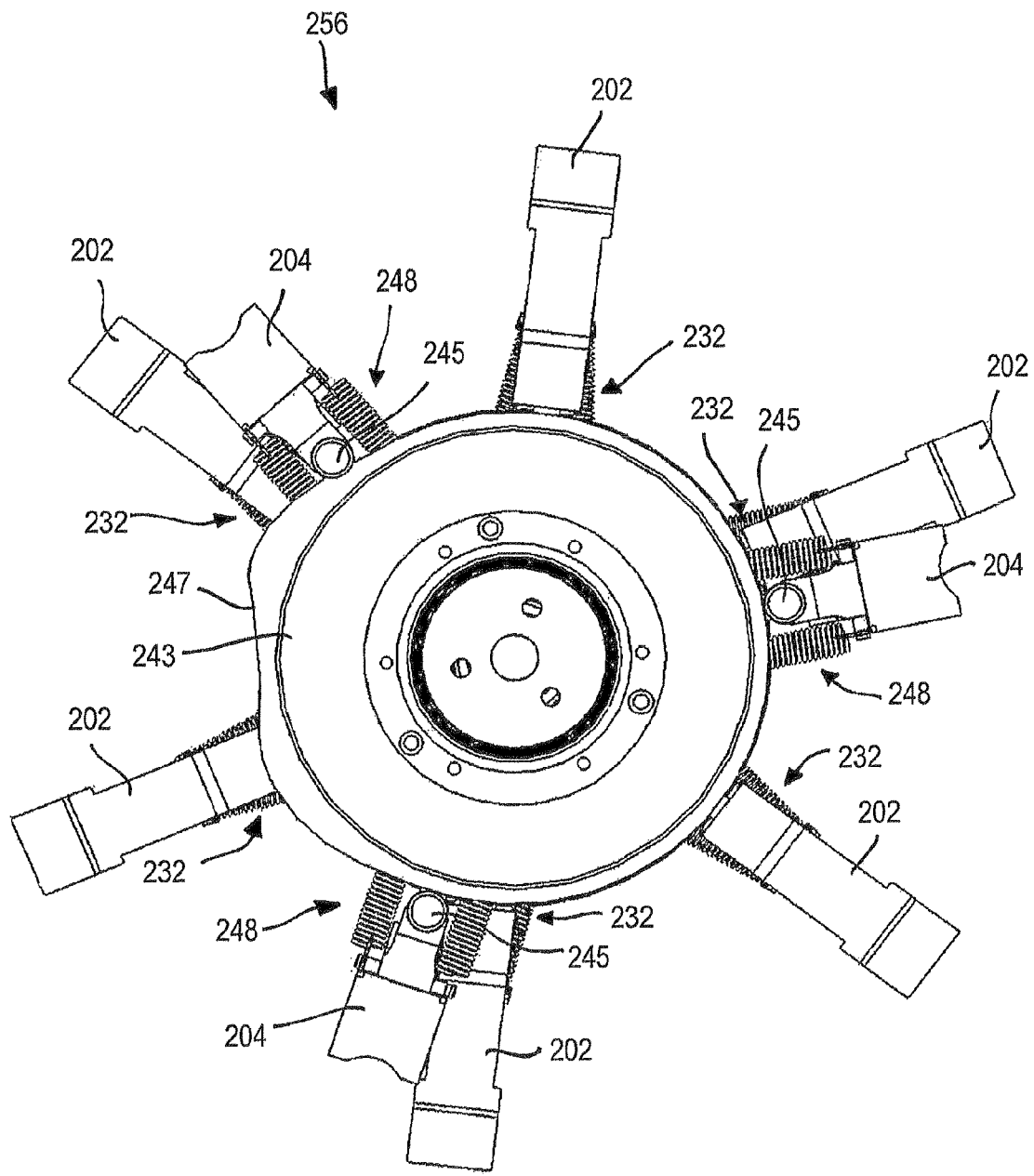
FIG. 65 is a top view of the moving carousel in FIG. 64.
Figure 66:
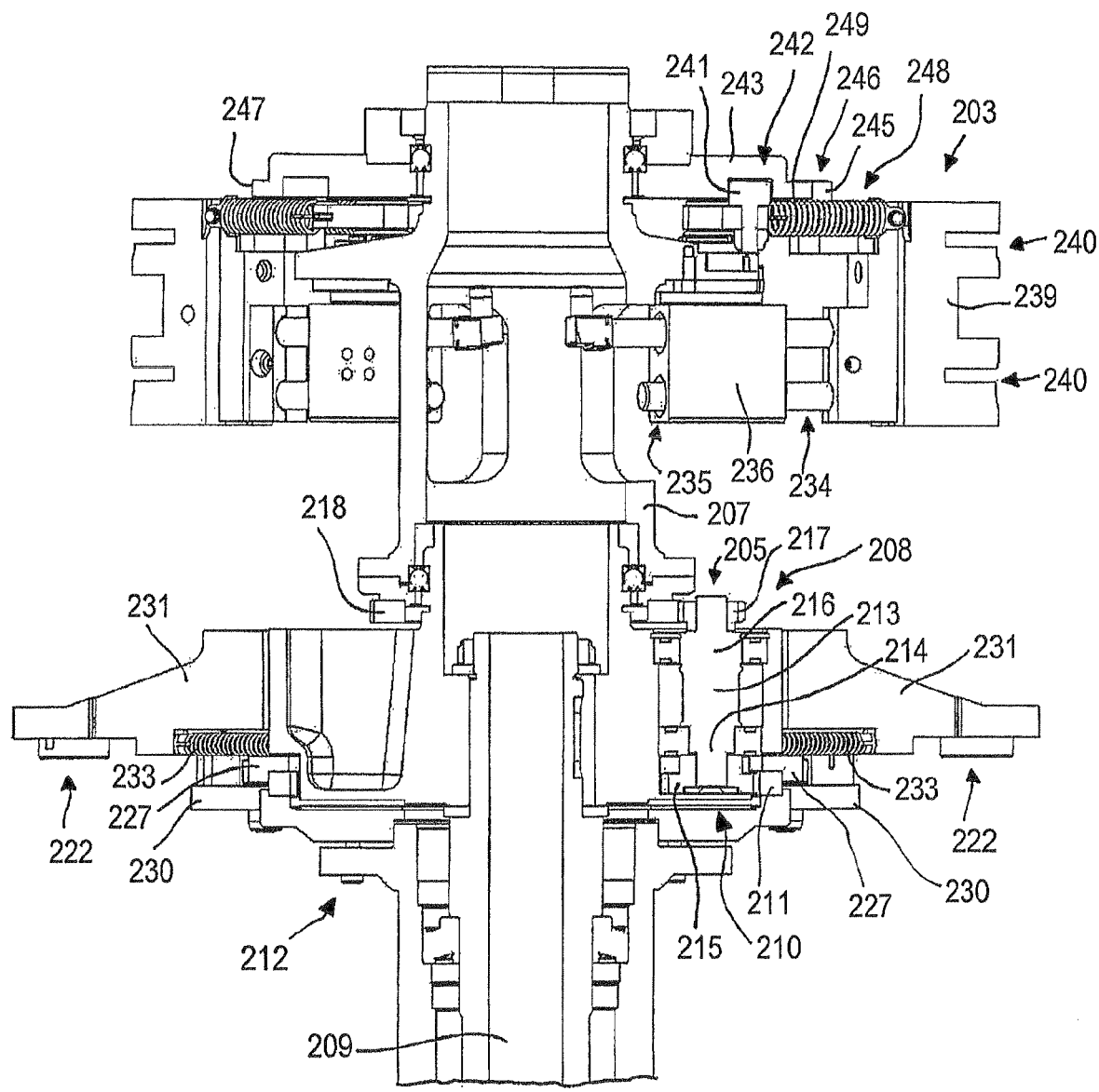
FIG. 66 is a longitudinal section of the moving carousel in FIG. 64.
Figure 67:
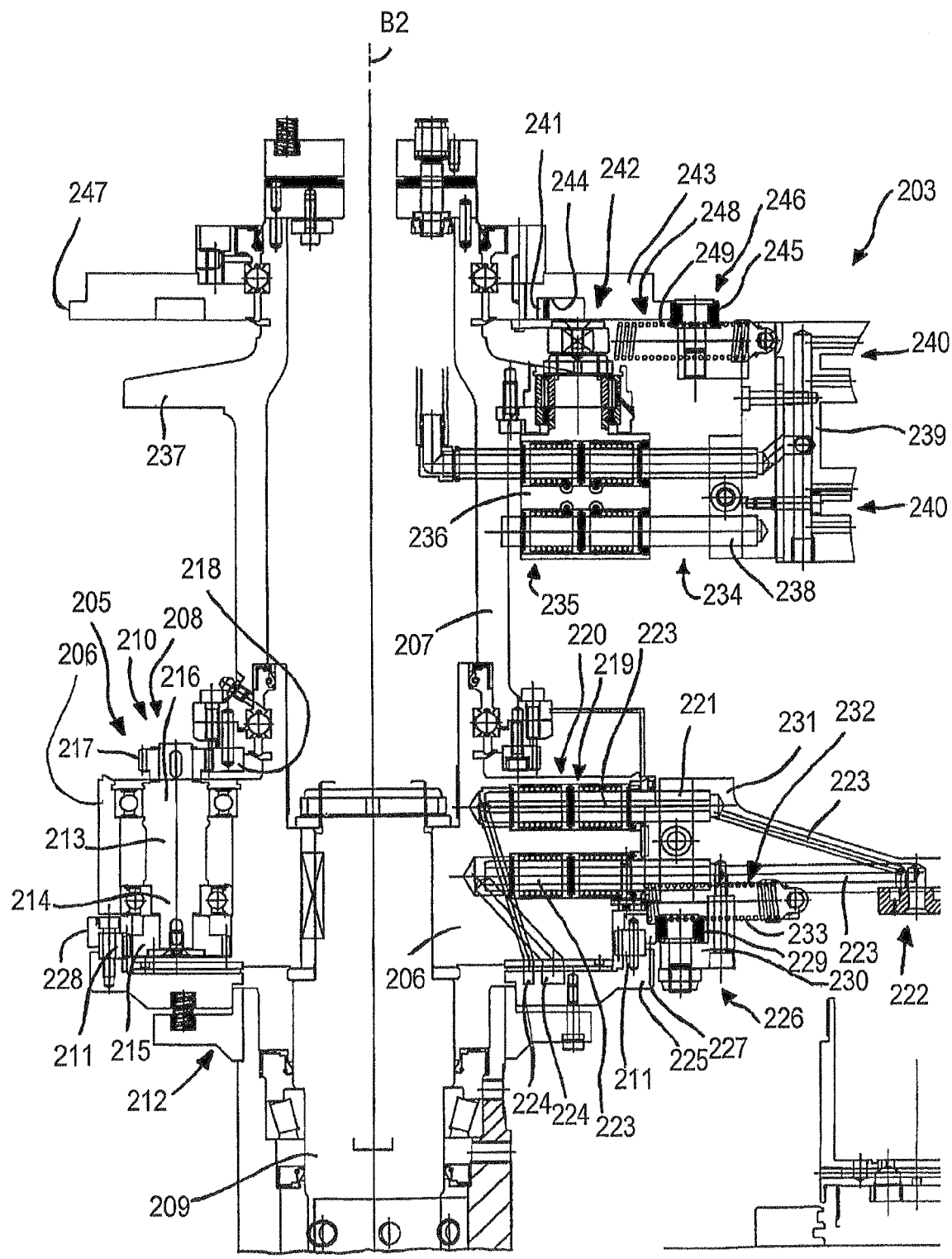
FIG. 67 is a further longitudinal section of the moving carousel in FIG. 64.

As shown in FIGS. 64, 66 and 67, the motor arrangement comprises a shaft 209, which is rotatable in a direction of rotation R1, which rotates the body 206. Shaft 209 may be moved by the forming carousel 55 by a further transmission arrangement that is not shown.

The transmission arrangement 208 comprise an epicycloidal transmission 210 provided with a first gearwheel 211, with internal gear teeth, fixed to a first plate 225. The first plate 225 is mounted on a supporting structure 212, which is tubular and arranged for supporting the inserting arrangement 201. The first plate 225, and therefore the first gearwheel 221, remain in a fixed position when the body 206 is rotated.

The epicycloidal transmission 210 further comprises a pin 213 rotatably supported by the body 206 and provided, at one end 214, with a second gearwheel 215 coupled with the first gearwheel 211 and provided with a third gearwheel 217 at a further end 216.

The third gearwheel 217 is coupled with a fourth gearwheel 218 fixed to the further body 207.

In this way, the further body 207 also rotates in the rotation direction R1.

The further body 207 can rotate around the axis B2 at a rotation speed different from that of the body 206.

In particular, the angular speed of the further body 207 can be related to the angular speed of the body 206, so that an extracting element 204 associated with the further body 207 and an inserting element 202 associated with the body 206, interact—substantially simultaneously—with a same apparatus 1 of the forming carousel 55. It is thus possible to obtain a moving carousel 356 in which the number of extracting elements 204 and the number of inserting elements 202 are independent of each other. In particular, the number of extracting elements 204 may be different from the number of inserting elements 202.

In the moving carousel 256 shown in FIGS. 64 to 69, the number of the inserting elements 202 is double that of the extracting elements 204.

The first gearwheel 211, the second gearwheel 215, the third gearwheel 217 and the fourth gearwheel 218 are, therefore, made so that the angular speed at which the body 206 rotates is half of a further angular speed at which the further body 207 rotates.

Furthermore, the body 206 and the further body 207 are moved synchronously so that while a formed container 2 is removed by an extracting element 204, an inserting element 202 deposits a dose 37 in the further die arrangement 5.

The inserting elements 202 are so shaped as to be able to slide radially in relation to the body 206.

The inserting elements 202 are arranged on a peripheral edge zone of the body 206 at substantially constant angular intervals.

The moving carousel 256 comprises six inserting elements 202.

Each inserting element 202 comprises a first guiding bar 219 arranged for sliding radially inside a first hole 220 of the body 206.

A supporting block 231 is fixed at one end 221 of the first guiding bar 219, said supporting block 231 being arranged for supporting a cavity 222 partially shown in FIGS. 64, 66 and 67.

The cavity 222 is arranged for removing a dose 37 from the extruder 74, to retain the dose 37 while the body 206 rotates and to release the dose 37 to the forming carousel 55.

In the supporting element 231, in the first guiding bar 219 and in the body 206 two conduits 223 are made leading into the cavity 222 and communicating with distribution circuits 224 made in the first plate 225.

One of the conduits 223 is connected to a distribution circuit 224 maintained under vacuum and is arranged for sucking air from the cavity 222 in such a way as to retain dose 37.

The other conduit 223 is connected to a distribution circuit 224 for a pressurized fluid, for example compressed air, and is arranged for conveying this fluid to promote ejection of the dose 37 retained by the cavity 222 and the insertion of the dose 37 in the further die arrangement 5.

The inserting arrangement 201 comprises further a first cam device 226 which causes the inserting elements 202 to move in relation to the body 206.

The first cam device 226 comprises a first cam 227 fixed to the first plate 225 and provided with a shaped surface 228 on which first rolling elements 229 rotate.

Each first rolling element 229 is rotatably supported by an L-shaped arm 230 which is, in turn, fixed to a respective supporting block 231.

A first elastic element 232, for example helical springs 233, is interposed between each supporting block 231 and the rotating body 206, said first elastic element 232 acting as return element arranged to cause a sliding of the first guiding bar 219 in relation to the first hole 220, which sliding tends to bring the cavity 222 near to the body 206.

The first rolling element 229, by cooperating with the first elastic element 232 and interacting with the first cam device 226, causes the first guiding bar 219 to slide inside the first hole 220, and, consequently, it causes the cavity 222 to move towards, or away from, the body 206.

The shaped surface 228 is so shaped that the cavity 222 travels through a first trajectory which partially overlaps a trajectory identified by the apparatuses 1, when the forming carousel 55 is rotated.

This—together with an interaxis between the moving carousel 256 and the forming carousel 55 and a number of appropriately selected inserting elements 202—provides for a time interval prolonged sufficiently to enable the cavity 222 to deliver the doses 37 to the further die arrangement 5.

In an embodiment that is not shown, the first cam device may be associated to the forming carousel 55 rather than to the moving carousel 256.

In particular, the first cam device may comprise abutting elements placed on the moulding carousel 55, for example, on the compression-moulding moulds 3.

The inserting elements 202 can be moved by means of another type of device, for example a pneumatic actuating device or an electromechanical actuating device, rather than through the first cam device 226.

The moving carousel 256 comprises three extracting elements 204.

Each extracting element 204 comprises second guiding bar 234 arranged for longitudinally sliding inside a second hole 235 of a respective supporting element 236.

Each supporting element 236 is rotatably supported by a projection 237 which projects out from the further body 207.

A removing element 239 is provided at a further end 238 of the second guiding bar 234.

The removing elements 239 therefore have two degrees of freedom in comparison to the further body 207 as they can rotate—together with the supporting element 236—in relation to the further body 207 and slide in relation to the supporting element 236.

Each removing element 239 is arranged for removing a container 2 from an apparatus 1 of the forming carousel 55 and may comprise a suction cup device 240, similar to those disclosed with reference to FIGS. 35 to 39.

A second rolling element 241 is rotatably supported to each supporting element 236, said second rolling element 241 being arranged for engaging with a second cam device 242.

The second cam device 242 is shaped like a groove 244 made in a second plate 243 of the moving carousel 256, which second plate is maintained in a fixed position when the further body 207 rotates.

The second rolling element 241, by interacting with the groove 244, causes the supporting element 236 to rotate in relation to the body 207.

A further second rolling element 245 is rotatably supported to each removing element 239, said further second rolling element 245 being arranged for engaging with a further second cam device 246.

The further second cam device 246 comprises a further shaped surface 247 made in an edge zone of the second plate 243.

A second elastic element 248, for example helical springs 249, is interposed between each supporting element 236 and the corresponding removing element 239, said second elastic element 248 acting as return element arranged for causing a sliding of the second guiding bar 234 in relation to the second hole 235, which sliding tends to bring the removing element 239 near to the supporting element 236.

The further second rolling element 245, by cooperating with the second elastic element 248 and interacting with the further second cam device 246, causes the second guiding bar 234 to slide inside the second hole 235, and, consequently, it causes the removing element 239 to move towards to, or away from, the supporting element 236.

The second cam device 242 and the further second cam device 246 are so shaped that the removing elements 239 travel through a second trajectory which partially overlaps the further trajectory identified by the apparatuses 1, when the forming carousel 55 rotates, in such a way that each removing element 239 can remove a container 2 from an apparatus 1.

Furthermore, the second cam device 242 and the further second cam device 246 are so shaped that the further trajectory is such that the extracting elements 204, near the forming carousel 55, do not interfere with the first half-mould 12 and the second half-mould 13, which are in the open configuration C, and with the further first half-mould 24 and the further second half-mould 25, which are in the release configuration Z.

The extracting elements 204 can be moved by means of other kind of device, such as a pneumatic actuating device or an electromechanical actuating device, rather than by the second cam device 242 and the further second cam device 246.

Alternatively, in an embodiment that is not shown, the supporting elements can slide in relation to the further body and rotatably support the removing elements.

In this case, a second cam device is provided which controls the sliding of the supporting elements in relation to the moving carousel and a further second cam device which causes the removing elements to rotate in relation to the supporting elements.

Alternatively, the supporting elements and the removing elements can be moved by means of another type of device, such as a pneumatic actuating device or an electromechanical actuating device, rather than by the second cam device and the further second cam device.

In an embodiment that is not shown, the second cam device and the further second cam device can be associated with the forming carousel 55 rather than with the moving carousel 256.

In particular, the second cam device and the further second cam device may comprise abutting elements placed on the forming carousel 55, for example, on the stretch-blow-moulding moulds 4.

In another embodiment that is not shown, the extracting elements comprise a first supporting block that is slidable in relation to the further body and a second supporting block which supports a removing element and is slidable in relation to the first supporting block (system with interpolating axes).

In a further embodiment that is not shown, the extracting elements comprise a first arm, which is oscillatable in relation to the further body and a second arm which supports a removing element and is oscillatable in relation to the first arm.

In these cases too, cam driving devices or pneumatic driving devices or electromechanical driving devices may be provided.

Figure 68:
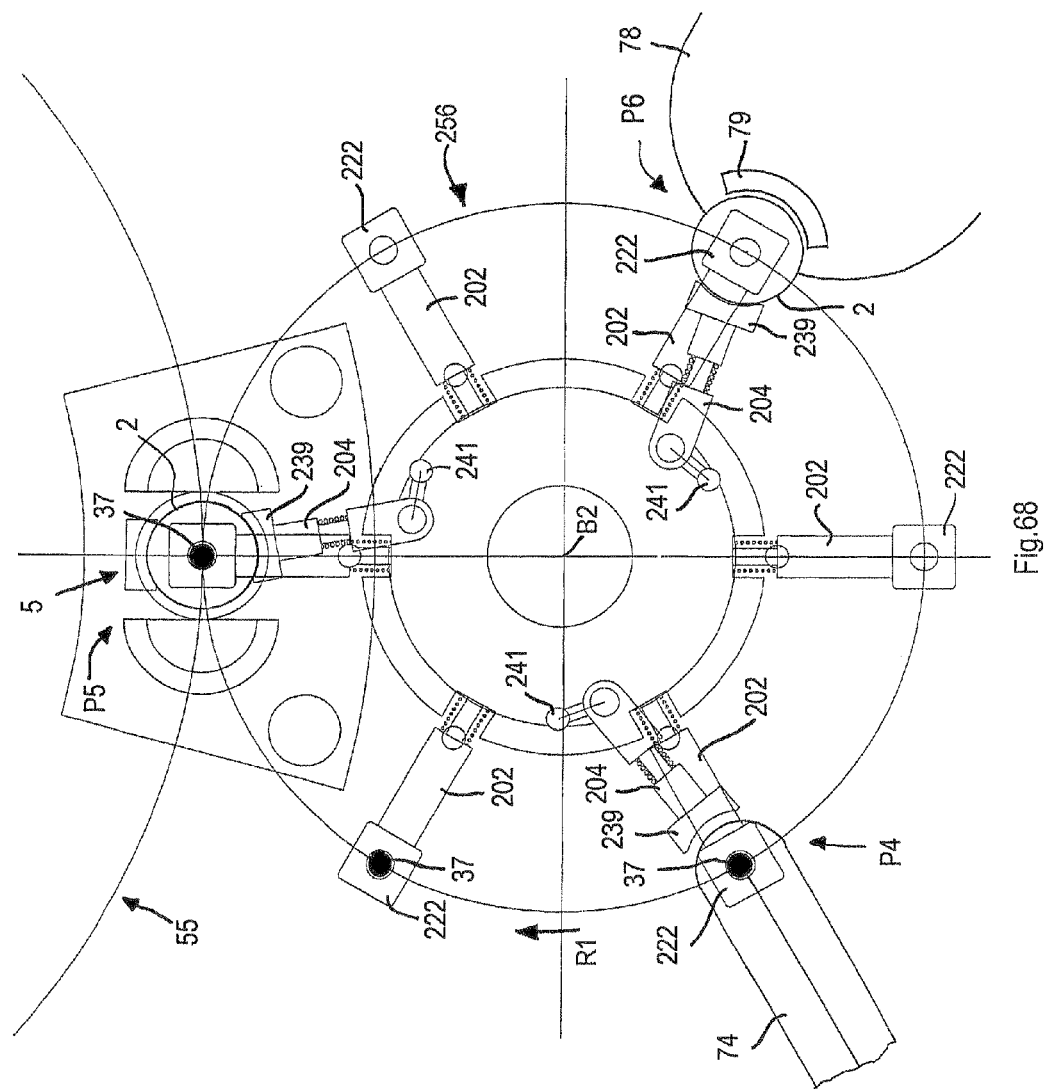
FIG. 68 is a schematic plan view of the moving carousel in FIG. 64.
Figure 69:
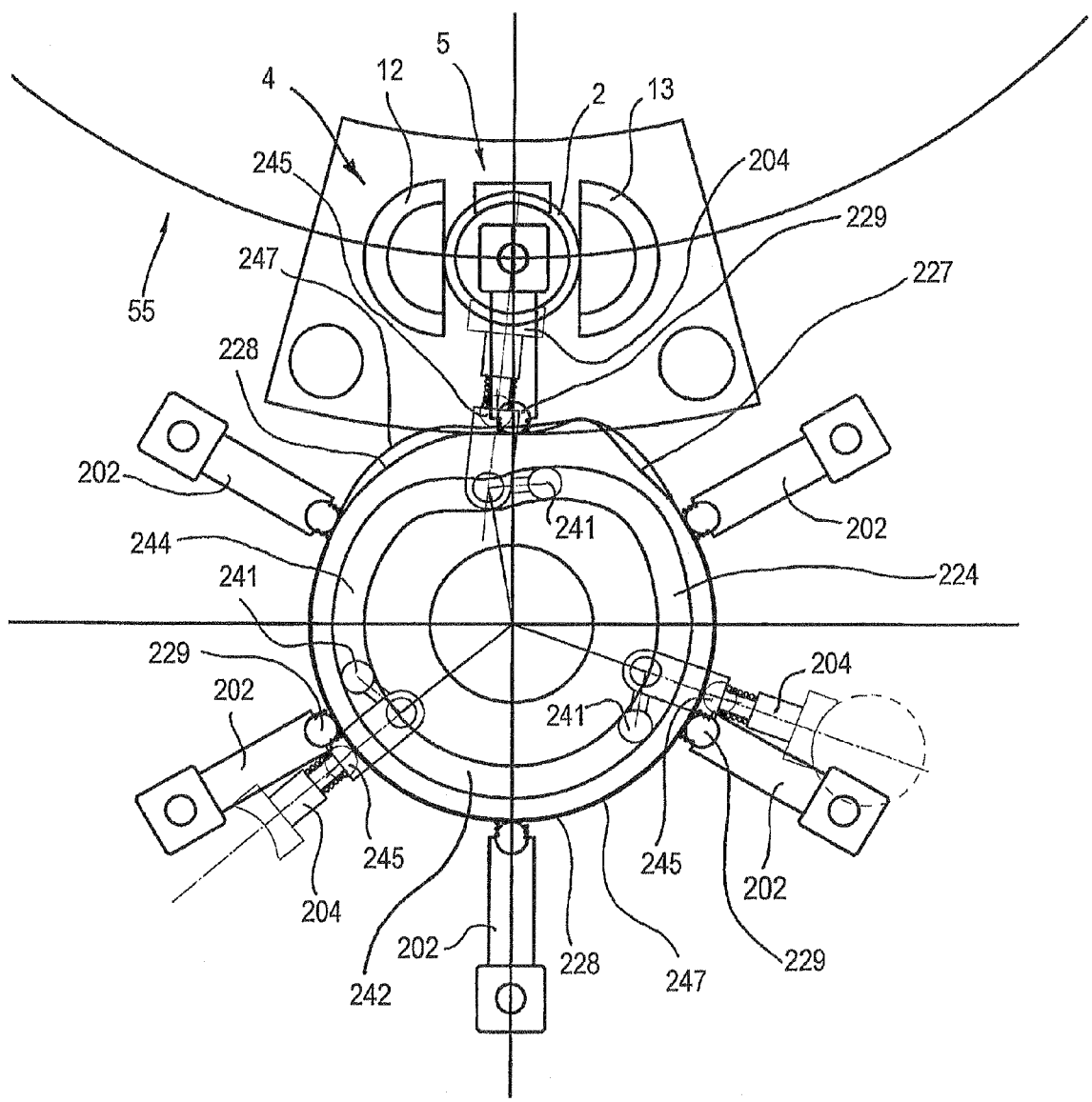
FIG. 69 is a further schematic plan view of the moving carousel in FIG. 64.

With reference to FIG. 68 a working cycle of the moving carousel 256 is disclosed.

When the body 206 and the further body 207 rotate in the rotation direction R1, the inserting elements 202 and the extracting elements 204 assume a plurality of operating positions in succession.

In a first operating position P4, the cavity 222 of an inserting element 202 interact with the extruder 74 and remove a dose 37 from the latter.

In a second operating position P5, the inserting element 202 interacts with the forming carousel 55 and delivers the dose 37 to the further die arrangement 5.

Meanwhile, in the second operating position P5, a removing element 239 removes a container 2 from an apparatus 1.

In a third operating position P6, the removing element 239 interacts with the removing carousel 78 and delivers the container 2 to a receiving unit 79 of a plurality of receiving units provided on the removing carousel 78.

Figure 70:
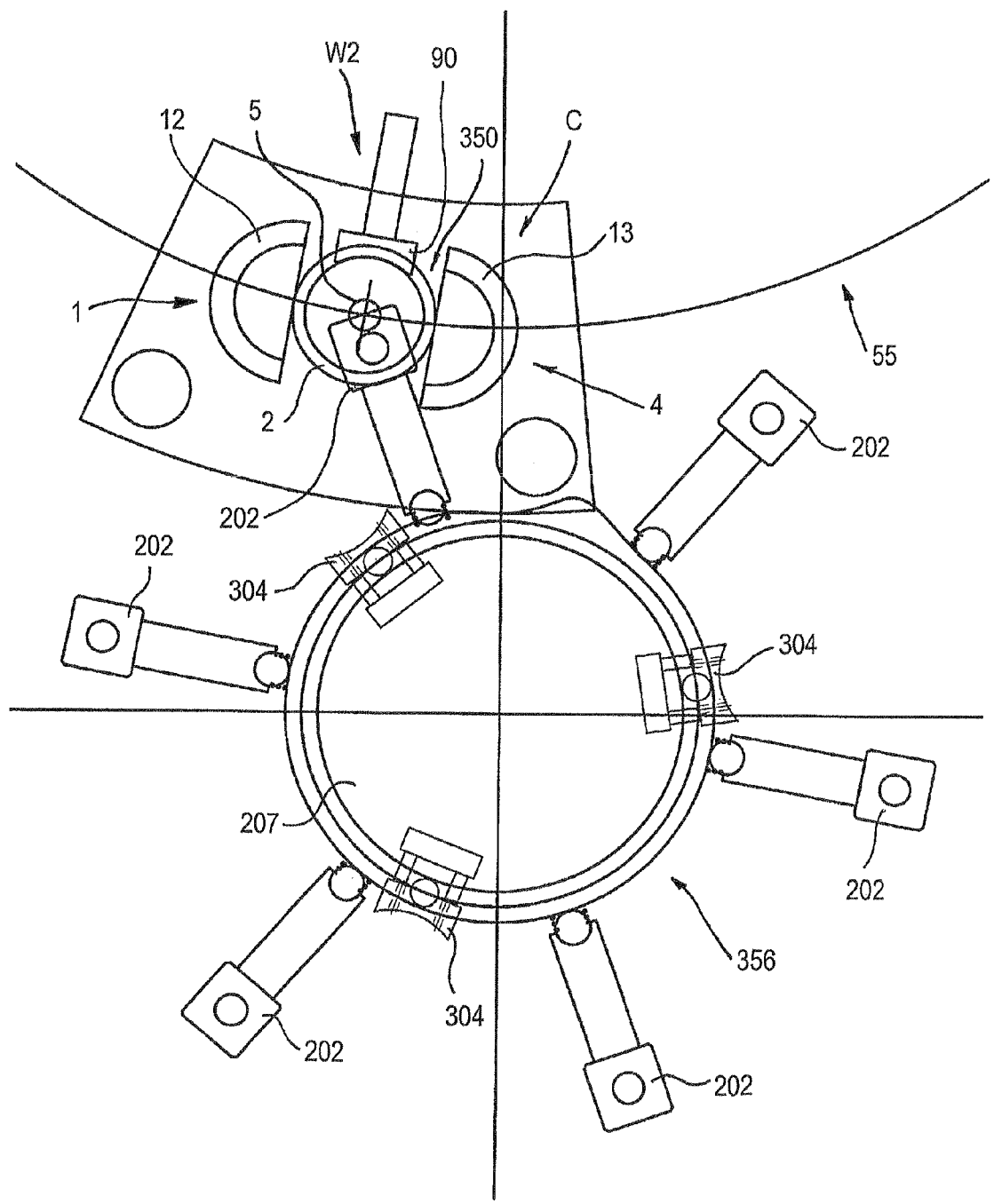
FIG. 70 is a schematic plan view of a moving carousel and a forming carousel, in an working cycle step.
Figure 71:
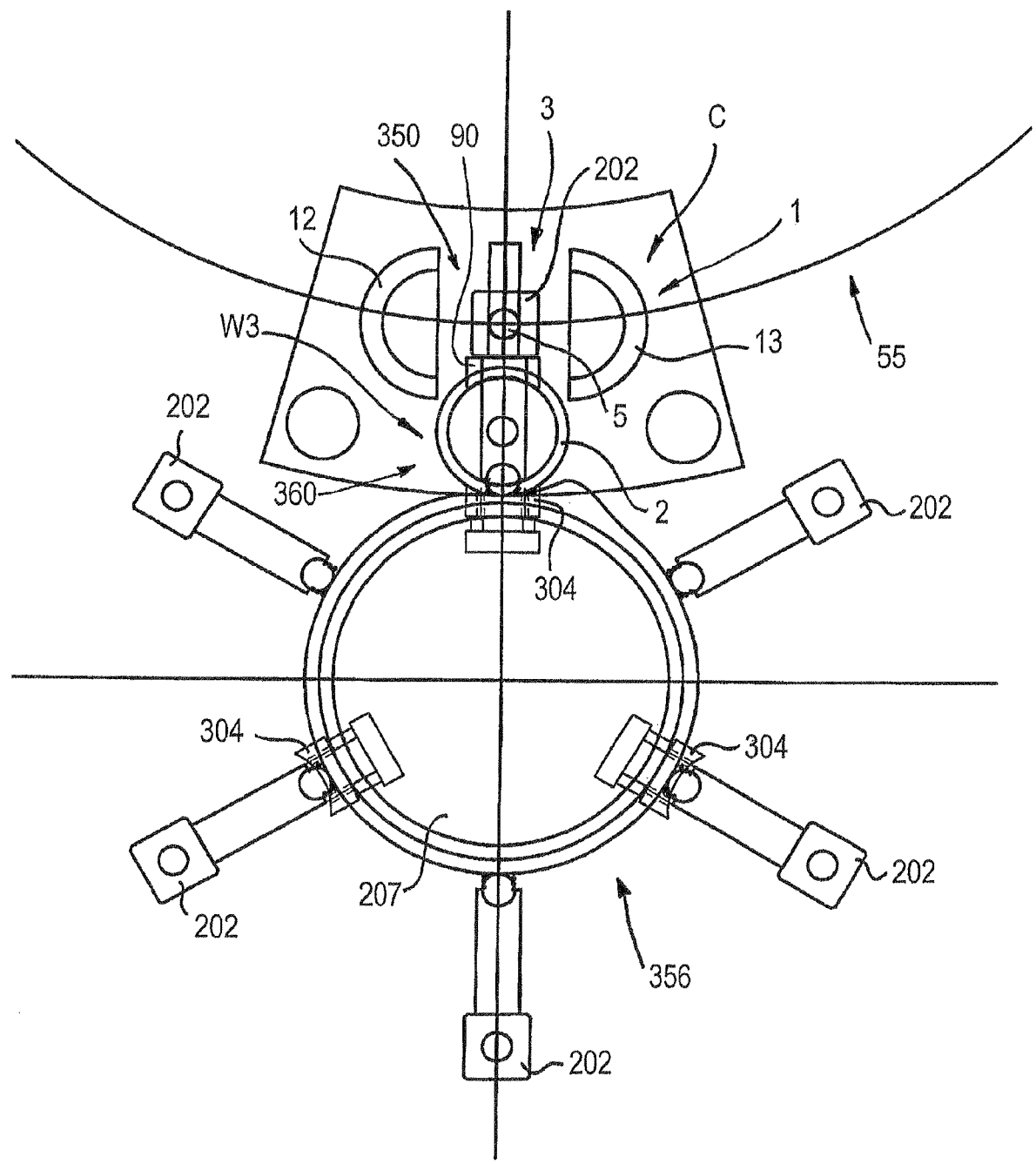
FIG. 71 is a schematic plan view of the moving carousel and the forming carousel of FIG. 70, in a further working cycle step.
Figure 72:
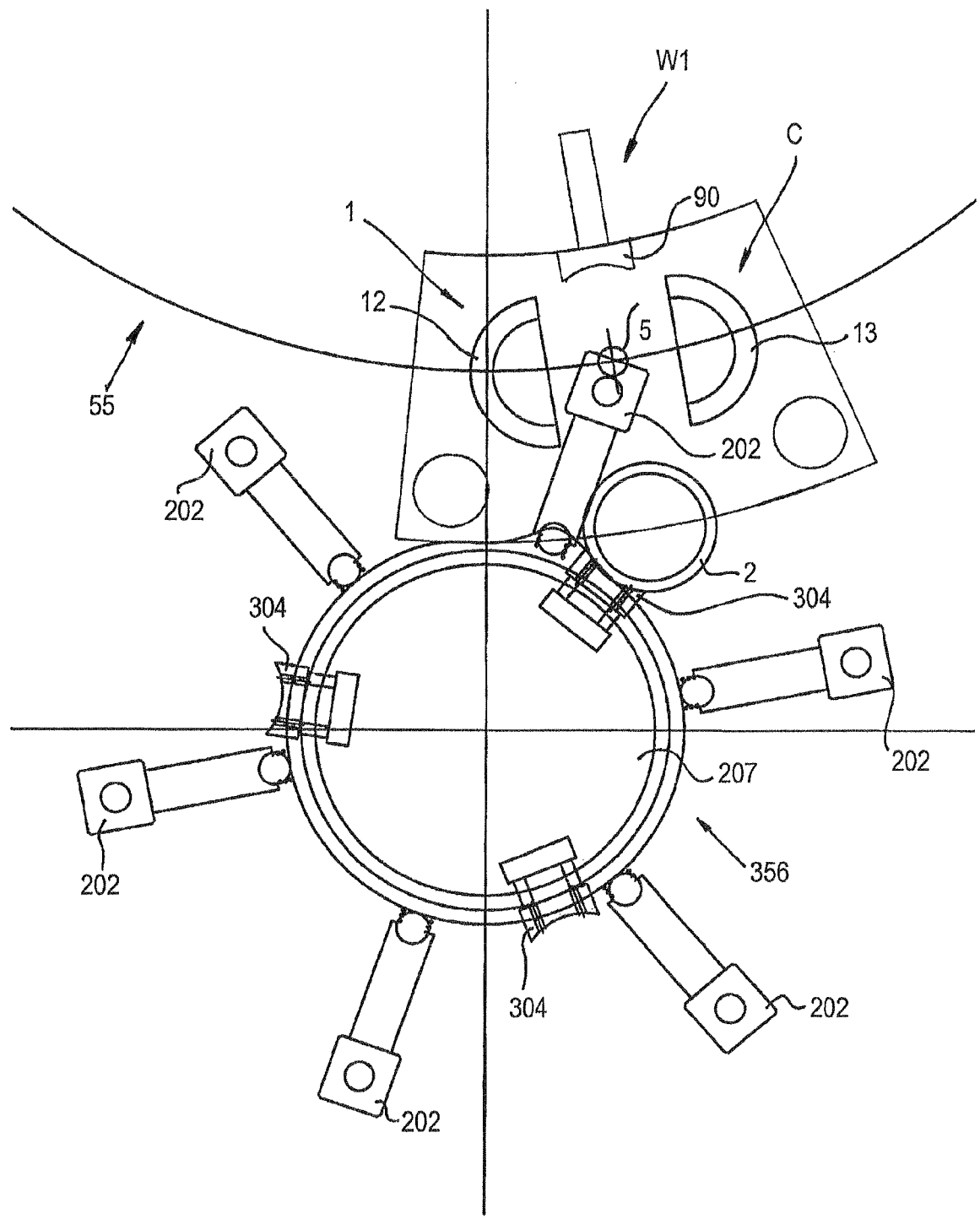
FIG. 72 is a schematic plan view of the moving carousel and the forming carousel of FIG. 70, in a still further working cycle step.

With reference to FIGS. 70 to 72, a positioning arrangement 90 mounted on the forming carousel 55 is shown.

The positioning arrangement 90 moves the containers 2 away from the stretch-blow-moulding arrangement 4.

In particular, the positioning arrangement 90 may comprise a plurality of positioning elements each cooperating with a respective apparatus 1.

A motors arrangement, not represented, is provided, which moves the positioning arrangement 90 towards, or away from, the apparatus 1.

The positioning arrangement 90 may be so shaped as to move the containers 2 towards a peripheral region 360 of the forming carousel 55. In this case, the motor arrangement can move the positioning arrangement 90 along a direction that is arranged substantially radial in relation to the forming carousel 55.

The motor arrangement may comprise, for example, an electromechanical actuating device, a pneumatic actuating device, a cam actuating device.

The motor arrangement moves the positioning arrangement 90 between a retracted configuration W1, shown in FIG. 72, in which the positioning arrangement 90 does not interact with a container 2 and enables the opening and closure of the first half-mould 12 and the second half-mould 13, and an advanced configuration W3, shown in FIG. 71, in which the positioning arrangement 90 arranges the container 2 in a peripheral zone 360 of the forming carousel 55 and delivers the container 2 to a moving carousel 356.

Between the retracted configuration W1 and the advanced configuration W3 an intermediate configuration W2 is defined, shown in FIG. 70, in which the positioning arrangement 90 removes the container 2 from the apparatus 1. In particular, the positioning arrangement 90 receives the container 2 from the neck forming arrangement 10.

In a step of the working cycle, shown in FIG. 70, the first half-mould 12 and the second half-mould 13 are in the open configuration C, the further first half-mould 24 and the further second half-mould 25 are in the foaming configuration W, the positioning arrangement 90 is in the intermediate configuration W2. In this step, the container 2 is retained by the neck forming arrangement 10 and the positioning arrangement 90 prepares to receive the container 2.

In a subsequent step of the working cycle, not shown, the further first half-mould 24 and the further second half-mould 25 are in the release configuration Z, the positioning arrangement 90 is in the intermediate configuration W2, in which it receives and supports the container 2 released by the neck forming arrangement 10. The positioning arrangement 90 retains the container 2 by means of a mechanical (for example, of the type shown in FIGS. 31 to 34) or pneumatic (for example, by means of a suction cup element) blocking system.

Passing from the intermediate configuration W2 to the advanced configuration W3 the positioning arrangement 90 removes the container 2 from a zone 350 between the first half-mould 12 and the further first half-mould 24, on the one side, and the second half-mould 13 and the further second half-mould 25 on the opposite side. The positioning arrangement 90 thus facilitates the removal of the container 2 by the moving carousel 356 by moving the container 2 towards an outer zone of the forming carousel 55. When the positioning arrangement is in the extended configuration W3, a prevailing portion of the container 2 is outside the zone 350.

In a subsequent step of the working cycle, shown in FIG. 71, the positioning arrangement 90 is in the advanced configuration W3 in which it delivers the container 2 to the moving carousel 356.

In a subsequent step of the working cycle, shown in FIG. 72, the moving carousel 356 moves the container 2 towards the removing carousel 78. The positioning arrangement 90 passes from the advanced configuration W3 to the retracted configuration W1.

The moving carousel 356 differs from the moving carousel 256 shown in FIGS. 64 to 69 in that it comprises extracting elements 304 which can slide, particularly radially, in relation to the further rotating body 207, but do not oscillate in relation to the further rotating body 207, unlike extracting elements 204 associated with the moving carousel 256.

The extracting elements 304 can be caused to slide in relation to the further rotating body 207, for example, by a cam device, or a pneumatic device or by an electromechanical device.

Since the positioning arrangement 90 moves the container 2 away from the apparatus 1, it is possible to provide a moving carousel in which the removing elements 304 are much simpler in comparison to the case in which the container has to be extracted from a zone interposed between the half-moulds of the stretch blow-moulding mould arrangement 4 and the half-moulds of the neck forming arrangement 10.

In particular, the removing elements 304 can be provided with a single degree of freedom in relation to the further rotating body 207, instead of two degrees of freedom.

In an embodiment that is not shown, the removing elements 304 oscillate in relation to the further rotating body.

The extracting elements 304 can be caused to oscillate in relation to the further rotating body, for example, by a cam device, or a pneumatic device or an electromechanical device.

In a further embodiment that is not shown, the removing elements are arranged in a fixed position in relation to the further rotating body, i.e., they neither slide nor oscillate in relation to the further rotating body.

In this case, the container is transferred by the positioning arrangement 90 to a removing element at a point in which a trajectory defined by the container 2 supported by the positioning arrangement 90 and a trajectory defined by the removing element are substantially tangent.

This makes it possible to obtain a moving carousel having a very simple structure.

This simplification is possible owing to the positioning arrangement 90 which, in the advanced configuration W3, places the container 2 in a position from which the container 2 can be removed easily also by removing elements which do not move in relation to the further rotating body 207.

In an embodiment that is not shown, the positioning arrangement is arranged in a fixed position in relation to the forming carousel 55.

In this embodiment, the positioning arrangement interacts in succession with the apparatuses 1 while the forming carousel 55 rotates.

In a further embodiment, not shown, the positioning arrangement is so shaped as to move the containers substantially parallel to a rotation axes of the forming carousel 55.

In this embodiment, the positioning arrangement 90 moves the container 2 away from the stretch-blow-moulding mould 4 by moving the container 2 from the zone 350 to a further zone arranged above or below the stretch-blow-moulding mould 4.

The invention claimed is:

1. Apparatus, comprising a rotating carousel and a plurality of handling elements supported by said carousel and movable in relation to said carousel, said handling elements being so shaped as to remove a container from a blow-moulding mould arrangement, wherein said apparatus further comprises a plurality of further handling elements associated with said handling elements, said further handling elements being so shaped as to deliver a dose of plastics to a compression-moulding mould arrangement, each of said further handling elements being fixed to a corresponding handling element.

2. Apparatus according to claim 1, wherein said handling elements and said further handling elements are aligned with one another along a direction arranged substantially parallel to a rotation axis of said carousel.

3. Apparatus according to claim 1, and comprising a supporting arrangement arranged for supporting said handling elements and said further handling elements.

4. Apparatus according to claim 3, and further comprising a cam device and a further cam device arranged for controlling said supporting arrangement.

5. Apparatus according to claim 3, wherein said supporting arrangement comprises a supporting block element rotatably supported to said carousel.

6. Apparatus according to claim 5, and further comprising a cam device and a further cam device arranged for controlling said supporting arrangement, wherein said cam device moves said supporting block element in relation to said carousel.

7. Apparatus according to claim 6, wherein said supporting block element comprises a rolling element arranged for engaging with said cam device for rotating said supporting block element in relation to said carousel.

8. Apparatus according to claim 5, wherein said supporting arrangement comprises a further supporting block element supported by said supporting block element and slidable in relation to said supporting block element.

9. Apparatus according to claim 8, and further comprising a cam device and a further cam device arranged for controlling said supporting arrangement, wherein said further cam device moves said further supporting block element in relation to said supporting block element.

10. Apparatus according to claim 9, wherein said further supporting block element comprises a further rolling element arranged for engaging with said further cam device for moving said further supporting block element in relation to said supporting block element.

11. Apparatus according to claim 3, wherein said supporting arrangement comprises a supporting block element supported by said carousel and slidable in relation to said carousel.

12. Apparatus according to claim 11, and further comprising a cam device and a further cam device arranged for controlling said supporting arrangement, wherein said cam device moves said supporting block element in relation to said carousel.

13. Apparatus according to claim 12, wherein said supporting block element comprises a rolling element arranged for engaging with said cam device for moving said supporting block element in relation to said carousel.

14. Apparatus according to claim 3, wherein said supporting arrangement comprises a further supporting block element rotatably supported to said supporting block element.

15. Apparatus according to 14, and further comprising a cam device and a further cam device arranged for controlling said supporting arrangement, wherein said further cam device moves said further supporting block element in relation to said supporting block element.

16. Apparatus according to claim 15, wherein said further supporting block element comprises a further rolling element arranged for engaging with said further cam device for rotating said further supporting block element in relation to said supporting block element.

17. Apparatus according to claim 3, wherein said supporting arrangement is associated with a peripheral zone of said carousel, wherein said supporting arrangement is arranged at substantially constant angular intervals.

18. Apparatus according to claim 1, wherein said handling elements comprises a suction cup device.

19. Apparatus according to claim 18, wherein said further handling elements comprises a release promoting element arranged to facilitate the release of said dose by said further removing elements, wherein said release promoting element comprises a fluid flow generating device arranged for directing said fluid flow towards said dose.

* * * * *